(12) United States Patent
Lipman et al.

(10) Patent No.: US 9,569,093 B2
(45) Date of Patent: *Feb. 14, 2017

(54) DISPLAYS AND INFORMATION INPUT DEVICES

(71) Applicant: POWER2B INC., Santa Monica, CA (US)

(72) Inventors: Sarah Michelle Lipman, Santa Monica, CA (US); Eran Kali, Jerusalem (IL); Boris Gutin, Jerusalem (IL); Moti Margalit, Zichron Yaacov (IL); Robert Michael Lipman, Santa Monica, CA (US); Ken Zwiebel, Jerusalem (IL)

(73) Assignee: Power2B, Inc., Santa Monica, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/148,309

(22) Filed: Jan. 6, 2014

(65) Prior Publication Data

US 2014/0132542 A1 May 15, 2014

Related U.S. Application Data

(63) Continuation of application No. 12/531,031, filed as application No. PCT/IL2007/000332 on Mar. 14, 2007, now Pat. No. 8,624,850.

(Continued)

(51) Int. Cl.
*G06F 3/041* (2006.01)
*G06F 3/0488* (2013.01)
(Continued)

(52) U.S. Cl.
CPC ......... *G06F 3/0488* (2013.01); *G06F 3/03545* (2013.01); *G06F 3/042* (2013.01);
(Continued)

(58) Field of Classification Search
CPC .. G06F 3/0412; G06F 3/03545; G06F 3/0428; G06F 3/042; G06F 2203/04104
See application file for complete search history.

(56) References Cited

U.S. PATENT DOCUMENTS 4,703,316 A 10/1987 Sherbeck
4,949,079 A 8/1990 Loebner
(Continued)

FOREIGN PATENT DOCUMENTS

EP 0572182 A 12/1993
GB 2289756 A 11/1995
(Continued)

OTHER PUBLICATIONS

EPO Supplementary Search Report Date Dec. 27, 2011, for Application No. 07713352.8.

(Continued)

*Primary Examiner* — Abbas Abdulselam
(74) *Attorney, Agent, or Firm* — Adam P. Daniels; Polsinelli LLP

(57) ABSTRACT

An integrated display and input device including a pixel array operative to provide a visually sensible output, at least one sensor operative to sense at least a position of at least one object with respect to the pixel array when the at least one object has at least a predetermined degree of propinquity to the pixel array and circuitry receiving an output from the at least one sensor and providing a non-imagewise input representing the position of the at least one object relative to the pixel array to utilization circuitry.

115 Claims, 57 Drawing Sheets

Related U.S. Application Data

(60) Provisional application No. 60/789,188, filed on Apr. 3, 2006.

(51) Int. Cl.
*G06F 3/042* (2006.01)
*G06F 3/0354* (2013.01)

(52) U.S. Cl.
CPC .......... *G06F 3/0412* (2013.01); *G06F 3/0428* (2013.01); *G06F 2203/04104* (2013.01)

(56) References Cited

U.S. PATENT DOCUMENTS

| | | | |
|---|---|---|---|
| 5,122,656 A | 6/1992 | Williams et al. | |
| 5,227,985 A | 7/1993 | DeMenthon | |
| 5,448,261 A | 9/1995 | Koike et al. | |
| 5,506,605 A | 4/1996 | Paley | |
| 5,892,501 A | 4/1999 | Kim et al. | |
| 5,914,709 A * | 6/1999 | Graham ................... | G02B 6/32 345/173 |
| 5,926,168 A | 7/1999 | Fan | |
| 5,949,402 A | 9/1999 | Garwin et al. | |
| 5,959,617 A | 9/1999 | Bird et al. | |
| 6,081,255 A | 6/2000 | Narabu | |
| 6,094,188 A | 7/2000 | Horton et al. | |
| 6,153,836 A * | 11/2000 | Goszyk ................ | G01B 11/002 178/19.01 |
| 6,404,416 B1 | 6/2002 | Kahn et al. | |
| 7,034,866 B1 | 4/2006 | Colmenarez et al. | |
| 7,479,944 B2 | 1/2009 | Casebolt et al. | |
| 7,502,011 B2 | 3/2009 | Braun et al. | |
| 8,624,850 B2 * | 1/2014 | Lipman et al. ............... | 345/173 |
| 2001/0050672 A1 | 12/2001 | Kobawashi | |
| 2004/0012565 A1 | 1/2004 | Cok | |
| 2004/0252091 A1 | 12/2004 | Ma | |
| 2005/0156914 A1 | 7/2005 | Lipman et al. | |
| 2006/0007222 A1 | 1/2006 | Uy | |
| 2006/0132463 A1 | 6/2006 | Lee et al. | |

FOREIGN PATENT DOCUMENTS

| | | |
|---|---|---|
| GB | 2299856 A | 10/1996 |
| JP | 08-050526 | 2/1996 |
| WO | 03104965 A2 | 12/2003 |
| WO | WO2005094176 A2 | 10/2005 |

OTHER PUBLICATIONS

International Search Report of Mar. 20, 2008 in corresponding PCT application PCT/IL2007/000332.
EPO Search Report, Oct. 14, 2010, Arranz, Jose.
JPO Office Action, Sep. 28, 2010, Tomoya, Hatori.

* cited by examiner

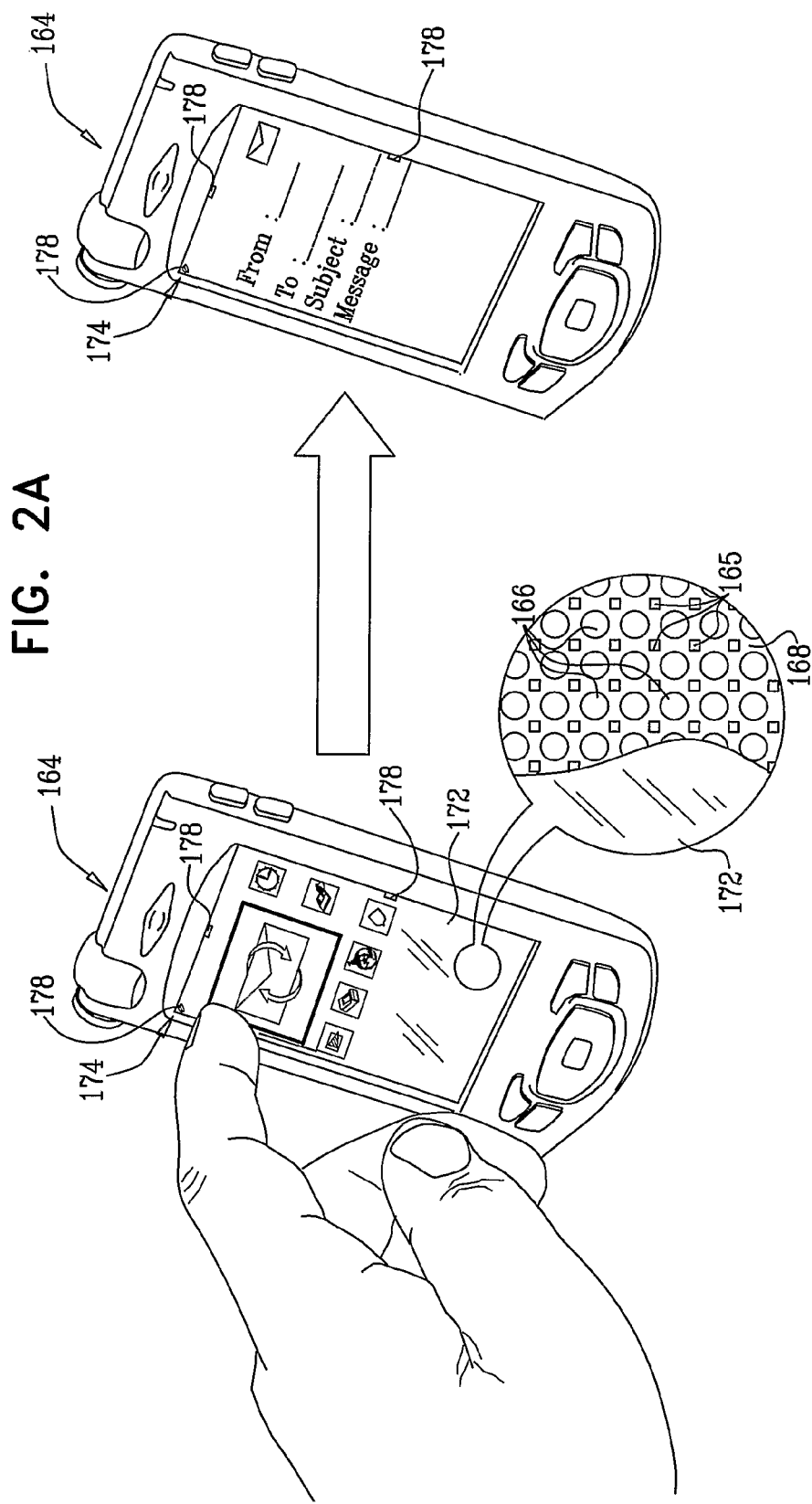

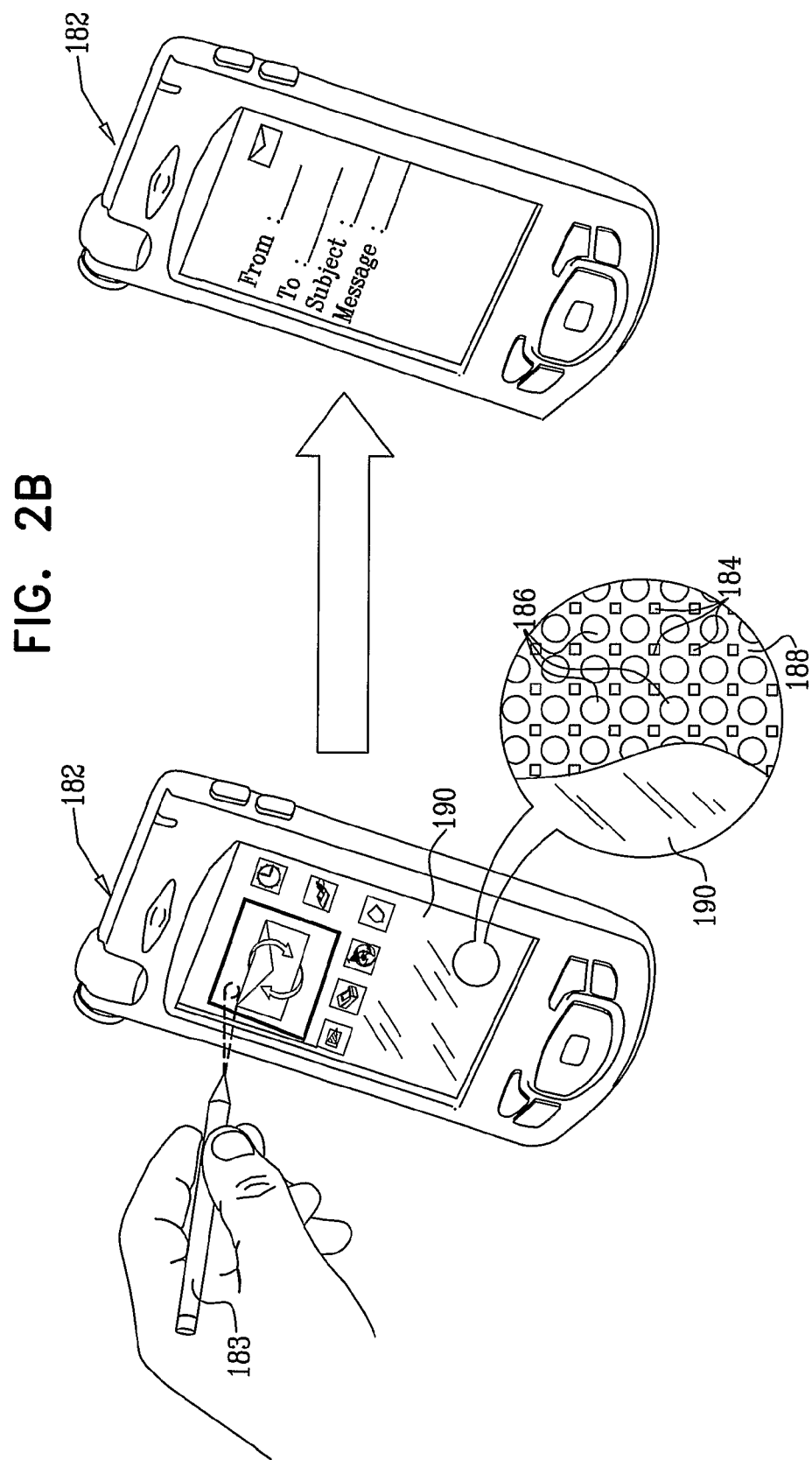

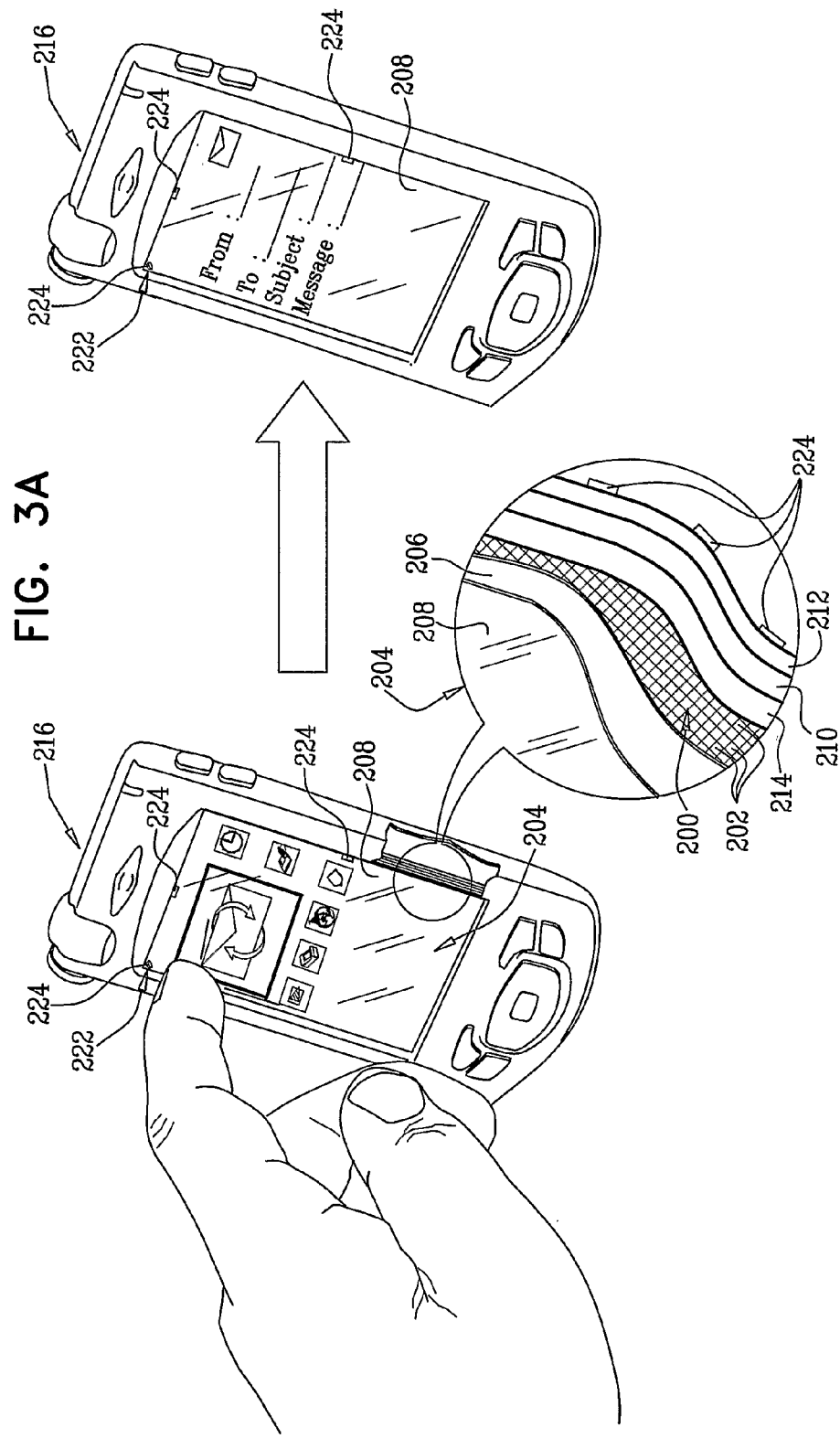

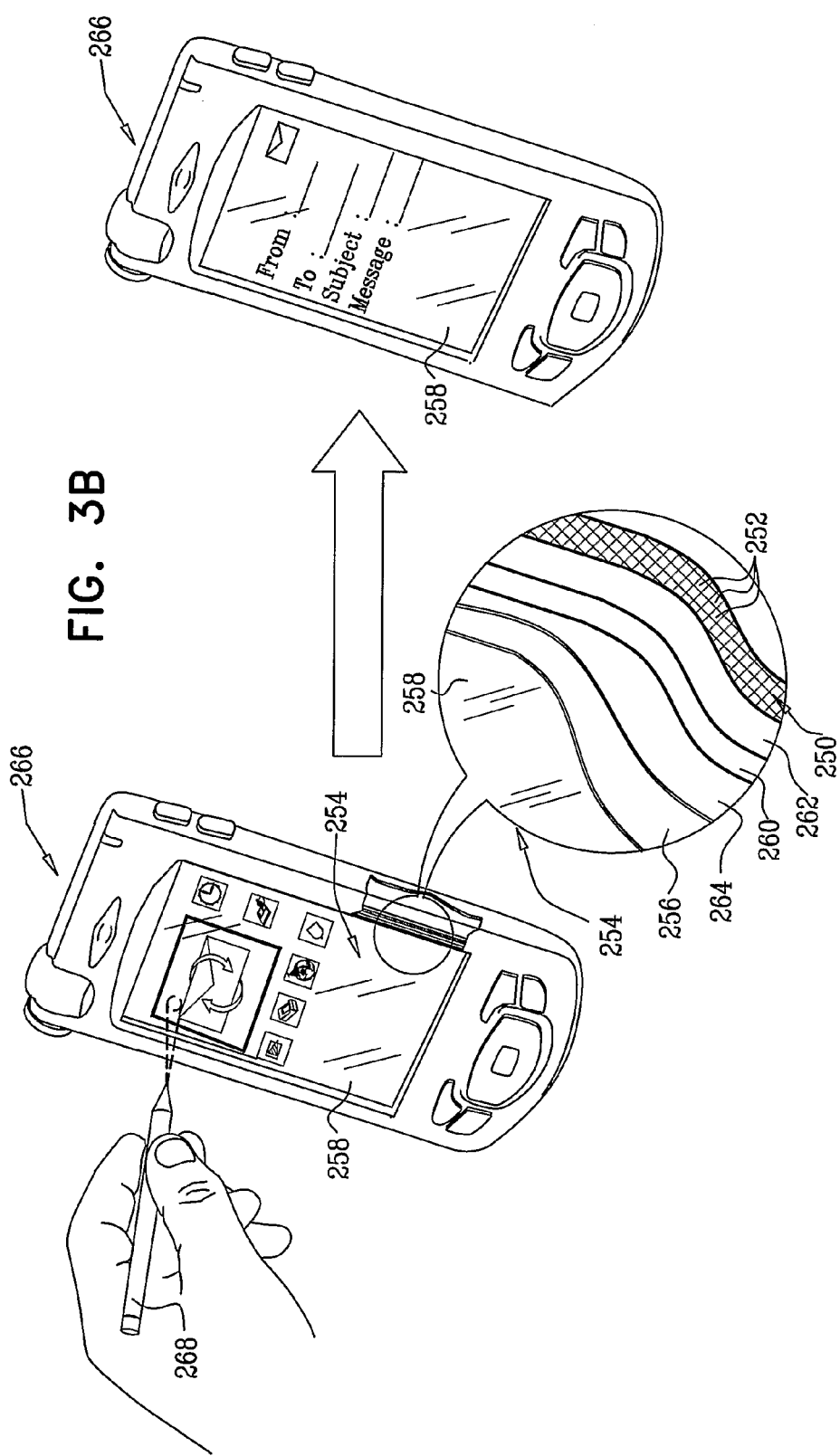

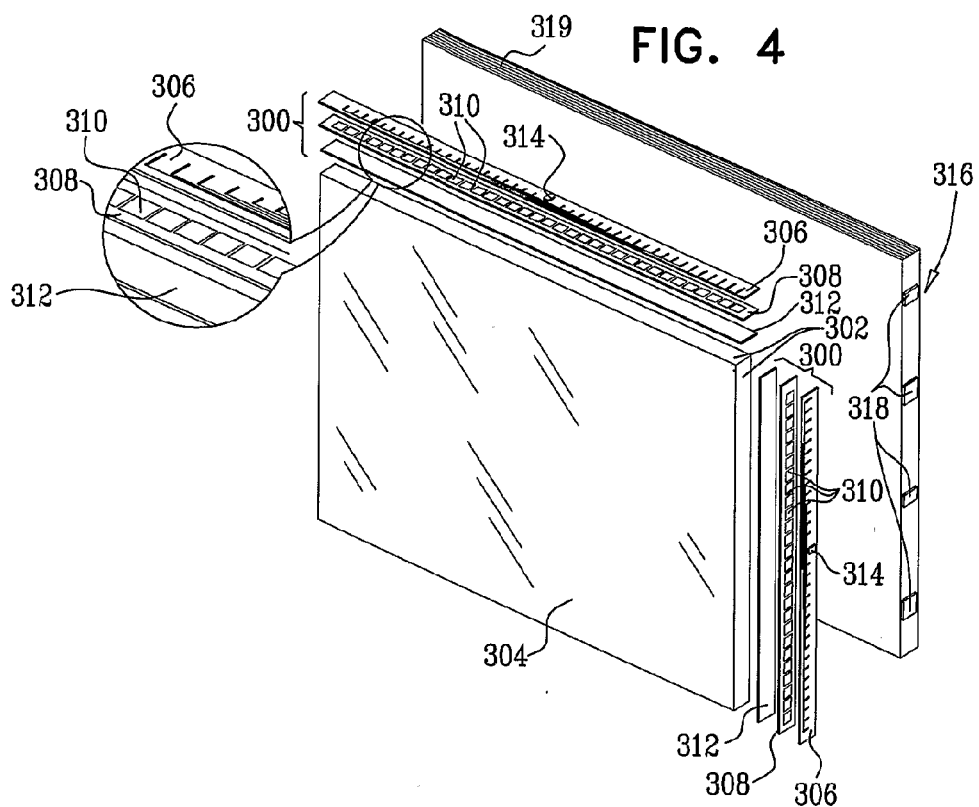
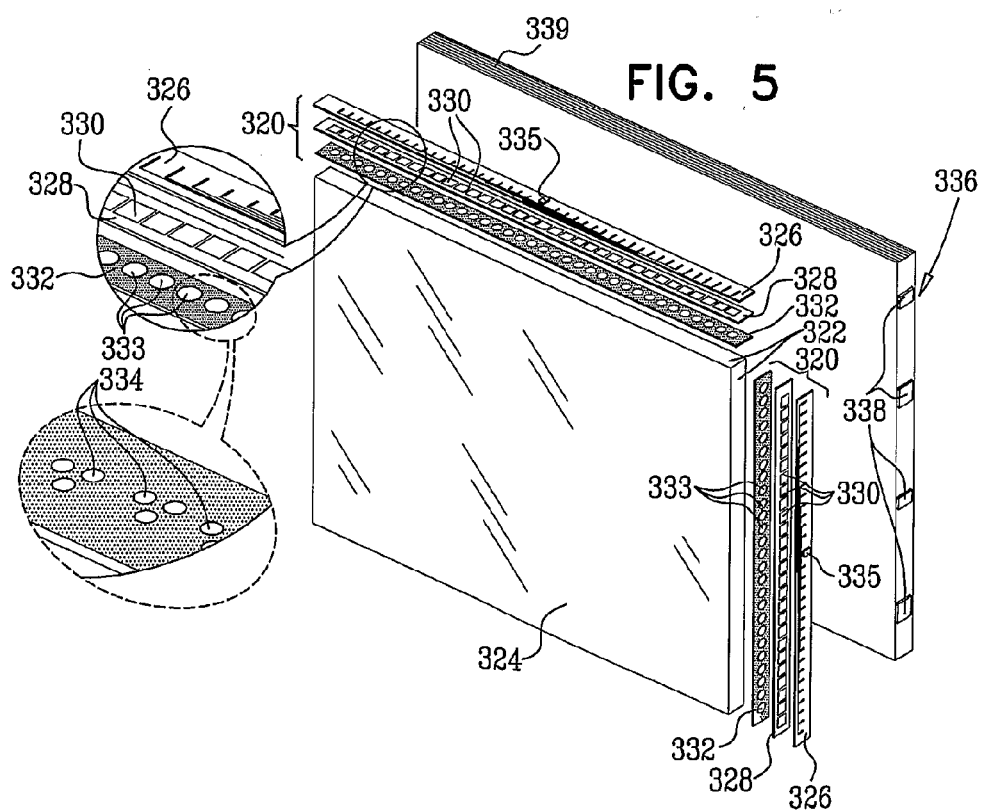

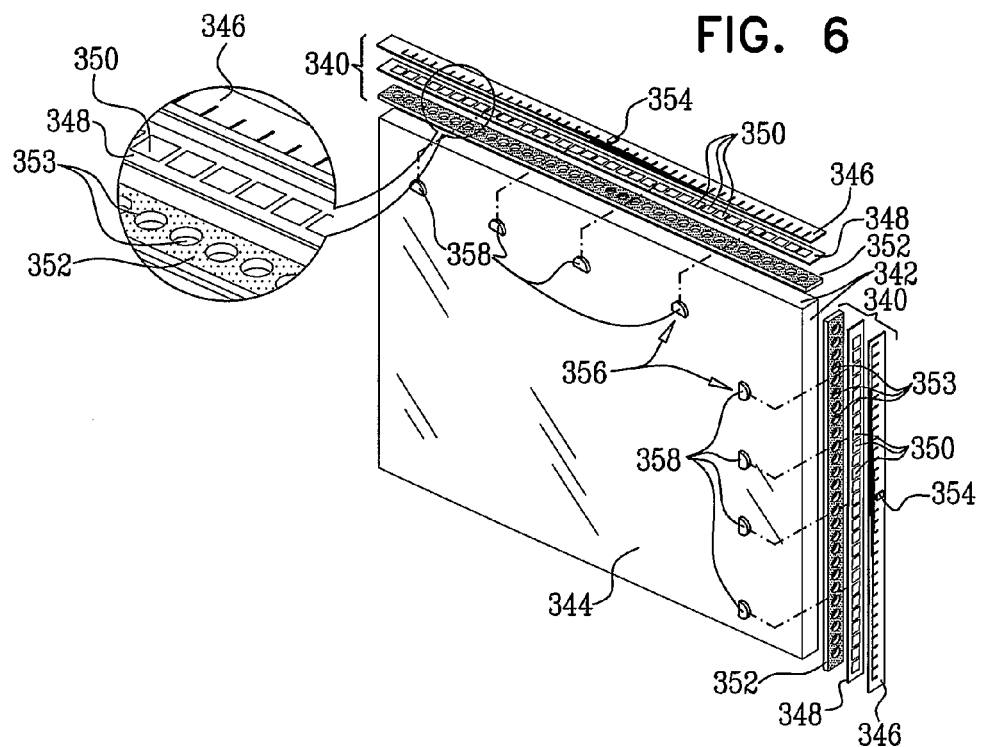
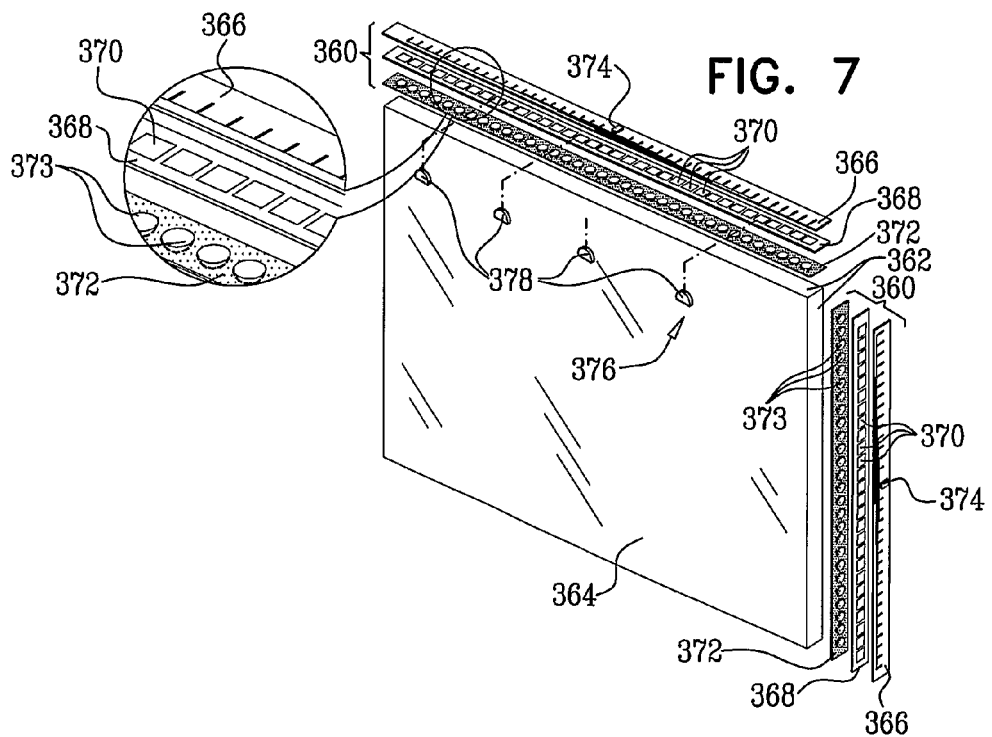

FIG. 14A
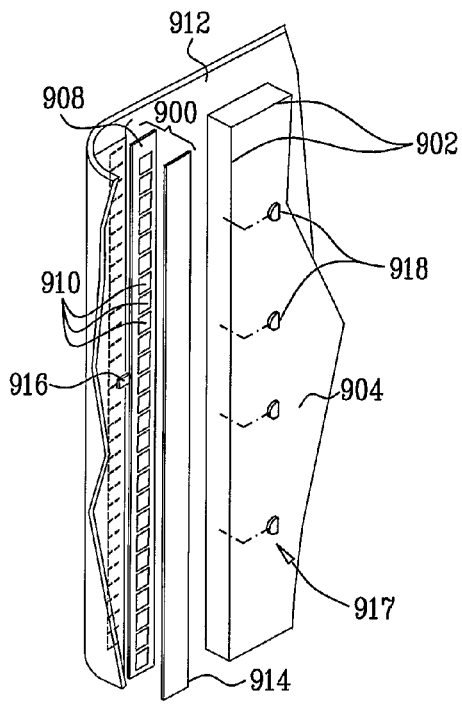
FIG. 14B
FIG. 14C
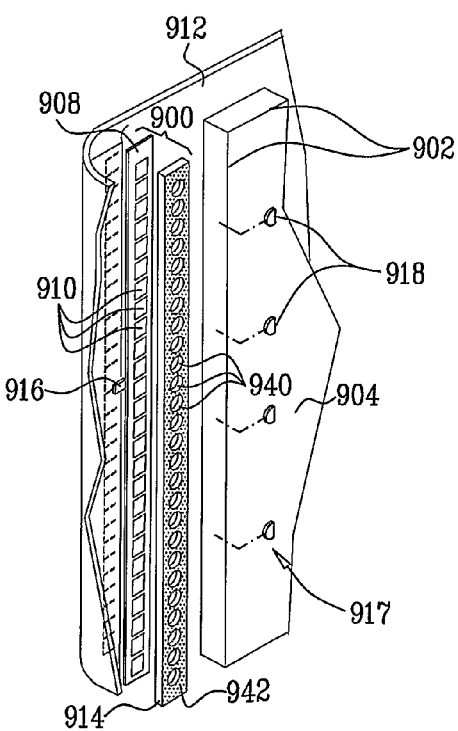
FIG. 14D
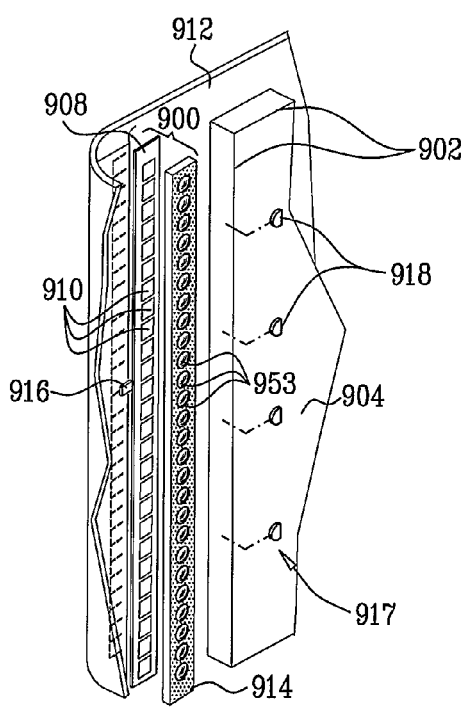

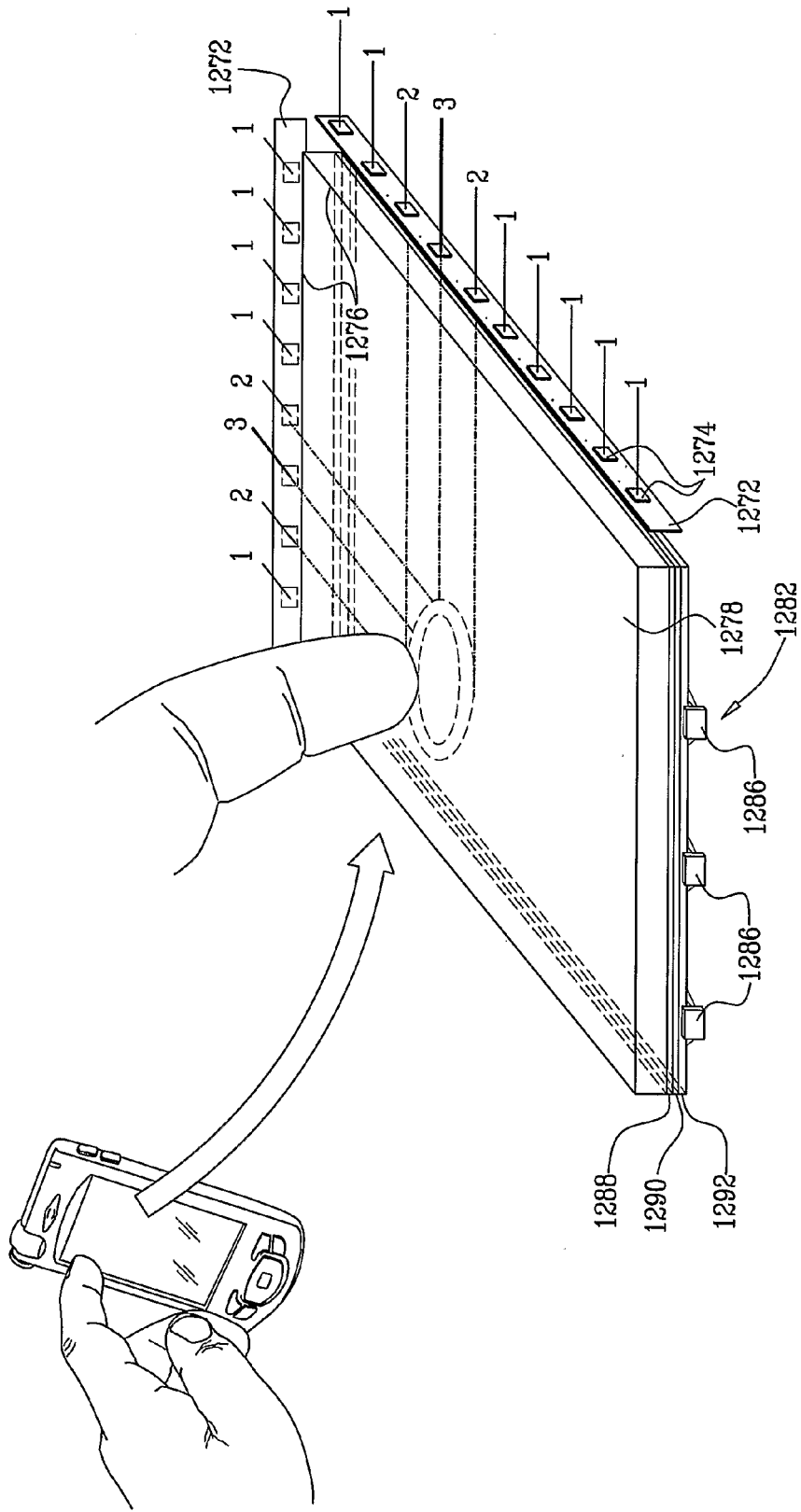

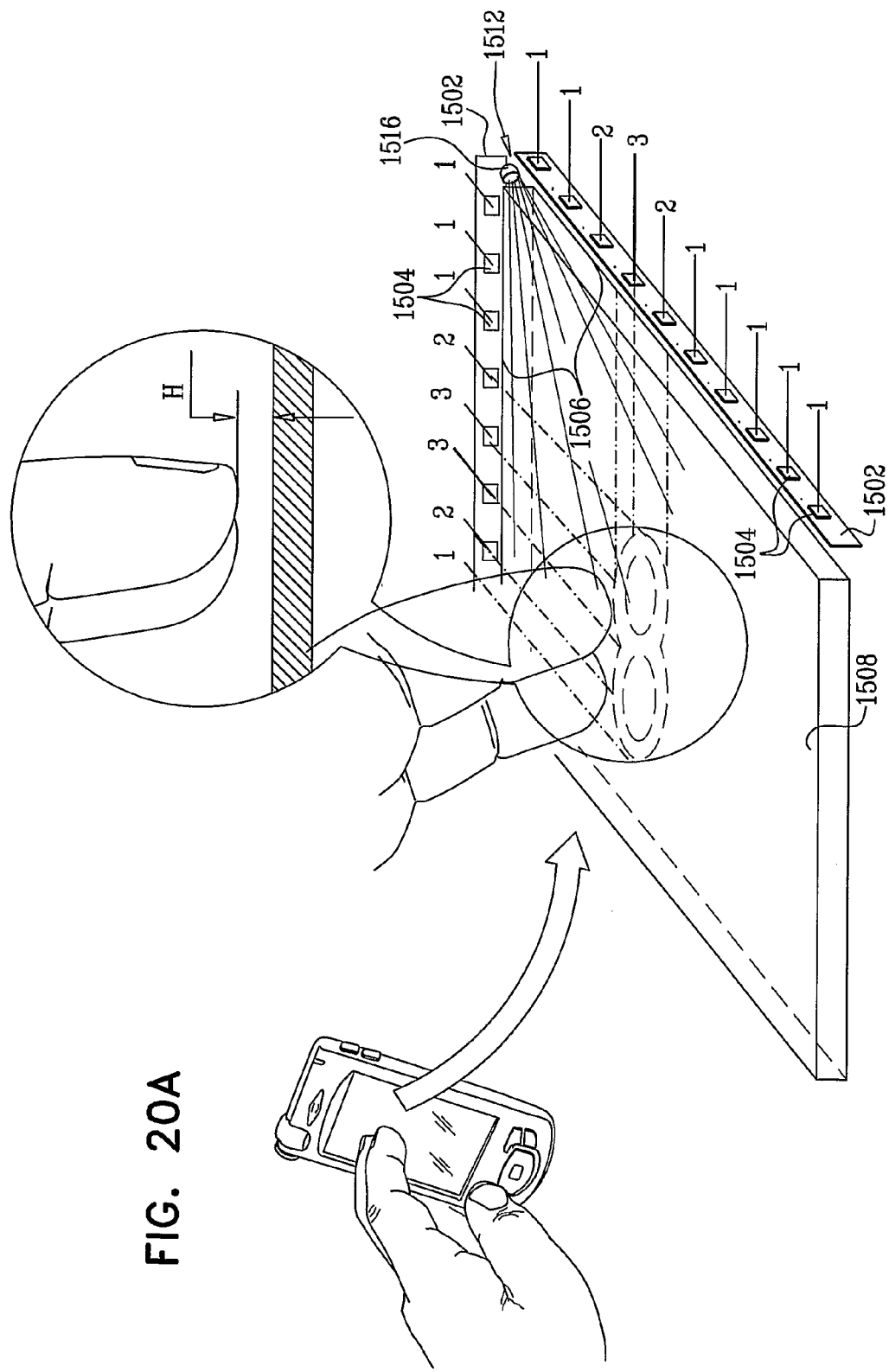

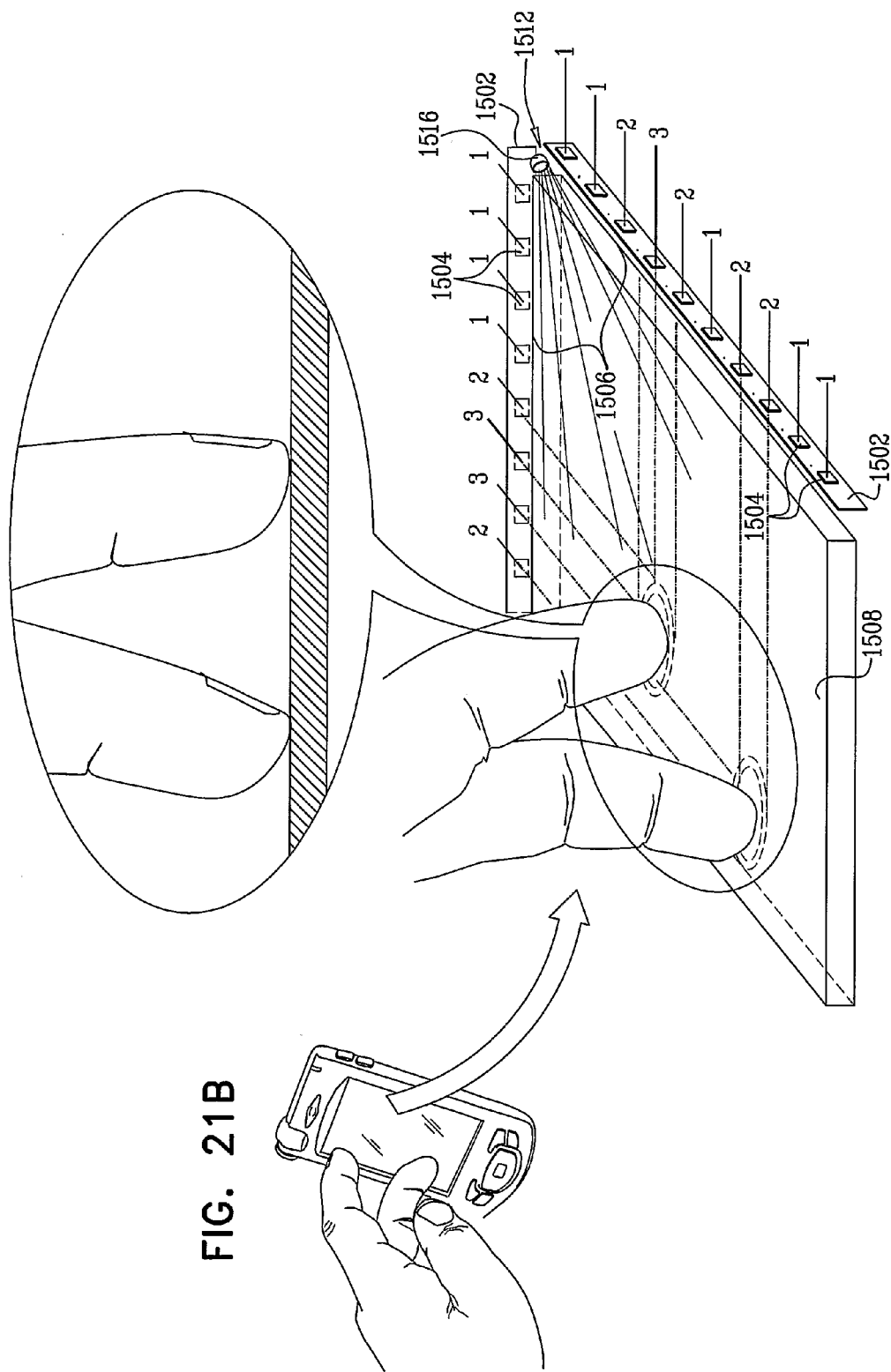

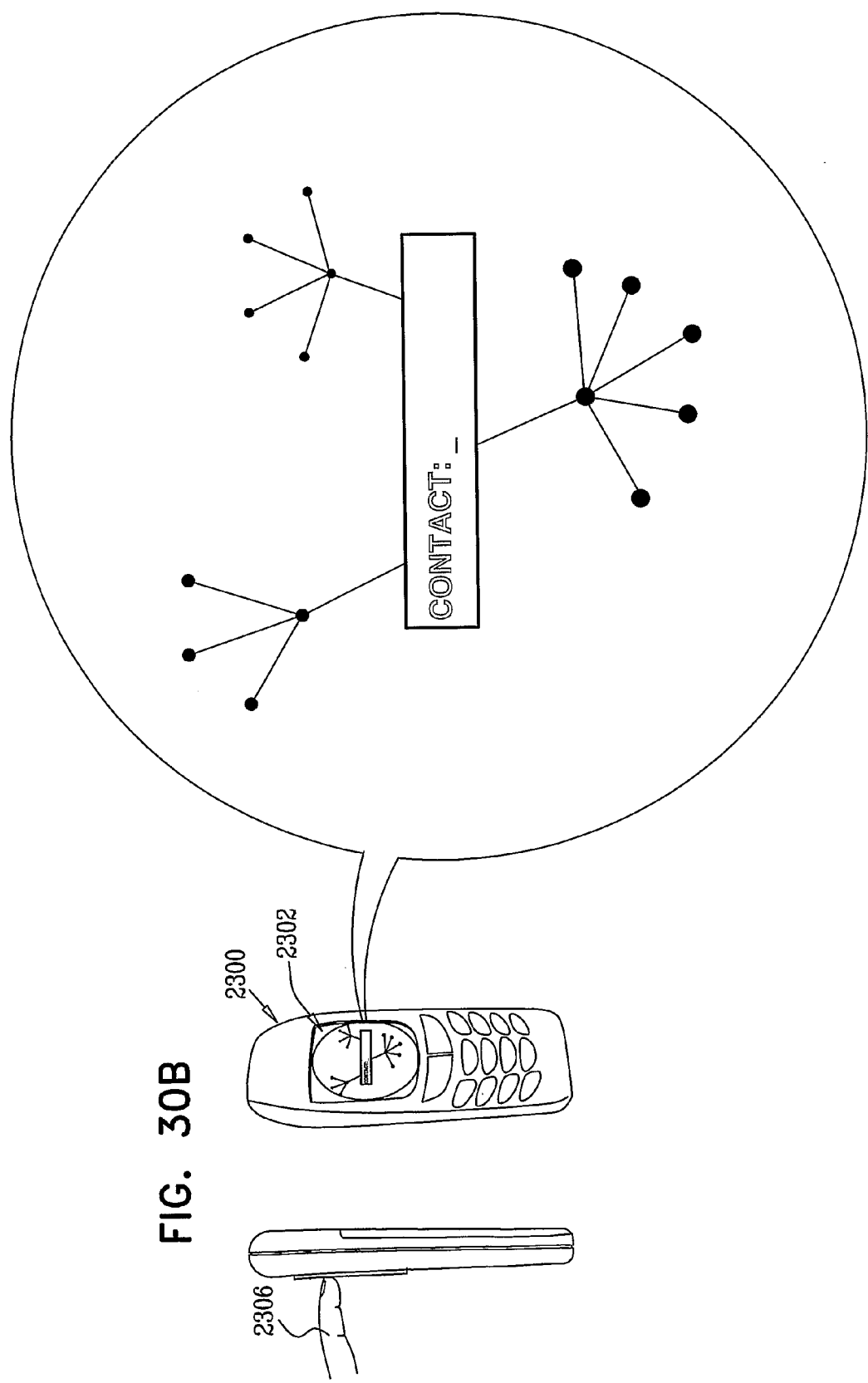

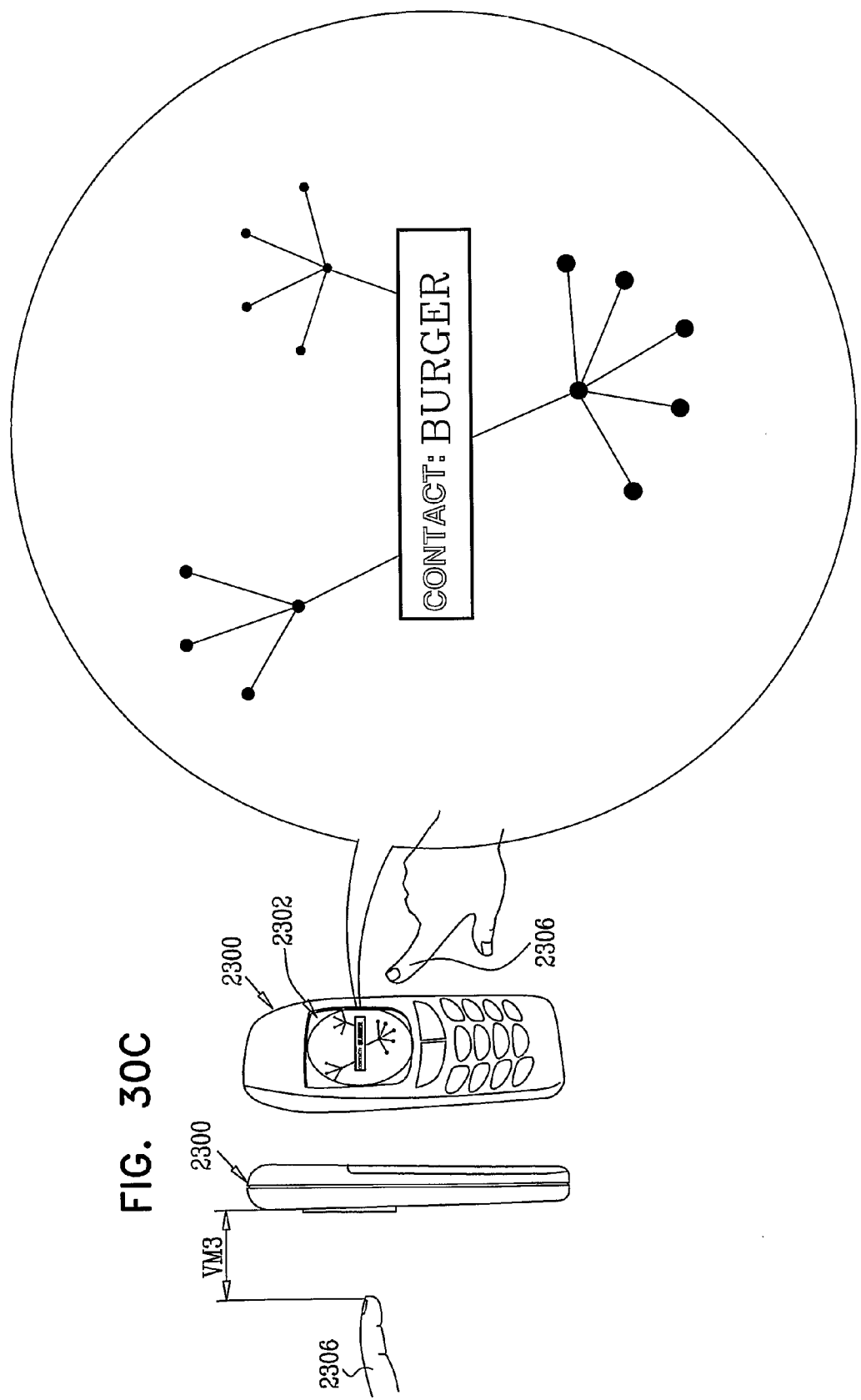

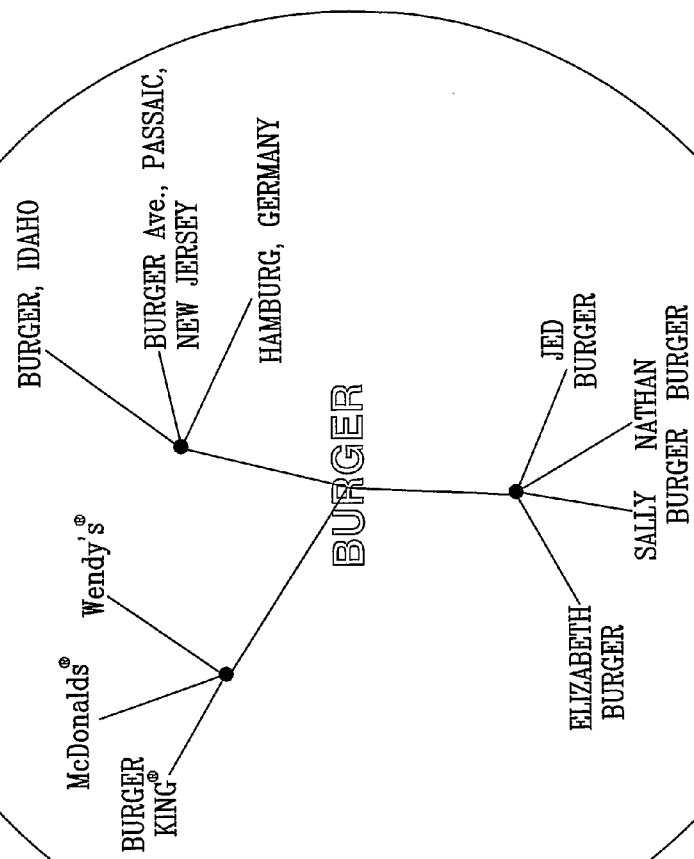
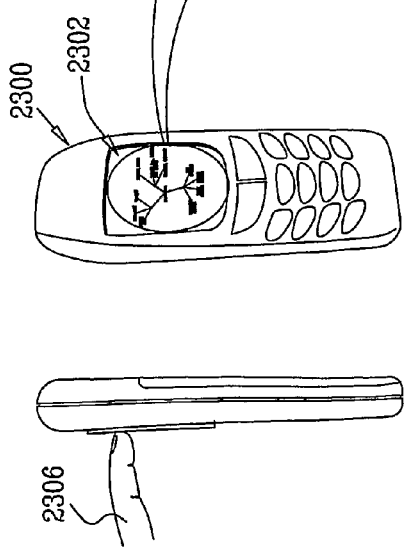
FIG. 30D

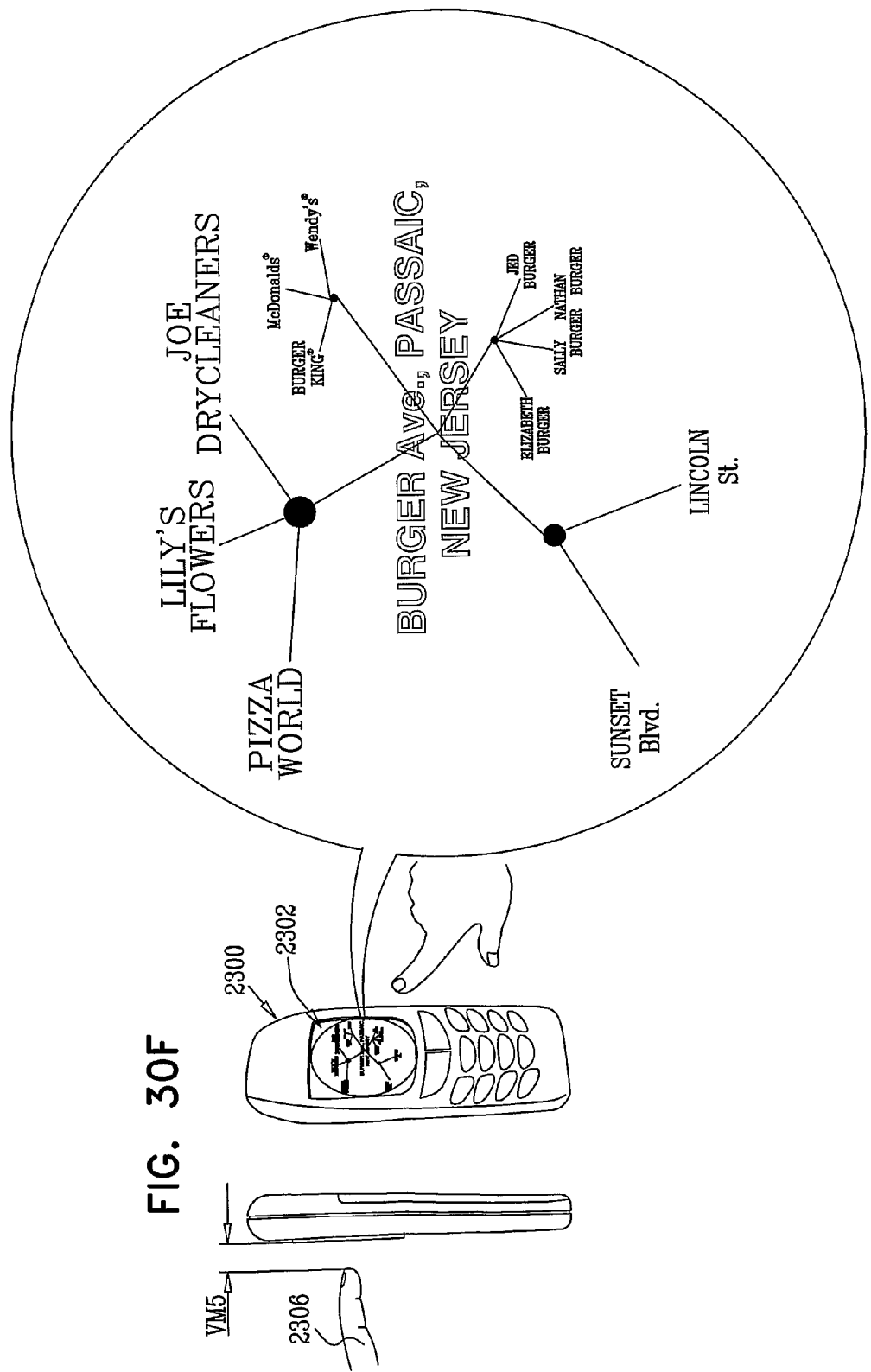

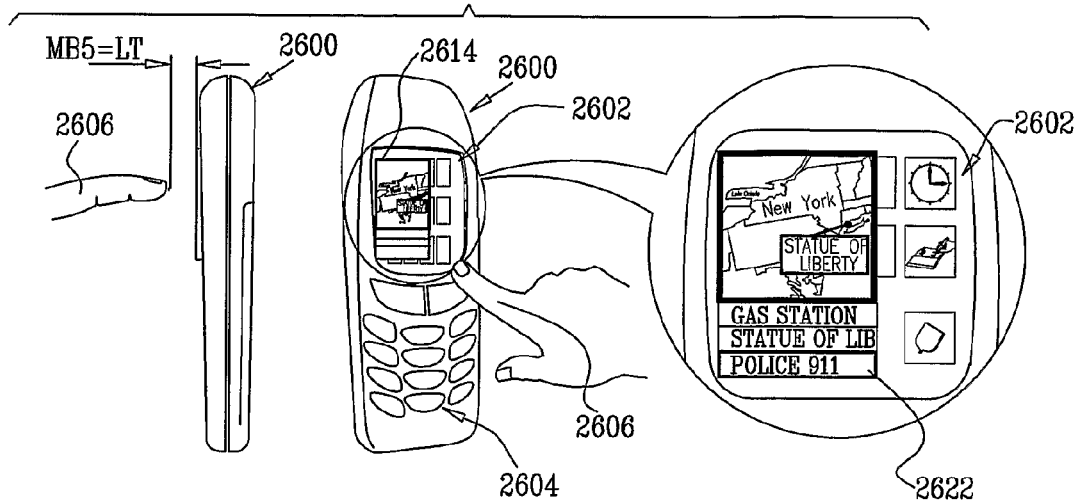
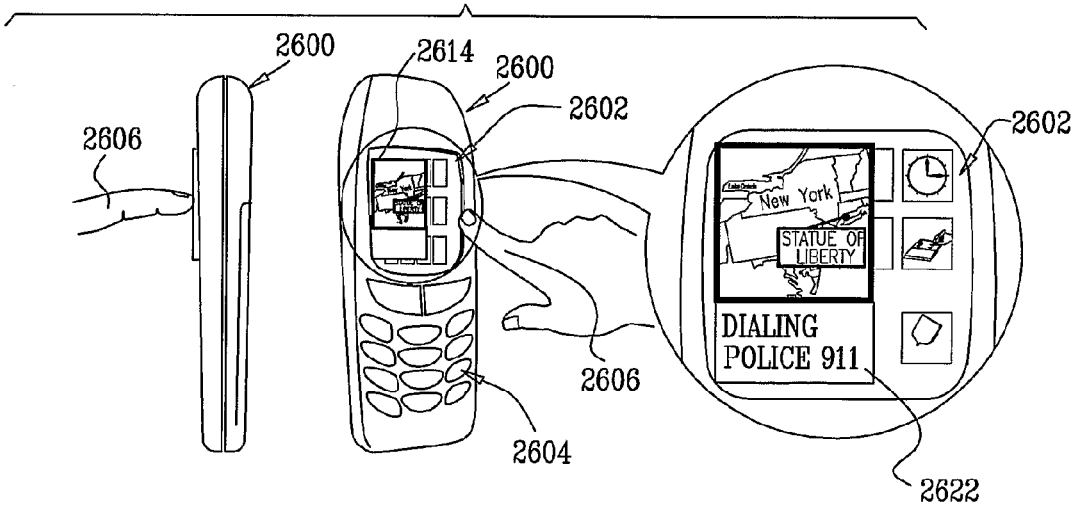

DISPLAYS AND INFORMATION INPUT DEVICES

CROSS-REFERENCE TO RELATED APPLICATIONS

The present application is a continuation of parent application Ser. No. 12/531,031, filed Jun. 30, 2010, which is a 35 U.S.C. §371 U.S. National Phase application of PCT/IL2007/000332, the contents of all of which are incorporated by reference and from which priority is hereby claimed.

The present application is also related to U.S. Provisional Patent Application No. 60/789,188, filed Apr. 3, 2006 and entitled USER INTERFACE FUNCTIONALITIES, the disclosure of which is hereby, incorporated by reference and priority of which is hereby claimed pursuant to 37 C.F.R. 1.78(a) (4) and (5)(i).

The present application is also related to U.S. Provisional Patent Application No. 60/715,546, filed Sep. 8, 2005, and entitled OPTICAL SENSOR FOR MEASUREMENT OF LIGHT SCATTERING and to U.S. Provisional Patent Application No. 60/734,027 filed Nov. 3, 2005, and entitled CONTROL APPARATUS, the disclosures of which are hereby incorporated by reference.

The present application is also related to U.S. Provisional Patent Application No. 60/682,604, filed May 18, 2005 and entitled NOVEL DISTORTION LENS, U.S. Patent Application Publication No. 2005/0156914A1 and to PCT Application Publication No. WO 2005/094176, the disclosures of which are hereby incorporated by reference.

BACKGROUND OF THE INVENTION

Field of the Invention

The present invention relates to displays, information input devices and user interface functionalities.

Description of the Related Art

The following published patent documents, the disclosures of which are hereby incorporated by reference, are believed to represent the current state of the art:

Great Britain Patent Numbers: GB2299856 and GB2289756; European Patent Number: EP0572182;

PCT International Patent Application Publication Numbers: WO02/043045, WO03/104965 A2; WO 2005/094176 A3; WO95/02801 and WO 2005/094176; and U.S. Pat. Nos. 6,404,416; 6,094,188; 6,081,255; 5,926,168; 5,892,501; 5,448,261; 5,227,985; 5,949,402; 5,959,617; 5,122,656; 5,506,605 and 5,320,292;

U.S. Patent Publication Nos.: US 2001/0050672 and 2005/0156914A1.

SUMMARY OF THE INVENTION

The present invention seeks to provide an integrated display and input device, improved user interfaces and user interface functionalities, particularly useful for displays, such as those employed with computers, televisions, personal communicators and other mobile devices.

There is thus provided in accordance with a preferred embodiment of the present invention an integrated display and input device including a pixel array operative to provide a visually sensible output, at least one sensor operative to sense at least a position of at least one object with respect to the pixel array when the at least one object has at least a predetermined degree of propinquity to the pixel array and circuitry receiving an output from the at least one sensor and providing a non-imagewise input representing the position of the at least one object relative to the pixel array to utilization circuitry. Preferably, the integrated display and input device also includes at least one IR illuminator for illuminating the at least one object when it has the at least a predetermined degree of propinquity to the pixel array. Additionally, the at least one illuminator also functions as at least one backlighting illuminator associated with the pixel array. Alternatively or additionally, the at least one illuminator is located in a plane coplanar with or parallel to the at least one sensor.

Preferably, the at least one illuminator is located generally in the same plane as at least one backlighting illuminator associated with the pixel array.

Preferably, the at least one sensor senses light reflected from the at least one object. Additionally, the at least one sensor senses ambient light reflected from the at least one object. Alternatively or additionally, the at least one sensor senses IR light reflected from the at least one object.

Preferably, the at least one object is at least one finger. Alternatively or additionally, the at least one object is at least one located device.

Preferably, the integrated display and input device also includes utilization circuitry.

Preferably, the utilization circuitry provides chording functionality. Additionally or alternatively, the utilization circuitry provides functionality to distinguish at least between positions of the at least one object when touching and not touching the device. Alternatively or additionally, the utilization circuitry provides functionality to distinguish at least between directions of motion of the at least one object towards and away from the device as well as directions of motion laterally thereof.

Preferably, the utilization circuitry provides functionality to compute at least one characteristic of a trajectory of motion of the at least one object generally parallel to the pixel array. Additionally, the at least one characteristic includes at least one of location, direction, velocity and change in direction. Preferably, the utilization circuitry provides functionality for panning and scrolling. Alternatively or additionally, the utilization circuitry provides functionality for one-handed zooming.

Preferably, the utilization circuitry provides functionality for employing a sensed distinction between instances when the at least one object touches and does not touch the device. Additionally or alternatively, the utilization circuitry provides functionality for mouse over and click. Preferably mouse over functionality is provided when a user's finger is not touching a screen or other object but within a predetermined range of propinquity. In such a case, mouse click functionality is provided when a user's finger touches the screen or other object. In a preferred case, within the predetermined range of propinquity, the extent of propinquity is not of significance, however alternatively, the extent of propinquity may be sensed and utilized in various functionalities, as described herein below.

Alternatively or additionally, the utilization circuitry provides functionality for turning pages. Additionally or alternatively, the utilization circuitry provides functionality for gaming. Additionally or alternatively, the utilization circuitry provides functionality utilizing differences in sensed relative positions of a user's fingers. Alternatively or additionally, the utilization circuitry provides interactive television functionality. Additionally or alternatively, the utilization circuitry provides portable computer functionality. Preferably, the at least one sensor includes a plurality of detector elements arranged in a plane parallel to a viewing plane. Additionally or alternatively, the at least one sensor is coplanar with the pixel array.

Preferably, each of the pixel array and the at least one sensor include a plurality of elements arranged in parallel planes, parallel to a viewing plane.

Preferably, the at least one sensor includes a detector assembly arranged at least one edge of a viewing plane defining plate. Additionally, the detector assembly is arranged about the at least one edge of the viewing plane defining plate.

Alternatively, the detector assembly is arranged along the at least one edge of the viewing plane defining plate.

Preferably, the detector assembly includes a support substrate and an arrangement of detector elements. Additionally, the detector assembly also includes a cover layer. Additionally, the support substrate is integrated with a housing of the integrated display and input device.

Preferably, the arrangement of detector elements includes a plurality of discrete single-element detectors. Alternatively, the arrangement of detector elements includes an integrally formed multi-element detector array. In another alternative embodiment, the arrangement of detector elements includes a plurality of discrete multi-element detectors.

Preferably, the cover layer is formed of a light transmissive material.

Alternatively, the cover layer includes a mask having apertures defined therein. In another alternative embodiment, the cover layer includes a field-of-view defining mask having light-collimating tunnel-defining apertures. Additionally or alternatively, the cover layer includes lenses.

Preferably, the at least one edge includes a mask having apertures defined therein. Alternatively, the at least one edge includes a field-of-view defining mask having light-collimating tunnel-defining apertures. Alternatively or additionally, the at least one edge includes lenses.

Preferably, the at least one sensor includes a plurality of generally forward-facing detectors arranged about edges of a display element.

Preferably, at least one detector in the arrangement detects electromagnetic radiation at a baseline level and senses the position of the object with respect to the pixel array and the circuitry provides the non-image wise input according to location of at least one detector in the arrangement for which at least one of the amount of radiation detected and the change in the amount of radiation detected exceed a first predetermined threshold. Additionally, the change in the amount of radiation detected results from at least one detector in the arrangement detecting reflected light from the object in addition to detecting the radiation at the baseline level.

Preferably, the reflected light propagates within the viewing plane defining plate to at least one detector in the arrangement. Alternatively, the reflected light propagates above the viewing plane defining plate to at least one detector in the arrangement. In another alternative embodiment the reflected light is transmitted through the viewing plane defining plate directly to at least one detector in the arrangement. Preferably, the at least one detector in the arrangement detects radiation at the baseline level, senses the position of the object with respect to the pixel array and the circuitry provides the non-imagewise input according to location of at least one detector in the arrangement at which the amount of radiation detected is below a second predetermined threshold. Preferably, the integrated display and input device also includes a processing subassembly including detector analyzing processing circuitry operative to receive detector outputs of individual detectors in the arrangement, to determine at least one of whether the amount of radiation detected by the individual detectors exceeds the first predetermined threshold, whether the change in the amount of radiation detected by the individual detectors exceeds the first predetermined threshold and whether the amount of radiation detected by the individual detectors is below the second predetermined threshold, and to provide detector analysis outputs for the individual detectors, array processing circuitry operative to receive the detector analysis outputs of individual detectors in the arrangement and to generate an array detection output therefrom and position determining circuitry operative to receive the array detection output of the arrangement and to determine the position of the object therefrom.

Preferably, the array detection output includes information corresponding to the location of an impingement point of the object on the viewing plane defining plate. Alternatively, the array detection output includes information corresponding to the location of the object relative to the viewing plane defining plate.

Preferably, the radiation at the baseline level is provided by at least one source of illumination external to the integrated display and input device. Additionally, the at least one source of illumination includes at least one of sunlight, artificial room lighting and IR illumination emitted from a human body.

Preferably, the integrated display and input device also includes an illumination subassembly operative to provide illumination for augmenting the radiation at the baseline level. Alternatively, the integrated display and input device also includes an illumination subassembly operative to provide the radiation at the baseline level.

Preferably, the illumination subassembly includes at least one electromagnetic radiation emitting source. Additionally, the at least one electromagnetic radiation emitting source includes at least one of at least one IR emitting LED and at least one visible light emitting LED. Optionally, the light emitted by LED may be modulated by modulating circuitry (not shown).

Preferably, the at least one electromagnetic radiation emitting source is disposed at an intersection of two mutually perpendicular edges of the viewing plane defining plate. Alternatively, the at least one electromagnetic radiation emitting source forms part of a linear arrangement of display backlights underlying the viewing plane defining plate.

Preferably, the illumination subassembly includes at least one generally linear arrangement of a plurality of electromagnetic radiation emitting sources arranged in parallel to at least one edge of the viewing plane defining plate. Additionally, at least one of the at least one generally linear arrangement is arranged behind the at least one sensor.

There is also provided in accordance with another preferred embodiment of the present invention a position sensing assembly including a plate defining a surface, at least one pixel array including a plurality of detector elements detecting electromagnetic radiation at a baseline level, the at least one pixel array being operative to sense a position of an object with respect to the surface according to locations of ones of the plurality of detector elements at which at least one of the amount of radiation detected and the change in the amount of radiation detected exceed a predetermined threshold, the at least one pixel array being operative to sense at least a position of at least one object with respect to the at least one pixel array when the at least one object has at least a predetermined degree of propinquity to the at least one pixel array and circuitry receiving an output from the at least one pixel array and providing a non-imagewise input representing the position of the at least one object relative to the at least one pixel array to utilization circuitry.

Preferably, the position sensing assembly also includes at least one IR illuminator for illuminating the at least one object when it has the at least a 5 predetermined degree of propinquity to the at least one pixel array. Additionally, the at least one illuminator also functions as at least one backlighting illuminator associated with a display associated with the at least one pixel array. Alternatively or additionally, the at least one illuminator is located in a plane coplanar with or parallel to the at least pixel array. Optionally, the light emitted by the illuminator may be modulated by modulating circuitry (not shown).

Preferably, the at least one illuminator is located generally in the same plane as at least one backlighting illuminator. Optionally, the light emitted by the illuminator may be modulated by modulating circuitry (not shown).

Preferably, the at least one pixel array senses light reflected from the at least one object. Additionally, the at least one pixel array senses ambient light reflected from the at least one object. Alternatively or additionally, the at least one pixel array senses IR light reflected from the at least one object.

Preferably, the at least one object is at least one finger. Alternatively or additionally, the at least one object is at least one located device.

Preferably, the position sensing assembly also includes utilization circuitry.

Preferably, the utilization circuitry provides chording functionality. Additionally or alternatively, the utilization circuitry provides functionality to distinguish at least between positions of the at least one object when touching and not 5 touching the device. Alternatively or additionally, the utilization circuitry provides functionality to distinguish at least between directions of motion of the at least one object towards and away from the device.

Preferably, the utilization circuitry provides functionality to compute at least one characteristic of a trajectory of motion of the at least one object generally 0 parallel to the at least one pixel array. Additionally, the at least one characteristic includes at least one of location, direction, velocity and change in direction.

Preferably, the utilization circuitry provides functionality for panning and scrolling. Alternatively or additionally, the utilization circuitry provides functionality for one-handed zooming.

Preferably, the utilization circuitry provides functionality for employing a sensed distinction between instances when the at least one object touches and does not touch the device. Additionally or alternatively, the utilization circuitry provides functionality for mouse over and click. Additionally or alternatively, the utilization circuitry provides functionality for document browsing including page turning.

Alternatively or additionally, the utilization circuitry provides functionality for gaming. Alternatively or additionally, the utilization circuitry provides functionality utilizing differences in sensed relative positions of a user's fingers.

Preferably, the change in the amount of radiation detected results from ones of the plurality of detector elements detecting reflected light from the object in addition to detecting the radiation at the baseline level. Additionally, the reflected light propagates within the plate to ones of the plurality of detector elements. Alternatively, the reflected light propagates above the surface to ones of the plurality of detector elements. In another alternative embodiment the reflected light is transmitted through the plate directly to at least one of the plurality of detector elements.

Preferably, the position sensing assembly also includes a processing subassembly including detector analyzing processing circuitry operative to receive detector outputs of individual ones of the plurality of detector elements, to determine whether at least one of the amount of radiation and the change in the amount of radiation detected by the individual ones of the plurality detector element exceeds the predetermined threshold, and to provide detector analysis outputs for the individual ones of the plurality of detector elements, array processing circuitry operative to receive the detector analysis outputs of the plurality of detector elements of a single one of the at least one pixel array and to generate an array detection output therefrom and position determining circuitry operative to receive the array detection output of the at least one pixel array and to determine the position of the object therefrom. Preferably, the array detection output includes information corresponding to the location of an impingement point of the object on the surface. Alternatively, the array detection output includes information corresponding to the location of the object relative to the surface.

Preferably, the position of the object includes at least one of a two-dimensional position of the object, a three-dimensional position of the object and angular orientation of the object.

Preferably, the radiation at the baseline level is provided by at least one source of radiation external to the position sensing assembly. Additionally, the at least one source of radiation includes at least one of sunlight, artificial room lighting and IR illumination emitted from a human body. Preferably, the position sensing assembly also includes an illumination subassembly operative to provide illumination for augmenting the radiation at the baseline level. Alternatively, the position sensing assembly also includes an illumination subassembly operative to provide the radiation at the baseline level to the plurality of detector elements. Preferably, the illumination subassembly includes at least one electromagnetic radiation emitting source. Additionally, the at least one electromagnetic radiation emitting source includes at least one of at least one IR emitting LED and at least one visible light emitting LED.

Preferably, the at least one pixel array includes at least two pixel arrays arranged at mutually perpendicular edges of the plate.

Preferably, the illumination subassembly includes an electromagnetic radiation emitting source disposed at an intersection of two of the at least two pixel arrays. Alternatively, the illumination subassembly includes an electromagnetic radiation emitting source disposed at an intersection of two mutually perpendicular edges of the plate, and across from an intersection point of two of the at least two pixel arrays. Alternatively or additionally, the illumination subassembly includes at least one electromagnetic radiation emitting source forming part of a linear arrangement of display backlights underlying the plate.

Preferably, the at least one electromagnetic radiation emitting source includes an IR emitting LED.

Preferably, the illumination subassembly includes at least one generally linear arrangement of a plurality of electromagnetic radiation emitting sources arranged in parallel to at least one edge of the plate. Additionally, at least one of the at least one generally linear arrangement is arranged behind at least one of the at least two pixel arrays.

Preferably, the at least one pixel array is arranged in a plane parallel to the surface. Additionally, the illumination subassembly includes at least one generally linear arrangement of a plurality of electromagnetic radiation emitting sources arranged in parallel to at least one edge of the plate. Alternatively, the illumination subassembly includes an electromagnetic radiation emitting source disposed at an intersection of two mutually perpendicular edges of the plate. Preferably, the at least one pixel array includes a single pixel array arranged along an edge of the plate. Additionally, the illumination subassembly includes an electromagnetic radiation emitting source disposed at an intersection of edges of the plate. Alternatively, the illumination subassembly includes at least one electromagnetic radiation emitting source forming part of a linear arrangement of display backlights underlying the plate.

Preferably, the at least one electromagnetic radiation emitting source includes an IR emitting LED.

Preferably, the illumination subassembly includes at least one generally linear arrangement of a plurality of electromagnetic radiation emitting sources arranged in parallel to at least one edge of the plate. Additionally, at least one of the at least one generally linear arrangement is arranged behind the single pixel array.

It is appreciated that the various embodiments of the present invention described hereinabove substantially enhance conventional touch screen functionality by adding another input dimension. The present invention thus enables differentiation between various positions of a passive object, such as a user's finger, thus distinguishing for example between a situation wherein a user's finger touches a screen and one or more situations where the finger is within a propinquity threshold of the screen. This can obviate the need for an active stylus and enable the use of a passive stylus or finger control of various functionalities. Particularly advantageous embodiments of the present invention enable a finger touch position to be distinguished from a finger propinquity position. For example a finger propinquity position may be employed for a mouse over functionality, while a finger touch position may be employed for a mouse click functionality.

BRIEF DESCRIPTION OF THE DRAWINGS

The present invention will be more fully understood and appreciated from the following detailed description, taken in conjunction with the drawings in which:

FIGS. 2A and 2B are simplified illustrations of portions of two types of integrated display and input devices constructed and operative in accordance with another preferred embodiment of the present invention, including detectors arranged in a plane parallel to a viewing plane;

FIGS. 3A and 3B are simplified illustrations of portions of two types of integrated display and input devices constructed and operative in accordance with yet another preferred embodiment of the present invention, employing elements arranged in parallel planes, parallel to a viewing plane;

FIG. 4 is a simplified illustration of a portion of an input device constructed and operative in accordance with still another preferred embodiment of the present invention, employing detectors arranged along edges of a display element;

FIG. 5 is a simplified illustration of a portion of an input device constructed and operative in accordance with a further preferred embodiment of the present invention, employing detectors arranged along edges of a display element;

FIG. 6 is a simplified illustration of a portion of an input device constructed and operative in accordance with a yet further preferred embodiment of the present invention, employing detectors arranged along edges of a display element;

FIG. 7 is a simplified illustration of a portion of an input device constructed and operative in accordance with an additional preferred embodiment of the 'present invention, employing detectors arranged along edges of a display element;

FIGS. 14A, 14B, 14C, and 14D are simplified illustrations of four alternative embodiments of a portion of an input device constructed and operative in accordance with an additional preferred embodiment of the present invention, employing forward-facing detectors arranged about edges of a display element.

FIGS. 18A, 18B, 18C, 18D, 18E, and 18F are simplified illustrations of six alternative embodiments of an illumination subassembly forming part of an integrated display and input device constructed and operative in accordance with a preferred embodiment of the present invention;

FIGS. 20A, 20B, 21A, 21B, and 22 are simplified illustrations of the operation of an integrated display and input device constructed and operative in accordance with another preferred embodiment of the present invention;

FIGS. 30A, 30B, 30C, 30D, 30E, 30F, and 30G are illustrations of contact management functionality of a mobile device constructed and operative in accordance with another preferred embodiment of the present invention.

FIGS. 33A, 33B, 33C, 33D, 33E, 33F, and 33G are illustrations of map browser functionality of a mobile device constructed and operative in accordance with a preferred embodiment of the present invention.

DETAILED DESCRIPTION OF PREFERRED EMBODIMENTS

Reference is now made to FIGS. 1A, 1B, 1C, and 1D which are simplified illustrations of four types of integrated display and input devices constructed and operative in accordance with a preferred embodiment of the present invention. These devices preferably include a pixel array operative to provide a visually sensible output, at least one sensor operative to sense at least a position of at least one object with respect to the pixel array when the at least one object has at least a predetermined degree of propinquity to the pixel array and circuitry receiving an output from the at least one sensor and providing a non-imagewise input representing the position of the at least one object relative to the pixel array to utilization circuitry.

The integrated display and input device may also include at least one IR illuminator for illuminating the at least one object when it has the at least a predetermined degree of propinquity to the pixel array. Additionally, the illuminator may also function as a backlighting illuminator associated with the pixel array. Alternatively or additionally, the illuminator may be located in a plane coplanar with or parallel to the at least one sensor.

In another preferred embodiment, the illuminator is located generally in the same plane as a backlighting illuminator associated with the pixel array. The sensor is preferably operable to sense light reflected from one or more object having at least a predetermined degree of propinquity to the pixel array. The light sensed by the at least one sensor may be ambient light reflected from the at least one object. Alternatively or additionally, the light sensed by the at least one sensor may be IR light reflected from the object. The at least one object may be at least one finger or at least one located device.

In another preferred embodiment, the integrated display and input device also includes utilization circuitry. The utilization circuitry preferably provides one or more or the following functionalities: chording functionality, functionality to distinguish at least between positions of the at least one object when touching and not touching the device, functionality to distinguish at least between directions of motion of the at least one object towards and away from the device, functionality to compute at least one characteristic of a trajectory of motion of the at least one object generally parallel to the pixel array, the characteristic including at least one of location, direction, velocity and change in direction, functionality for panning and scrolling, functionality for one-handed zooming, functionality for employing a sensed distinction between instances when the at least one object touches and does not touch the device, functionality for mouse over and click, functionality for turning pages, functionality for gaming and functionality utilizing differences in sensed relative positions of a user's fingers.

Figure 1A:
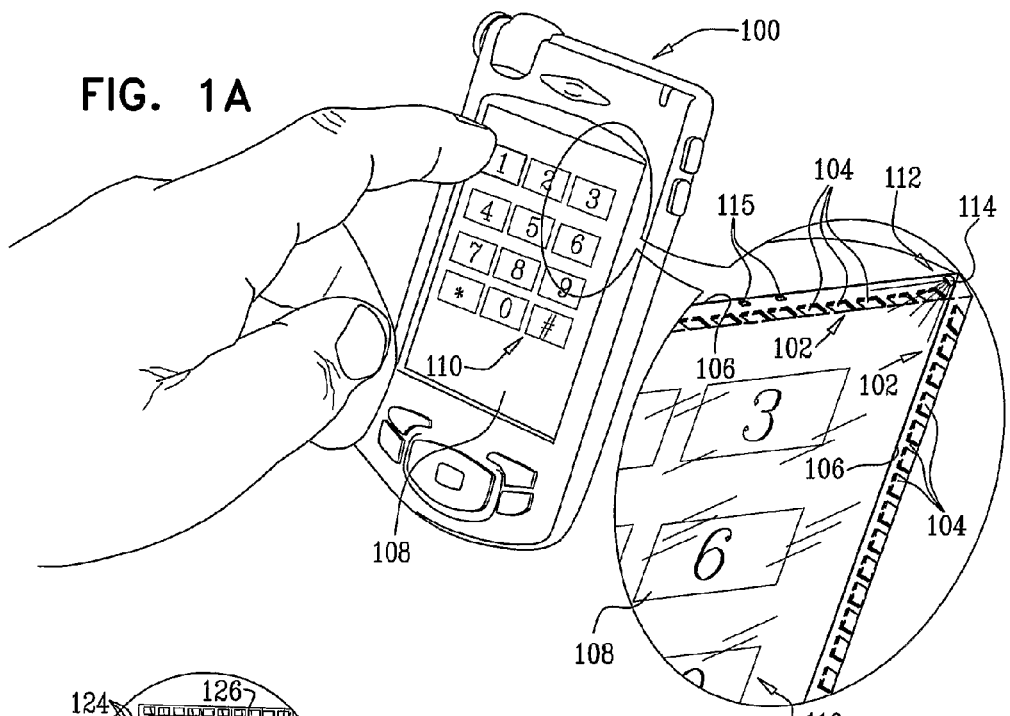
FIGS. 1A, 1B, 1C and 1D are simplified illustrations of four types of integrated display and input devices constructed and operative in accordance with a preferred embodiment of the present invention.

FIG. 1A illustrates a mobile telephone 100 having a touch responsive input functionality employing light reflection in accordance with a preferred embodiment of the present invention. As seen in FIG. 1A5 arrays 102 of light detector elements 104 are arranged along at least two mutually perpendicular edge surfaces 106 of a viewing plane defining plate 108 overlying a keyboard template display 110. Suitable detector elements are, for example, Solderable Silicon Photodiodes commercially available from Advanced Photonix Incorporated of Camarillo, Calif., USA under catalog designator PDB-C601-1. Arrays 102 may be provided along all or most of edge surfaces 106. Alternatively, a single array 102 may be provided along only one edge surface 106 of plate 108. Viewing plane defining plate 108 may be a single or multiple layer plate and may have one or more coating layers associated therewith. Light, preferably including light in the IR band, is reflected from a user's finger, a stylus (not shown) or any other suitable reflective object, touching or located in propinquity to plate 108. The light is propagated within plate 108 and is detected by detector elements 104.

Figure 18A:
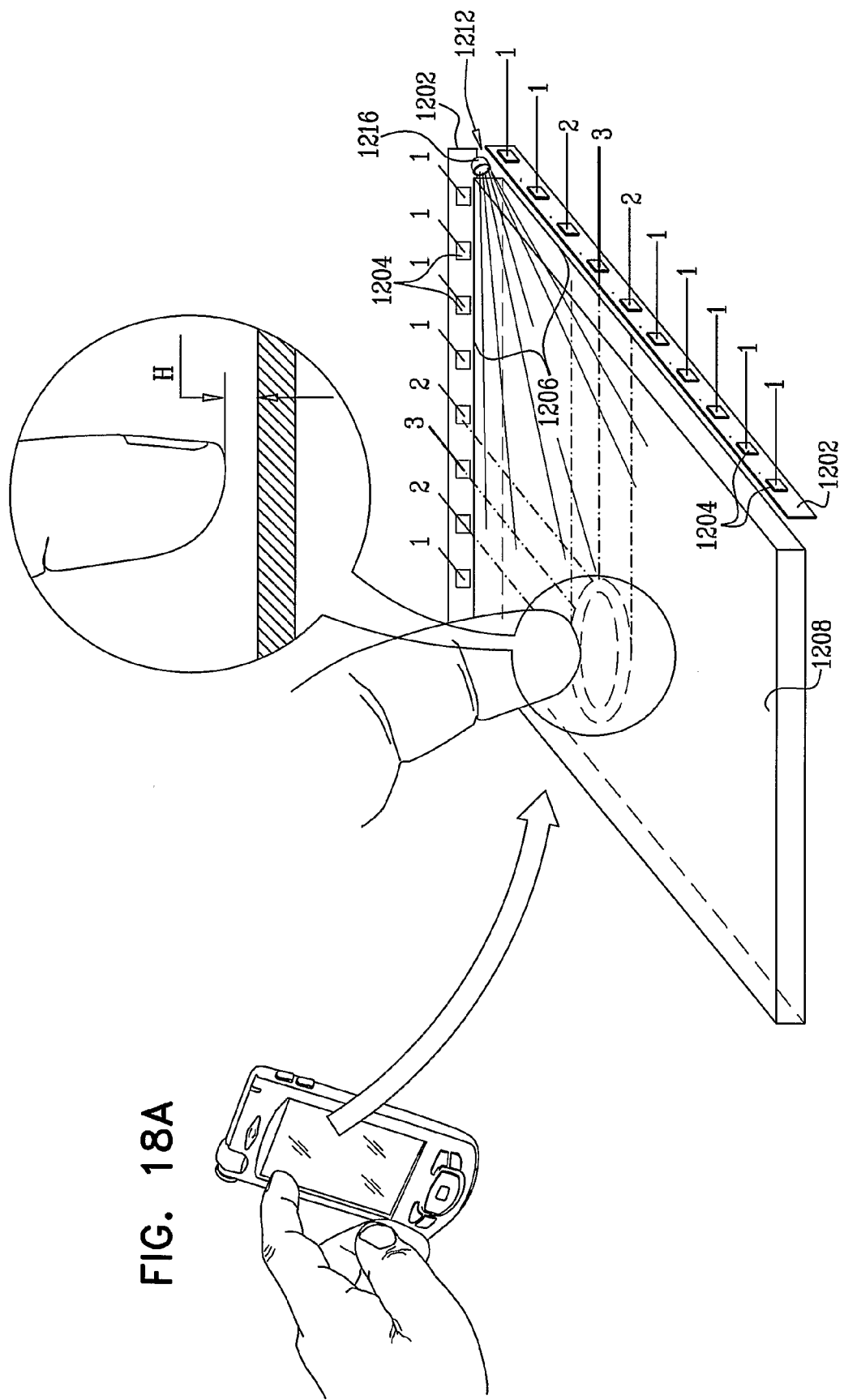
Figure 18B:
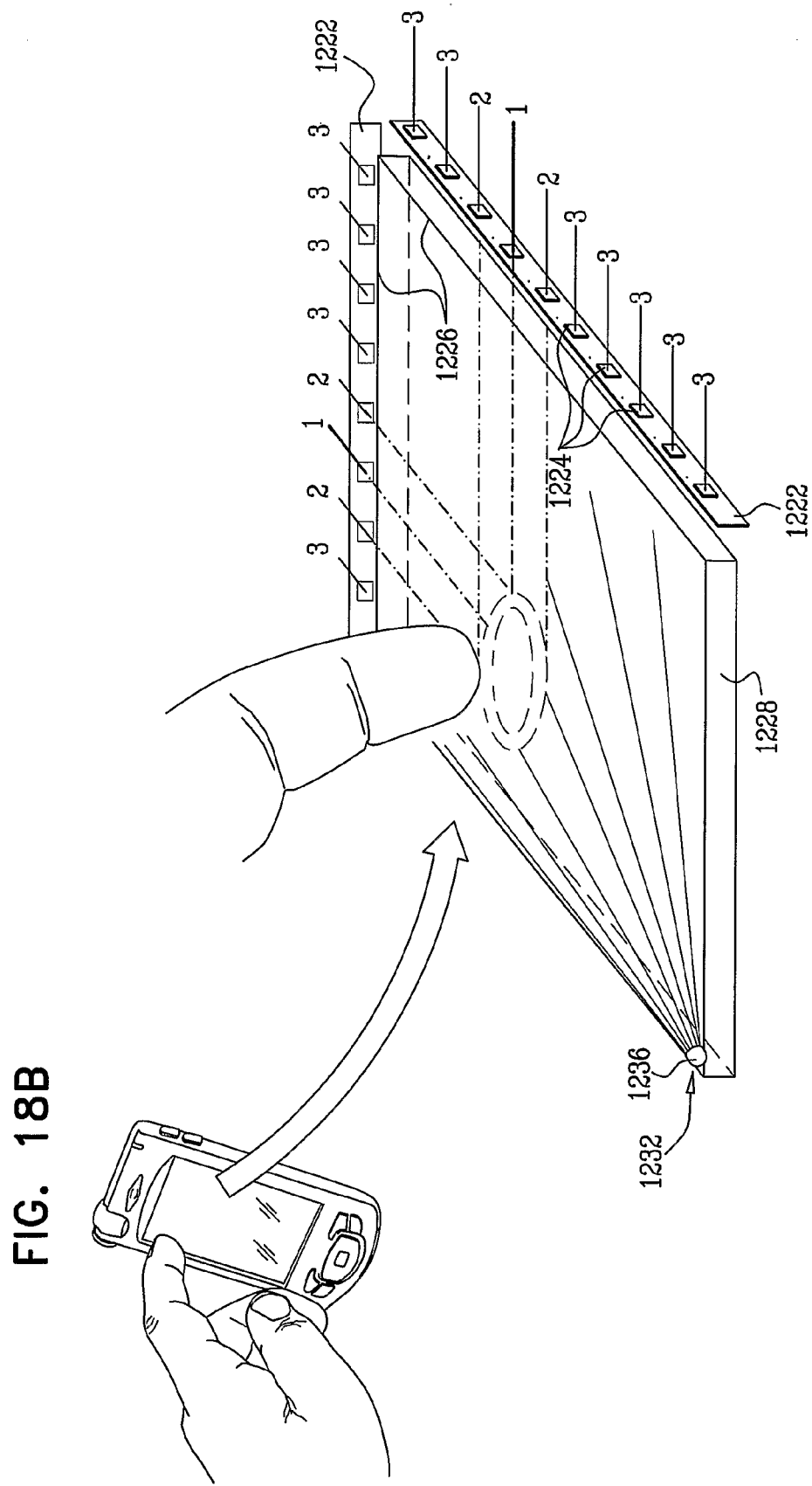
Figure 18C:
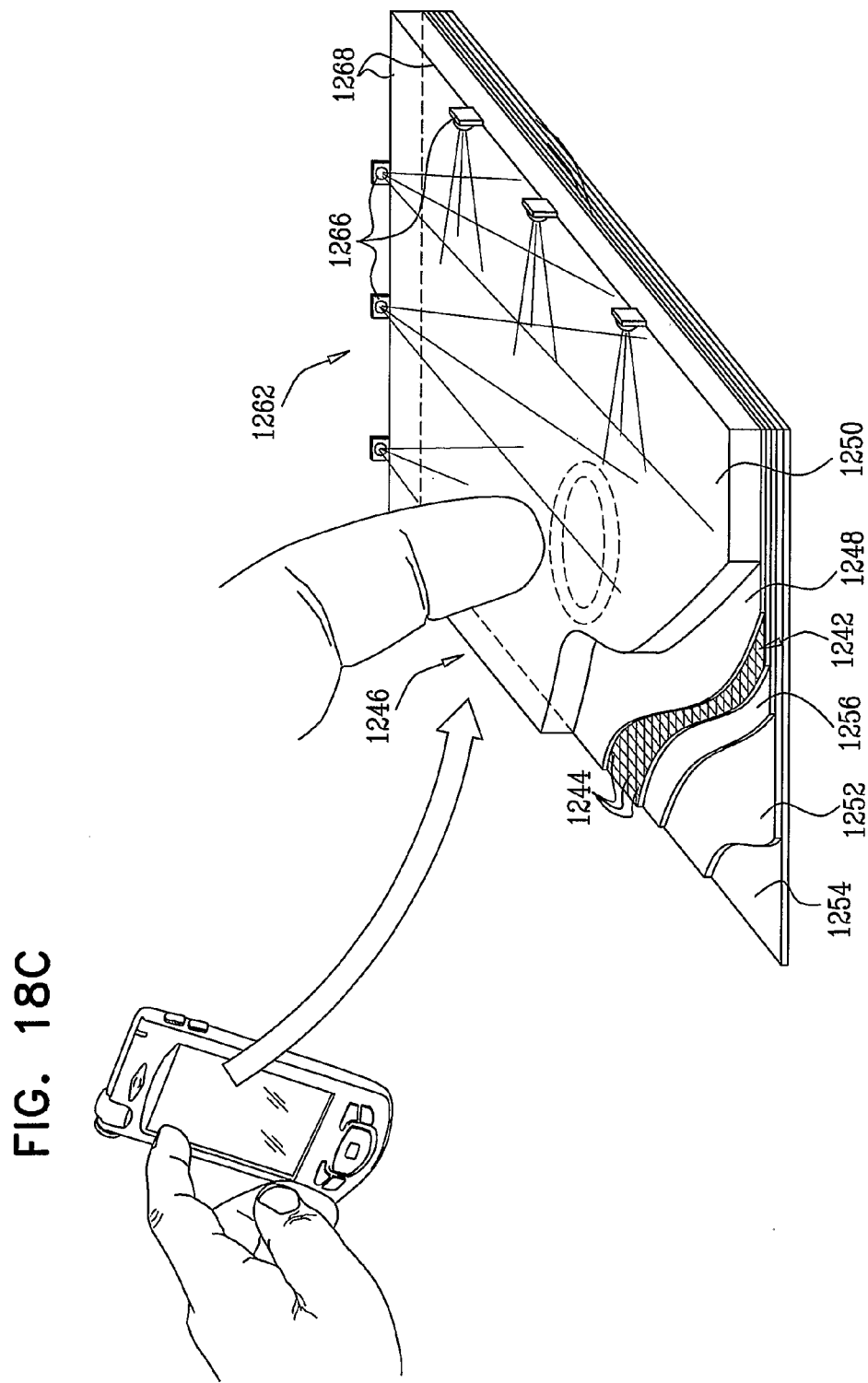
Figure 18E:
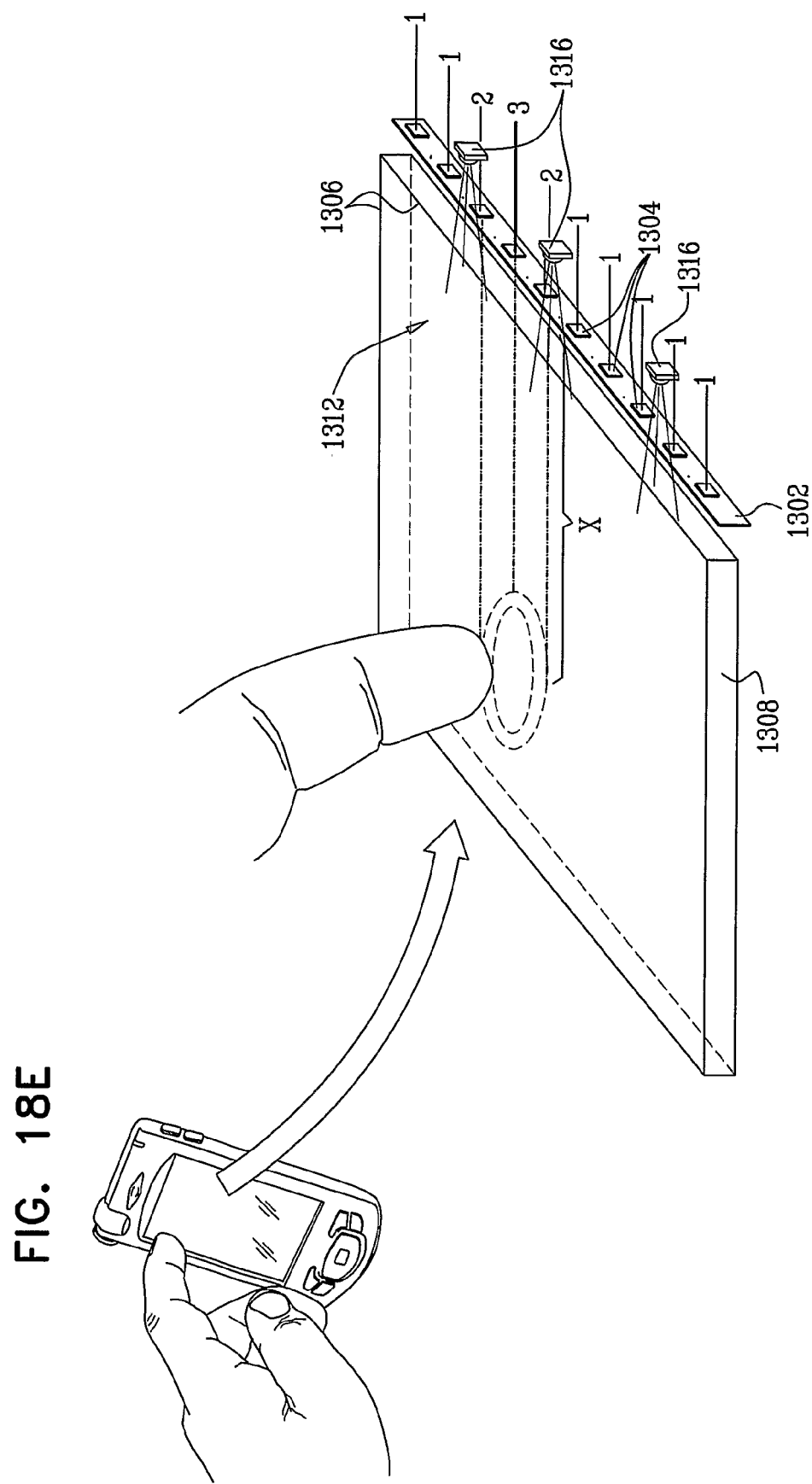
Figure 18F:
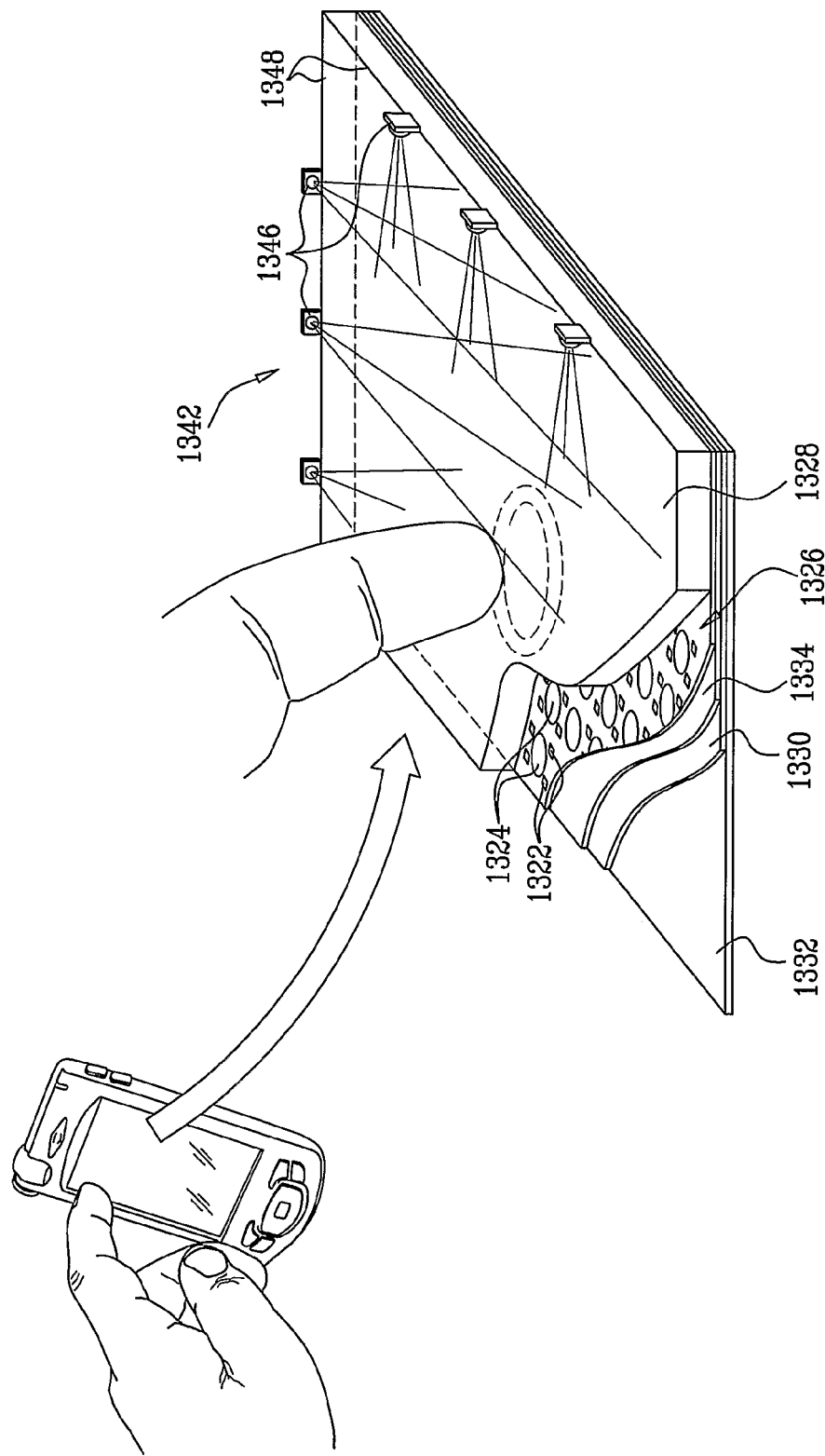
Figure 19:
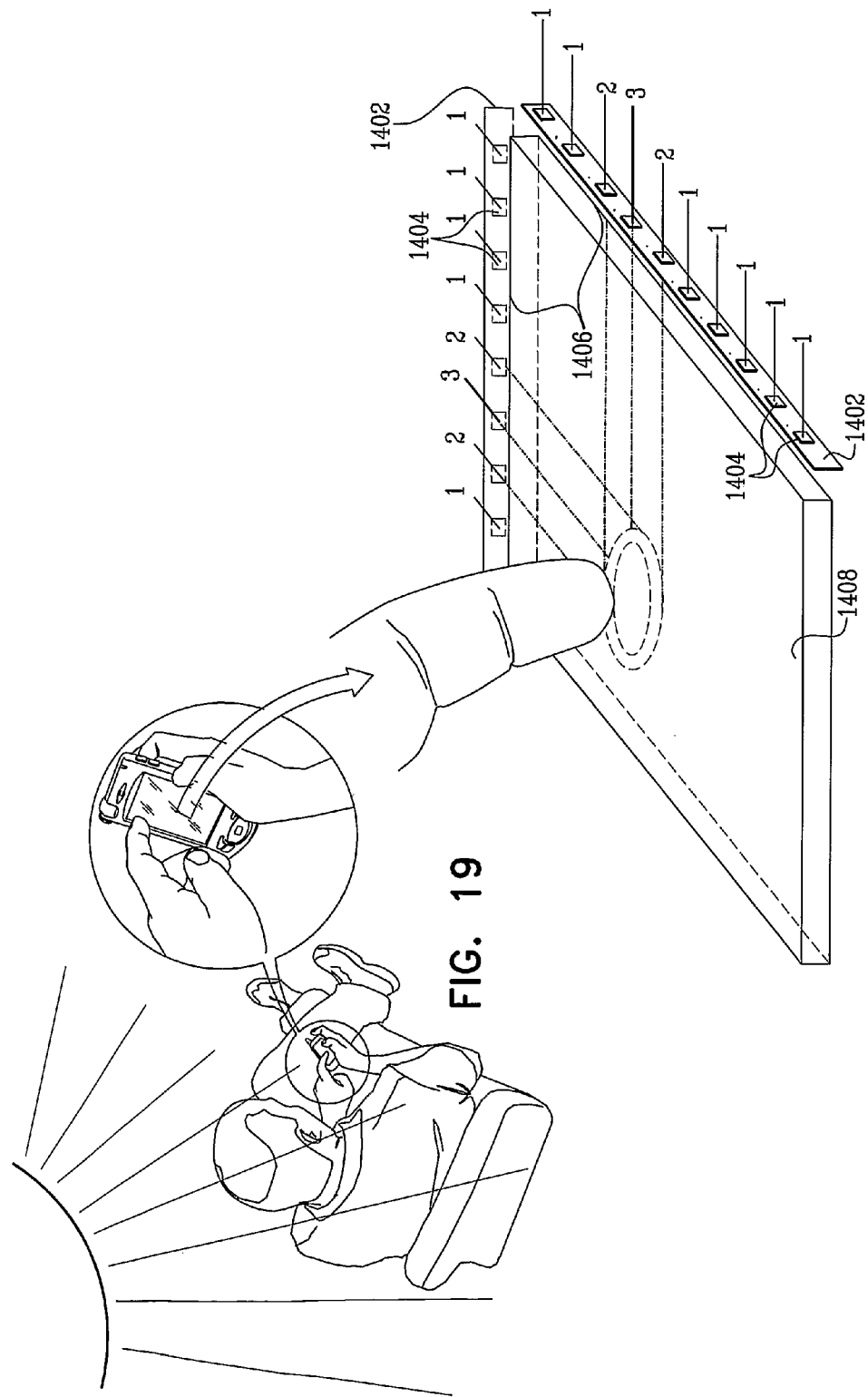
FIG. 19 is a simplified illustration of an integrated display and input device constructed and operative in accordance with a preferred embodiment of the present invention, utilizing electromagnetic radiation from a source external to the integrated display and input device.

The source of the reflected light is preferably external to the mobile telephone 100, for example as shown in FIG. 19. Suitable external light sources include sunlight, artificial room lighting and IR illumination emitted from a human body or other heat source. In an alternate preferred embodiment, the source of the reflected light may comprise an illumination subassembly 112 which typically includes one or more electromagnetic radiation emitting sources, here shown as a single IR emitting LED 114. Additional electromagnetic radiation sources 115 may be provided. The illumination subassembly 112 preferably forms part of the integrated display and input device. Examples of various suitable configurations of illumination subassembly 112 are described herein below in FIGS. 18A-18F. Optionally, the light emitted by LED 114 may be modulated by modulating circuitry (not shown).

Figure 1B:
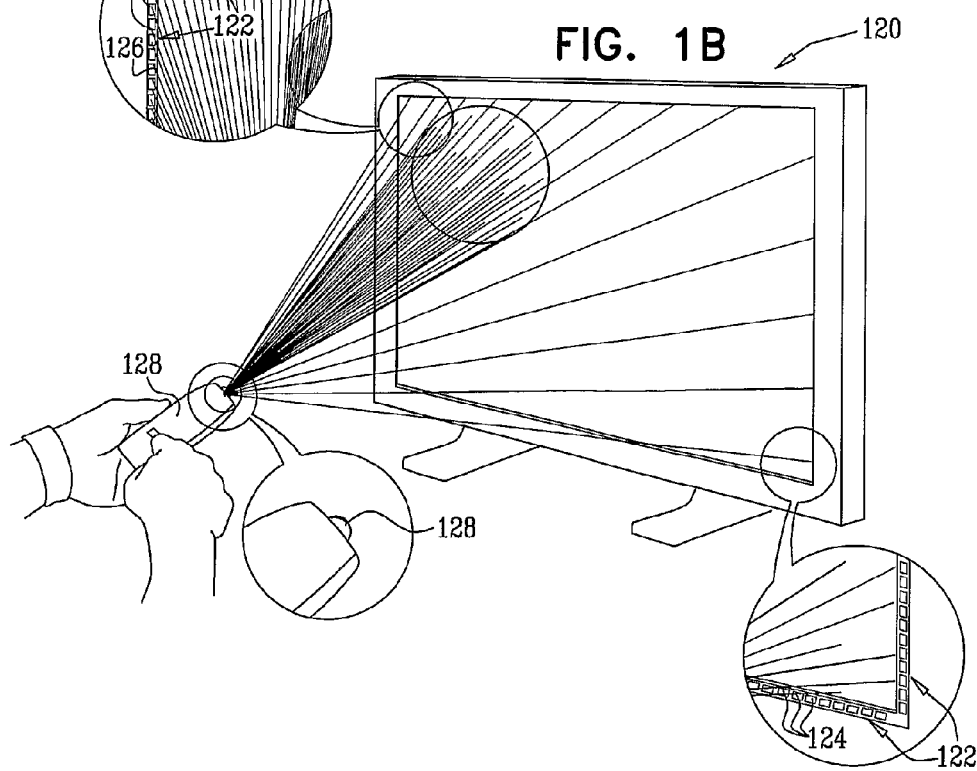

FIG. 1B illustrates a large screen display 120, such as a television display, having a light beam responsive input functionality operative in accordance with a preferred embodiment of the present invention. As seen in FIG. 1B, arrays 122 of generally forward-looking light detector elements 124 are arranged generally along at least two mutually perpendicular edges 126 of display 120. Arrays 122 may be provided along all or most of edges 126. Alternatively, a single array 122 may be provided along only one edge 126 of display 120. Light, preferably including light in the IR band emitted by a light beam emitter 128, is detected directly by one or more of detector elements 124.

Figure 1C:
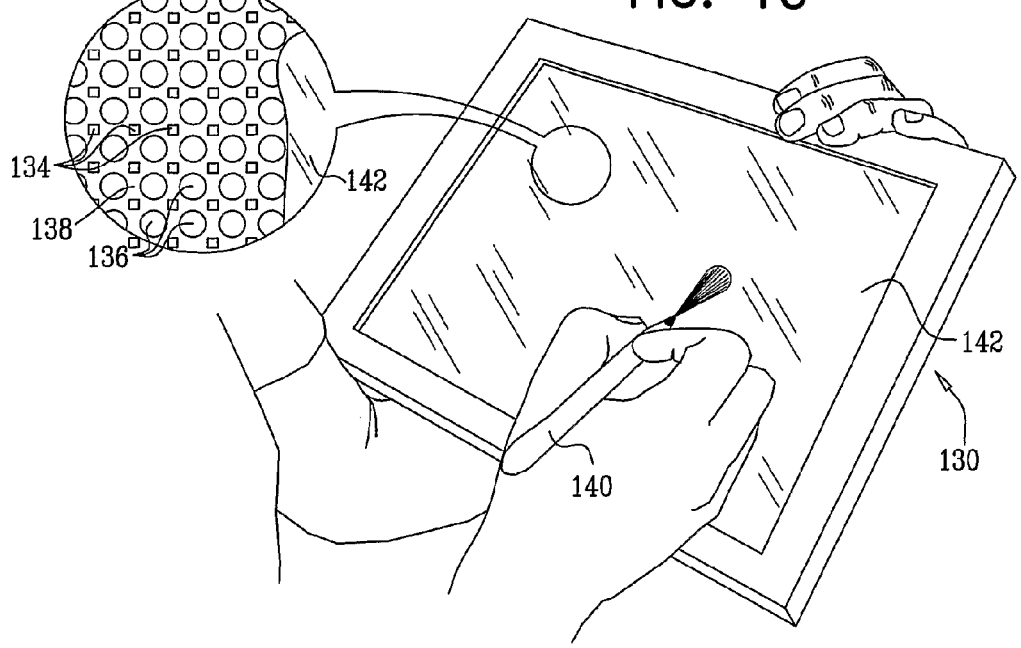

FIG. 1C illustrates a tablet computer 130 having a light beam responsive input functionality operative in accordance with a preferred embodiment of the present invention. As seen in FIG. 1C, a multiplicity of light detector elements 134 are interspersed among light emitters 136 arranged in a plane 138. Examples of such a structure are described in U.S. Pat. No. 7,034,866 and U.S. Patent Application Publication Nos. 2006/0132463A1, 2006/0007222 A1 and 2004/00012565A1, the disclosures of which are hereby incorporated by reference. Light, preferably including light in the IR band, emitted by a light beam emitter 140, propagates through at least one cover layer 142 and is detected by one or more of detector elements 134.

Figure 1D:
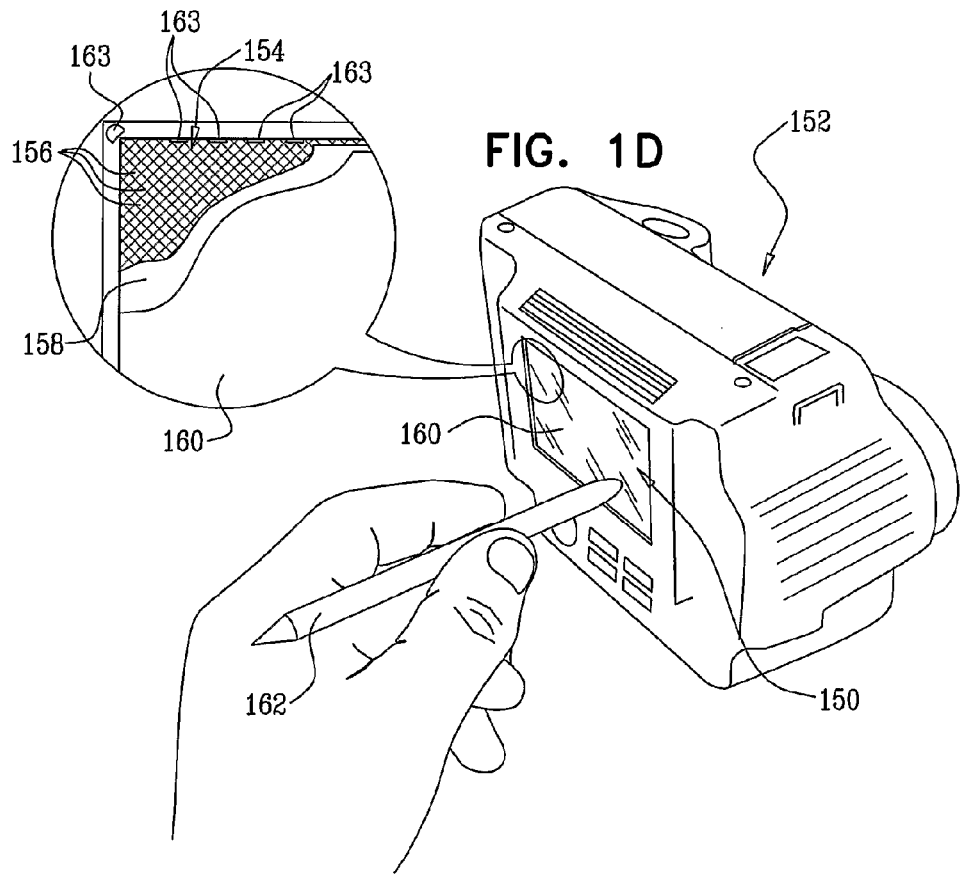

FIG. 1D illustrates a display 150 of a digital camera 152 having a touch responsive input functionality employing light reflection in accordance with a preferred embodiment of the present invention. As seen in FIG. 1D, an array 154 of light detector elements 156 is arranged behind an IR transmissive display panel 158, such as an LCD or OLED, underlying a viewing plane defining plate 160. Viewing plane defining plate 160 may be a single or multiple layer plate and may have one or more coating layers associated therewith. The array 154 of light detector elements 156 may be formed of a plurality of discrete detector arrays mounted on a substrate or integrally formed therewith. Alternatively, the array 154 may be formed of one or more CCD or CMOS arrays, or may be created by photolithography.

Light, preferably including light in the IR band, is reflected from a stylus 162, a user's finger (not shown) or any other suitable reflective object, touching or located in propinquity to plate 160. The light propagates through plate 160 and panel 158 and is detected by detector elements 156.

The source of the reflected light is preferably external to the digital camera 152, for example as shown in FIG. 19. Suitable external light sources include sunlight, artificial room lighting and IR illumination emitted from a human body or other heat source. In an alternate preferred embodiment, the source of the reflected light may comprise an illumination subassembly, which may include both IR and visible light emitting LEDs or LEDs having a spectral range which covers both IR and visible wavelengths. The illumination subassembly typically includes one or more electromagnetic radiation emitting sources, here shown as multiple IR emitting LEDs 163, preferably arranged adjacent to the edges of the display and at least partially behind a front face thereof. The illumination subassembly preferably forms part of the integrated display and input device. Examples of various suitable configurations of the illumination subassembly are described herein below in FIGS. 18A-18F. Optionally, the light emitted by LEDs 163 may be modulated by modulating circuitry (not shown).

Reference is now made to FIGS. 2A and 2B, which are simplified illustrations of portions of two types of integrated display and input devices constructed and operative in accordance with another preferred embodiment of the present invention. FIG. 2A shows an integrated display and input device having touch responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT International Patent Application Publication No. WO 2005/094176, the disclosures of which are hereby incorporated by reference.

FIG. 2A illustrates launching an application, such as an e-mail application, on a mobile telephone 164, by employing object detection functionality of the type described hereinabove with reference to FIG. 1C. As shown, a position of a user's finger is detected by means of a touch responsive input functionality operative in accordance with a preferred embodiment of the present invention.

As seen in FIG. 2A, a multiplicity of-light detector elements 165 are interspersed among light emitters 166 arranged in a plane 168. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference. Light, preferably including light in the IR band, reflected by the user's finger, propagates through at least one cover layer 172 and is detected by one or more of detector elements 165. The outputs of detector elements 165 are processed to indicate one or more of the X, Y, or Z positions and/or angular orientation of the user's finger. This detected position is utilized, as taught inter alia in the aforesaid U.S. Provisional Patent Application No. 60/789,188, to launch an application or control any of the other functionalities described in U.S. Provisional Patent Application No. 60/789,188.

The source of the reflected light is preferably external to the mobile telephone 164, for example as shown in FIG. 19. Suitable external light sources include sunlight, artificial room lighting and IR illumination emitted from a human body or other heat source. In an alternate preferred embodiment, the source of the reflected light may comprise an illumination subassembly 174 which typically includes one or more electromagnetic radiation emitting sources, here shown as a multiple IR emitting LEDs 178. The illumination subassembly 174 preferably forms part of the integrated display and input device. Examples of various suitable configurations of illumination subassembly 174 are described herein below in FIGS. 18A-18F. Optionally, the light emitted by LEDs 178 may be modulated by modulating circuitry (not shown).

FIG. 2B shows an integrated display and input device having light beam impingement responsive input functionality, which is useful for application selection and operation, such as email communication and internet surfing. The input functionality may incorporate any one or more features of assignee's U.S. Provisional Patent Application Nos. 60/715, 546; 60/734,027; 60/789,188 and 60/682,604, U.S. Patent Application Publication No. 2005/0156914A1 and PCT International Patent Application Publication No. WO 2005/094176, the disclosures of which are hereby incorporated by reference.

FIG. 2B illustrates launching an application, such as an e-mail application, on a mobile telephone 182, by employing object detection functionality of the type described hereinabove with reference to FIG. 1CA position of a stylus 183 is detected by means of a light beam responsive input functionality operative in accordance with a preferred embodiment of the present invention. As seen in FIG. 2B, a multiplicity of light detector elements 184 are interspersed among light emitters 186 arranged in a plane 188. Examples of such a structure are described in U.S. Pat. No. 7,034,866 and U.S. Patent Application Publication Nos. 2006/0132463A1, 2006/0007222A1, and 2004/00012565A1, the disclosures of which are hereby incorporated by reference. Light, preferably including light in the IR band, emitted by stylus 183, propagates through at least one cover layer 190 and is detected by one or more of detector elements 184. The outputs of detector elements 184 are processed to indicate one or more of the X, Y, or Z positions and/or angular orientation of the stylus 183. This detected position is utilized, as taught inter alia in the aforesaid U.S. Provisional Patent Application No. 60/789,188, to launch an application or control any of the other functionalities described in U.S. Provisional Patent Application No. 60/789,188.

Reference is now made to FIGS. 3A and 3B, which are simplified illustrations of portions of two types of integrated display and input devices constructed and operative in accordance with yet another preferred embodiment of the present invention, employing elements arranged in parallel planes, parallel to a viewing plane.

FIG. 3A shows an integrated display and input system having touch responsive input functionality, which is useful for application selection and operation, such as email communication and internet surfing. The input functionality may incorporate any one or more features of assignee's U.S. Provisional Patent Application Nos. 60/715,546; 60/734, 027; 60/789,188 and 60/682,604, U.S. Patent Application Publication No. 2005/0156914A1 and PCT International Patent Application Publication No. WO 2005/094176, the disclosures of which are hereby incorporated by reference. The touch responsive functionality preferably employs an integrated display and input system including an array 200 of detector elements 202 arranged in a plane, parallel to a viewing plane 204. In accordance with a preferred embodiment of the present invention the array 200 is formed of a plurality of discrete detector elements 202 placed on a plane integrally formed therewith. Alternatively, the array 200 may be formed of one or more CCD or CMOS arrays, or may be created by photolithography.

As seen in FIG. 3A, in one example of a display and input system structure, array 200 is arranged behind an IR transmissive display panel 206, such as a panel including LCD or OLED elements, underlying a viewing plane defining plate 208. Viewing plane defining plate 208 may be a single or multiple layer plate and may have one or more coating layers associated therewith. In one example of an integrated display and input system employing an LCD, there are provided one or more light diffusing layers 210 overlying a reflector 212. One or more collimating layers 214 are typically interposed between reflector 212 and IR transmissive display panel 206.

FIG. 3A illustrates launching an application, such as an e-mail application, on a mobile telephone 216, by employing object detection functionality of the type described hereinabove with reference to FIG. 1D. As shown, a position of a user's finger is detected by means of a touch responsive input functionality operative in accordance with a preferred embodiment of the present invention. Light, preferably including light in the IR band, reflected by the user's finger, propagates through plate 208 and panel 206 and is detected by detector elements 202. The outputs of detector elements 202 are processed to indicate one or more of the X, Y or Z positions and/or angular orientation of the user's finger. This detected position is utilized, as taught inter alia in the aforesaid U.S. Provisional Patent Application No. 60/789, 188, to launch an application or control any of the other functionalities described in U.S. Provisional Patent Application No. 60/789,188.

The source of the reflected light is preferably external to the mobile telephone 216, for example as shown in FIG. 19. Suitable external light sources include sunlight, artificial room lighting and IR illumination emitted from a human body or other heat source. In an alternate preferred embodiment, the source of the reflected light may comprise an illumination subassembly 222 which typically includes one or more electromagnetic radiation emitting sources, here shown as multiple IR emitting LEDs 224. The illumination subassembly 222 preferably forms part of the integrated display and input device. Examples of various suitable configurations of illumination subassembly 222 are described herein below in FIGS. 18A-18F. Optionally, the light emitted by LEDs 224 may be modulated by modulating circuitry (not shown).

FIG. 3B shows an integrated display and input device having light beam impingement responsive input functionality, which is useful for application selection and operation, such as email communication and internet surfing. The input functionality may incorporate any one or more features of assignee's U.S. Provisional Patent Application Nos. 60/715, 546; 60/734,027; 60/789,188 and 60/682,604, U.S. Patent Application Publication No. 2005/0156914A1 and PCT International Patent Application Publication No. WO-2005/094176, the disclosures of which are hereby incorporated by reference. The light beam impingement responsive functionality preferably employs an integrated display and input system including an array 250 of detector elements 252 arranged in a plane, parallel to a viewing plane 254. In accordance with a preferred embodiment of the present invention the array 250 is formed of a plurality of discrete detector elements 252 placed on a plane integrally formed therewith. Alternatively, the array 250 may be formed of one or more CCD or CMOS arrays, or may be created by photolithography.

As seen in FIG. 3B, array 250 is arranged behind an IR transmissive display panel 256, such as a panel including LCD or OLED elements, underlying a viewing plane defining plate 258. Viewing plane defining plate 258 may be a single or multiple layer plate and may have one or more coating layers associated therewith. In another example of an integrated display and input device employing an LCD, interposed between array 250 and IR transmissive display panel 256, there are provided one or more light diffusing layers 260 overlying an IR transmissive reflector 262. One or more collimating layers 264 are typically interposed between IR transmissive reflector 262 and IR transmissive display panel 256.

FIG. 3B illustrates launching an application, such as an e-mail application on a mobile telephone 266, by employing object detection functionality of the type described hereinabove with reference to FIG. 1D. A position of a stylus 268 is detected by means of a light beam responsive input functionality operative in accordance with a preferred embodiment of the present invention. Light, preferably including light in the IR band, emitted by stylus 268, propagates through plate 258, panel 256, one or more of layers 264 and layers 260 and through IR transmissive reflector 262, and is detected by one or more of detector elements 252. The outputs of detector elements 252 are processed to indicate one or more of the X, Y, or Z positions and/or angular orientation of the stylus 268. This detected position is utilized, as taught inter alia in the aforesaid U.S. Provisional Patent Application No. 60/789,188, to launch an application or control any of the other functionalities described in U.S. Provisional Patent Application No. 60/789,188.

Reference is now made to FIG. 4, which is a simplified illustration of a portion of an input device constructed and operative in accordance with still another preferred embodiment of the present invention, employing detector elements arranged along edges of a display element. In the structure of FIG. 4, at least one detector assembly 300 is arranged along at least one edge 302 of a viewing plane defining plate 304 to sense light impinging on plate 304 and propagating within the plate 304 to the edges 302 thereof. Viewing plane defining plate 304 may be a single or multiple layer plate and may have one or more coating layers associated therewith. Preferably, detector assemblies 300 are provided along at least two mutually perpendicular edges 302, as shown, though detector assemblies 300 may be provided along all or most of edges 302. Alternatively a single detector assembly 300 may be provided along only one edge 302 of plate 304. In accordance with a preferred embodiment of the present invention, the detector assembly 300 comprises a support substrate 306 onto which is mounted a linear arrangement 308 of detector elements 310. Interposed between linear arrangement 308 and edge 302 is a cover layer 312. Cover layer 312 may have multiple functions including physical protection, light intensity limitation, and field-of-view limitation and may have optical power. Cover layer 312 may be formed of glass or any other suitable light transparent material, or of a suitably apertured opaque material, such as metal.

The support substrate 306 may be mounted onto a display housing (not shown) or may be integrally formed therewith. The support substrate 306 may alternatively be mounted onto an edge 302 of plate 304. The support substrate 306 may be formed of a ceramic material, a material such as FR-4 which is commonly used for PCBs, glass, plastic or a metal such as aluminum. The support substrate 306 may also provide mounting for and electrical connections to the detector elements 310. A processor 314 for processing the outputs of the detector elements 310 may also be mounted on the support substrate 306. It is a particular feature of this embodiment of the present invention that the detector assembly 300 is' extremely thin, preferably under 1 mm overall.

Accordingly, the support substrate 306 is preferably 50-200 microns in thickness, the linear arrangement 308 of detector elements 310 is preferably 100-400 microns in thickness and the cover layer 312 is preferably 100-500 microns in thickness.

The input device shown in FIG. 4 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 316 which typically includes one or more electromagnetic radiation emitting sources, here shown as multiple IR emitting LEDs 318 mounted about diffusing and collimating layers 319 generally as shown in FIG. 18D. The illumination subassembly 316 preferably forms part of the integrated display and input device. Examples of various suitable configurations of illumination subassembly 316 are described herein below in FIGS. 18A-18F. Optionally, the light emitted by LEDs 318 may be modulated by modulating circuitry (not shown). Reference is now made to FIG. 5, which is a simplified illustration of a portion of an input device constructed and operative in accordance with a further preferred embodiment of the present invention, employing detector elements arranged along edges of a display element. In the structure of FIG. 5, at least one detector assembly 320 is arranged along at least one edge 322 of a viewing plane defining plate 324 to sense light impinging on plate 324 and propagating within the plate 324 to the edges 322 thereof. Viewing plane defining plate 324 may be a single or multiple layer plate and may have one or more coating layers associated therewith. Preferably, detector assemblies 320 are provided along at least two mutually perpendicular edges 322, as shown, though detector assemblies 320 may be provided along all "or most of edges 322. Alternatively a single detector assembly 320 may be provided along only one edge 322 of plate 324.

In accordance with a preferred embodiment of the present invention, the detector assembly 320 comprises a support substrate 326 onto which is mounted a linear arrangement 328 of detector elements 330. Interposed between linear arrangement 328 and edge 322 is a cover layer 332. In the illustrated embodiment, cover layer 332 is a field-of-view defining mask having apertures 333 formed therein, in sizes and arrangements which provide desired fields-of-view for the various corresponding detector elements 330. Depending on the thickness of layer 332, each detector element 330 may have associated therewith a single aperture 333 or a plurality of smaller apertures, here designated by reference numeral 334. The selection of aperture size and distribution is determined in part by the mechanical strength of layer 332. Layer 332 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 330. Extent of field-of-view limiting may be controlled by the size, pitch and arrangement of apertures 333 and their locations with respect to and distances from detector elements 330. In accordance with a preferred embodiment, the field-of-view limiting functionality limits the field-of-view of at least one of detector elements 330 to a solid angle of less than or equal to 15 degrees. In accordance with another preferred embodiment, the field-of-view limiting functionality limits the field-of-view of at least one of detector elements 330 to a solid angle of less than or equal to 7 degrees.

The support substrate 326 may be mounted onto a display housing (not shown) or may be integrally formed therewith. The support substrate 326 may alternatively be mounted onto an edge 322 of plate 324. The support substrate 326 may be formed of a ceramic material, a material such as FR-4 which is commonly used for PCBs, glass, plastic or a metal such as aluminum. The support substrate 326 may also provide mounting for and electrical connections to the detector elements 330. A processor 335 for processing the outputs of the detector elements 330 may also be mounted on the support substrate 326. The input device shown in FIG. 5 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 336 which typically includes one or more electromagnetic radiation emitting sources, here shown as multiple IR emitting LEDs 338 mounted about diffusing and collimating layers 339 generally as shown in FIG. 18D. The illumination subassembly 336 preferably forms part of the integrated display and input device. Examples of various suitable configurations of illumination subassembly 336 are described herein below in FIGS. 18A-18F. Optionally, the light emitted by LED 338 may be modulated by modulating circuitry (not shown). Reference is now made to FIG. 6, which is a simplified illustration of a portion of an input device constructed and operative in accordance with a yet further preferred embodiment of the present invention, employing detector elements arranged along edges of a display element. In the structure of FIG. 6, at least one detector assembly 340 is arranged along at least one edge 342 of a viewing plane defining plate 344 to sense light impinging on plate 344 and propagating within the plate 344 to the edges 342 thereof. Viewing plane defining plate 344 may be a single or multiple layer plate and may have one or more coating layers associated therewith. Preferably, detector assemblies 340 are provided along at least two mutually perpendicular edges 342, as shown, though detector assemblies 340 may be provided along all or most of edges 342. Alternatively, a single detector assembly 340 may be provided along only one edge 342 of plate 344.

In accordance with a preferred embodiment of the present invention, the detector assembly 340 comprises a support substrate 346 onto which is mounted a linear arrangement 348 of detector elements 350. Interposed between linear arrangement 348 and edge 342 is a cover layer 352.

The embodiment of FIG. 6 differs from that of FIG. 5 in that the cover layer 352 is substantially thicker than cover layer 332 and is preferably at least 200 microns in thickness. Layer 352 has apertures 353 formed therein, which apertures 353 define light collimating tunnels. Apertures 353 are formed in layer 352, in sizes and arrangements which provide desired fields-of-view for the various corresponding detector elements 350. Depending on the thickness of layer 352, each detector element 350 may have associated therewith a single tunnel-defining aperture 353 as shown or a plurality of smaller tunnel-defining apertures. The selection of aperture size and distribution is determined in part by the mechanical strength of layer 352. Layer 352 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 350. Extent of field-of-view limiting may be controlled by the size, pitch and arrangement of apertures 353 and their locations with respect to and distances from detector elements 350. In accordance with a preferred embodiment, the field-of-view limiting functionality limits the field-of-view of at least one of detector elements 350 to a solid angle of less than or equal to 15 degrees. In accordance with another preferred embodiment, the field-of-view limiting functionality limits the field-of-view of at least one of detector elements 350 to a solid angle of less than or equal to 7 degrees.

The support substrate 346 may be mounted onto a display housing (not shown) or may be integrally formed therewith. The support substrate 346 may alternatively be mounted onto an edge 342 of plate 344. The support substrate 346 may be formed of a ceramic material, a material such as FR-4 which is commonly used for PCBs, glass, plastic or a metal such as aluminum. The support substrate 346 may also provide mounting for and electrical connections to the detector elements 350. A processor 354 for processing the outputs of the detector elements 350 may also be mounted on the support substrate 346.

The input device shown in FIG. 6 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 356 which typically includes one or more electromagnetic radiation emitting sources, here shown as multiple IR emitting LEDs 358. The illumination subassembly 356 preferably forms part of the integrated display and input device. Examples of various suitable configurations of illumination subassembly 356 are described herein below in FIGS. 18A-18F. Optionally, the light emitted by LEDs 358 may be modulated by modulating circuitry (not shown). LEDs 358 are preferably configured and positioned so as to provide a relatively wide angular range of illumination but without shining directly onto detector elements 350.

Reference is now made to FIG. 7, which is a simplified illustration of a portion of an input device constructed and operative in accordance with an additional preferred-embodiment of the present invention, employing detector elements arranged along edges of a display element. In the structure of FIG. 7, at least one detector assembly 360 is arranged along at least one edge 362 of a viewing plane defining plate 364 to sense light impinging on plate 364 and propagating within the plate 364 to the edges 362 thereof. Viewing plane defining plate 364 may be a single or multiple layer plate and may have one or more coating layers associated therewith. Preferably, detector assemblies 360 are provided along at least two mutually perpendicular edges 362, as shown, though detector assemblies 360 may be provided along all or most of edges 362. Alternatively, a single detector assembly 360 may be provided along only one edge 362 of plate 364.

In accordance with a preferred embodiment of the present invention, the detector assembly 360 comprises a support substrate 366 onto which is mounted a linear arrangement 368 of detector elements 370. Interposed between linear arrangement 368 and edge 362 is a cover layer 372.

The embodiment of FIG. 7 differs from that of FIGS. 5 and 6 in that apertures in the cover layer in FIGS. 5 and 6 are replaced by lenses 373 formed in cover layer 372. Lenses 373 may be integrally formed with layer 372 or may be discrete elements fitted within suitably sized and positioned apertures in an opaque substrate. Lenses 373 may be associated with tunnel-defining apertures or may comprise an array of microlenses aligned with one or more of detector elements 370.

Layer 372 may have multiple functions including physical protection, field-of-view limitation and light intensity limitation, and may have optical power. Field-of-view limiting functionality may be desirable in this context because it enhances position discrimination by limiting overlap between the fields-of-view of adjacent detector elements 370.

The support substrate 366 may be mounted onto a display housing (not shown) or may be integrally formed therewith. The support substrate 366 may alternatively be mounted onto an edge 362 of plate 364. The support substrate 366 may be formed of a ceramic material, a material such as FR-4 which is commonly used for PCBs, glass, plastic or a metal such as aluminum. The support substrate may also provide mounting for and electrical connections to the detector elements 370. A processor 374 for processing the outputs of the detector elements 370 may also be mounted on the support substrate 366.

The input device shown in FIG. 7 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 376 which typically includes one or more electromagnetic radiation emitting sources, here shown as multiple IR emitting LEDs 378. The illumination subassembly 376 preferably forms part of the integrated display and input device. Examples of various suitable configurations of illumination subassembly 376 are described herein below in FIGS. 18A-18F. Optionally, the light emitted by LEDs 378 may be modulated by modulating circuitry (not shown). Reference is now made to FIGS. 8A-8D, which are simplified illustrations of four alternative embodiments of a portion of an input device constructed and operative in accordance with another preferred embodiment of the present invention, employing detector elements arranged along edges of a display element.

In the structure of FIGS. 8A-8D, at least one detector assembly 400 is arranged along at least one edge 402 of a viewing plane defining plate 404 to sense light impinging on plate 404 and propagating within the plate 404 to the edges 402 thereof. Viewing plane defining plate 404 may be a single or multiple layer plate and may have one or more coating layers associated therewith. Preferably, detector assemblies 400 are provided along at least two mutually perpendicular edges 402, though detector assemblies 400 may be provided along all or most of edges 402. Alternatively, a single detector assembly 400 may be provided along only one edge 402 of plate 404.

In accordance with a preferred embodiment of the present invention, the detector assembly 400 comprises a support substrate 406 onto which is mounted a linear arrangement 408 of detector elements 410. As distinct from the embodiments of FIGS. 4-7, in the embodiments of FIGS. 8A-8D, the cover layer is obviated and its functionality is provided by suitable conditioning of edge 402 of viewing plane defining plate 404. This functionality may provide multiple functions including physical protection, light intensity limitation and field-of-view limitation, and may have optical power.

The support substrate 406 may be mounted onto a display housing (not shown) or may be integrally formed therewith. The support substrate 406 may alternatively be mounted onto an edge 402 of plate 404. The support substrate 406 may be formed of a ceramic material, a material such as FR-4 which is commonly used for PCBs, glass, plastic or a metal such as aluminum. The support substrate may also provide mounting for and electrical connections to the detector elements 410. A processor 414 for processing the outputs of the detector elements 410 may also be mounted on the support substrate 406.

It is a particular feature of this embodiment of the present invention that the detector assembly 400 is extremely thin, preferably under 1 mm overall. Accordingly, the support substrate 406 is preferably 50-200 microns in thickness and the linear arrangement 408 of detector elements 410 is preferably 100-400 microns in thickness.

The input devices shown in FIG. 8A-8D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 416 which typically includes one or more electromagnetic radiation emitting sources, here shown as multiple IR emitting LEDs 418. The illumination subassembly 416 preferably forms part of the integrated display and input device. Examples of various suitable configurations of illumination subassembly 416 are described herein below in FIGS. 18A-18F. Optionally, the light emitted by LEDs 418 may be modulated by modulating circuitry (not shown).

Figure 8A:
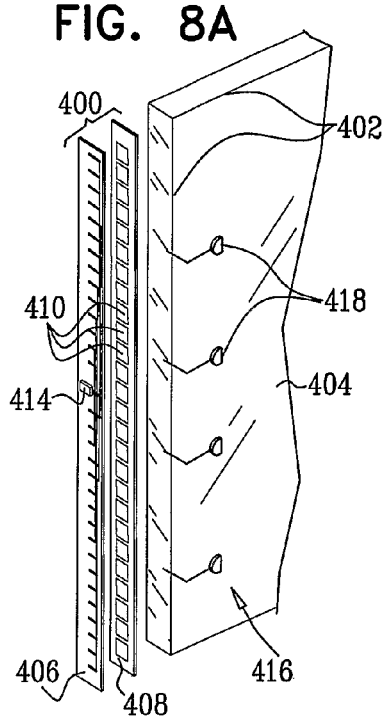
FIGS. 8A, 8B, 8C, and 8D are simplified illustrations of four alternative embodiments of a portion of an input device constructed and operative in accordance with another preferred embodiment of the present invention employing detectors arranged along edges of a display element.
Figure 8B:
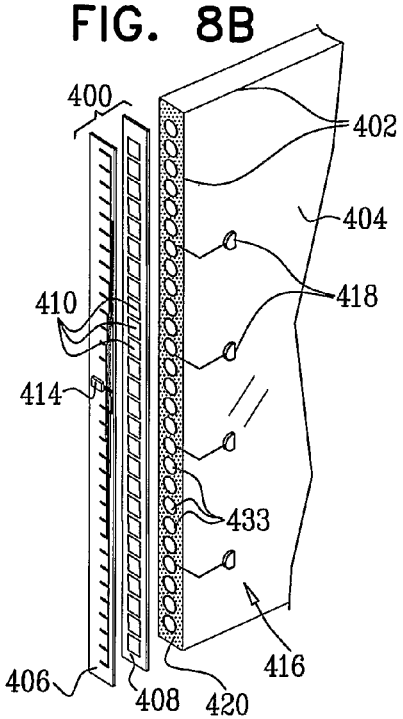

In the embodiment of FIG. 8A, edge 402 is uniformly polished for unimpeded light transmission therethrough to linear arrangement 408 of detector elements 410. Reference is now made to FIG. 8B5 in which it is seen that edge 402 is conditioned to define a field-of-view defining mask 420 having apertures 433 formed therein in sizes and arrangements which provide desired fields-of-view for the various corresponding detector elements 410. Each detector element 410 may have associated therewith a single aperture 433, as shown, or a plurality of smaller apertures.

Field-of-view limiting functionality maybe desirable in this context because it enhances resolution by limiting overlap between the fields-of-view of adjacent detector elements 410. Extent of field-of-view limiting may be controlled by the size, pitch and arrangement of apertures 433 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Figure 8C:
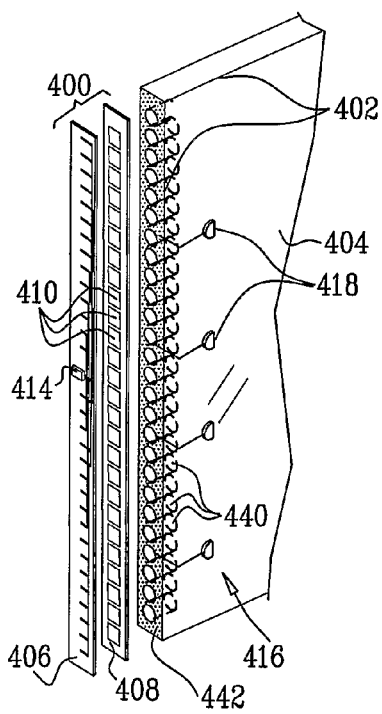

Reference is now made to FIG. 8C, which differs from that of FIG. 8B in that apertures 433 in mask 420 are replaced by light collimating tunnel-defining apertures 440 in a mask 442.

Each detector element 410 may have associated therewith a single tunnel-defining aperture 440 as shown or a plurality of smaller tunnel-defining apertures.

Field-of-view limiting functionality may be desirable in this context because it enhances resolution by limiting overlap between the fields-of-view of adjacent detector elements 410. Extent of field-of-view limiting may be controlled by the size, pitch and arrangement of apertures 440 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Figure 8D:
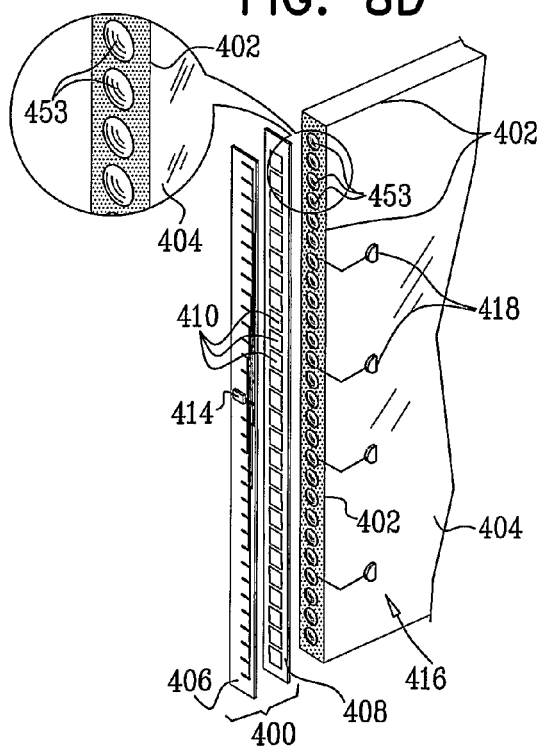

Reference is now made to FIG. 8D, which differs from that of FIGS. 8B and 8C in that the apertures in FIGS. 8B and 8C are replaced by lenses 453. Lenses 453 may be integrally formed at edges 402 or may be discrete elements fitted within suitably sized and positioned apertures in plate 404. Lenses 453 may be associated with tunnel-defining apertures or may comprise an array of microlenses aligned with one or more of detector elements 410.

Field-of-view limiting functionality may be desirable in this context because it enhances resolution by limiting overlap between the fields-of-view of adjacent detector elements 410. Extent of field-of-view limiting may be controlled by the size, pitch and arrangement of lenses 453 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Reference is now made to FIGS. 9A, 9B, 9C and 9D, which are simplified illustrations of four alternative embodiments of a portion of an input device constructed and operative in accordance with yet another preferred embodiment of the present invention, employing forward-facing detector elements arranged about edges of a display element.

In the structure of FIGS. 9A-9D, at least one detector assembly 500 is arranged about at least one edge 502 of a viewing plane defining plate 504 to sense light impinging directly onto detector assembly 500. Viewing plane defining plate 504 may be a single or multiple layer plate and may have one or more coating layers associated therewith. Light, preferably including light in the IR band, is emitted by a light beam emitter such as light beam emitter 128 in the embodiment of FIG. 1B or a light reflecting object as in the embodiment of FIG. 1A. Preferably, detector assemblies 500 are provided along at least two mutually perpendicular edges 502, though detector assemblies 500 may be provided along all or most of edges 502. Alternatively, a single detector assembly 500 may be provided along only one edge 502 of plate 504.

In accordance with a preferred embodiment of the present invention, the detector assembly 500 comprises a support substrate 506 onto which is mounted a linear arrangement 508 of detector elements 510. As distinct from the embodiments of FIGS. 8A-8D, there is provided a cover layer 512 and as distinct from the embodiments of FIGS. 4-7, the detector assembly 500 and the detector elements 510 are generally forward facing, in the sense illustrated generally in FIG. 1B and described hereinabove with respect thereto. The cover layer 512 may provide multiple functions including physical protection, light intensity limitation and field-of-view limitation, and may have optical power. The support substrate 506 may be mounted onto a display housing (not shown) or may be integrally formed therewith. The support substrate 506 may alternatively be mounted onto an edge 502 of plate 504. The support substrate 506 may be formed of a ceramic material, a material such as FR-4 which is commonly used for PCBs, glass, plastic or a metal such as aluminum. The support substrate may also provide mounting for and electrical connections to the detector elements 510. A processor 514' for processing the outputs of the detector elements 510 may also be mounted on the support substrate 506.

It is a particular feature of this embodiment of the present invention that the detector assembly 500 is extremely thin, preferably under 1 mm overall. Accordingly, the support substrate 506 is preferably 50-200 microns in thickness and the linear arrangement 508 of detector elements 510 is preferably 100-400 microns in thickness and the cover layer 512 is preferably 100-500 microns in thickness.

The input devices shown in FIG. 9A-9D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 516 which typically includes one or more electromagnetic radiation emitting sources, here shown as multiple IR emitting LEDs 518. The illumination subassembly 516 preferably forms part of the integrated display and input device. Examples of various suitable configurations of illumination subassembly 516 are described herein below in FIGS. 18A-18F. Optionally, the light emitted by LEDs 518 may be modulated by modulating circuitry (not shown).

Figure 9A:
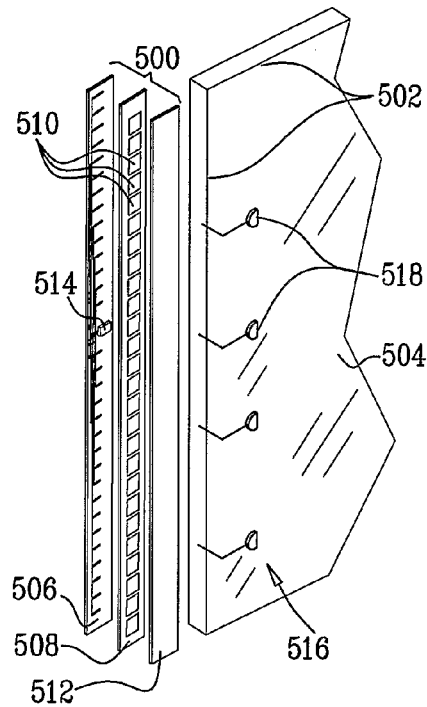
FIGS. 9A, 9B, 9C, and 9D are simplified illustrations of four alternative embodiments of a portion of an input device constructed and operative in accordance with yet another preferred embodiment of the present invention, employing forward-facing detectors arranged about edges of a display element.

In the embodiment of FIG. 9A, cover layer 512 is formed of glass or any other suitable light transparent material.

Figure 9B:
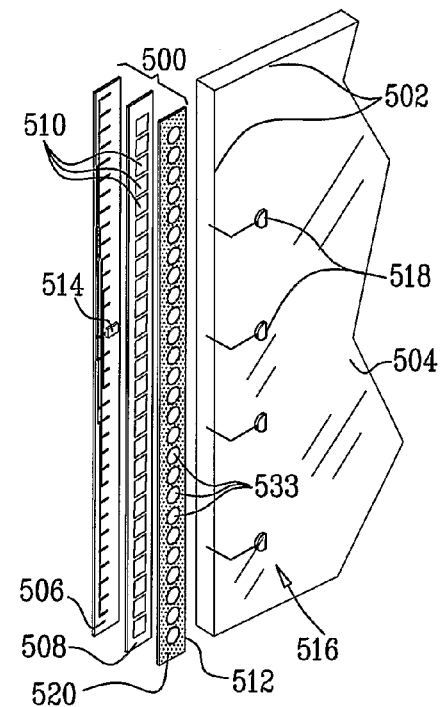

Reference is now made to FIG. 9B, in which it is seen that cover layer 512 includes a field-of-view defining mask 520 having apertures 533 formed therein in sizes and arrangements which provide desired fields-of-view for the various corresponding detector elements 510. Each detector element 510 may have associated therewith a single aperture 533, as shown, or a plurality of smaller apertures.

Field-of-view limiting functionality may be desirable in this context because it enhances resolution by limiting overlap between the fields-of-view of adjacent detector elements 510. Extent of field-of-view limiting may be controlled by the size, pitch and arrangement of apertures 533 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Figure 9C:
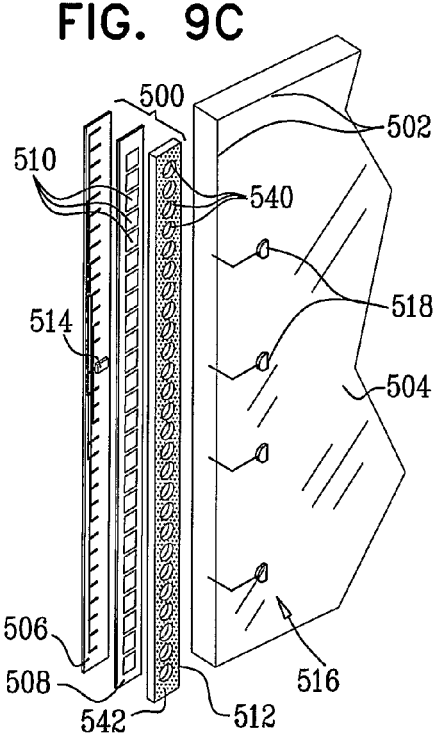

Reference is now made to FIG. 9C, which differs from that of FIG. 9B in that apertures 533 in mask 520 are replaced by light collimating tunnel-defining apertures 540 in a mask 542.

Figure 9D:
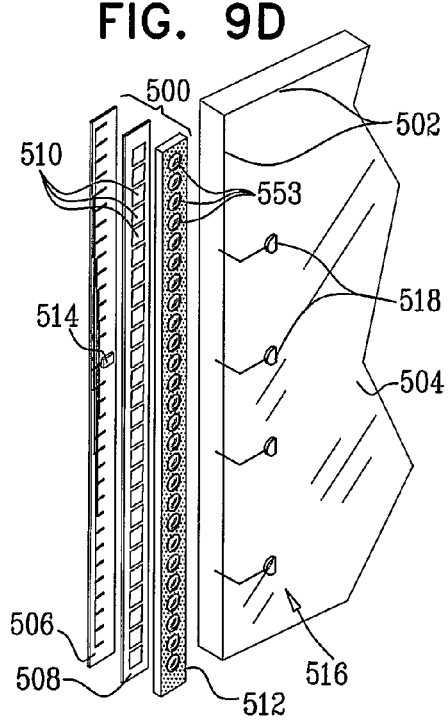

Each detector element 510 may have associated therewith a single tunnel-defining aperture 540 as shown or a plurality of smaller tunnel-defining apertures. Field-of-view limiting functionality may be desirable in this context because it enhances resolution by limiting overlap between the fields-of-view of adjacent detector elements 510. Extent of field-of-view limiting may be controlled by the size, pitch and arrangement of apertures 540 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees. Reference is now made to FIG. 9D, which differs from that of FIGS. 9B and 9G in that the apertures in FIGS. 9B and 9C are replaced by lenses 553. Lenses 553 may be integrally formed with cover layer 512 or may be discrete elements fitted within suitably sized and positioned apertures in cover layer 512. Lenses 553 may be associated with tunnel-defining apertures or may comprise an array of microlenses aligned with one or more of detector elements 510.

Field-of-view limiting functionality may be desirable in this context because it enhances resolution by limiting overlap between the fields-of-view of adjacent detector elements 510. Extent of field-of-view limiting may be controlled by the size, pitch and arrangement of lenses 553 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Reference is now made to FIGS. 10A, 10B, 10C, and 10D, which are simplified illustrations of four alternative embodiments of a portion of an input device constructed and operative in accordance with still another preferred embodiment of the present invention, employing forward-facing detector elements arranged behind edges of a display element.

In the structure of FIGS. 10A-10D, at least one detector assembly 600 is arranged behind at least one edge 602 of a viewing plane defining plate 604 to sense light impinging onto detector assembly 600 after propagating through plate 604. Viewing plane defining plate 604 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 600 are provided behind at least two mutually perpendicular edges 602, though detector assemblies 600 may be provided behind all or most of edges 602. Alternatively, a single detector assembly 600 may be provided behind only one of edges 602. In accordance with a preferred embodiment of the present invention, the detector assembly 600 comprises a support substrate 606 onto which is mounted a linear arrangement 608 of detector elements 610. Similarly to the embodiments of FIGS. 9A-9D, there is provided a cover layer 612 and as distinct from the embodiments of FIGS. 4-7, the detector assembly 600 and the detector elements 610 are generally forward facing, in the sense illustrated generally in FIG. 1B and described hereinabove with respect thereto. The cover layer 612 may provide multiple functions including physical protection, light intensity limitation and field-of-view limitation, and may have optical power.

The support substrate 606 may be mounted onto a display housing (not shown) or may be integrally formed therewith. The support substrate 606 may alternatively be mounted onto a rearward facing surface 613 of plate 604 at the edge 602 lying in front of the linear arrangement 608. The support substrate 606 may be formed of a ceramic material, a material such as FR-4 which is commonly used for PCBs, glass, plastic or a metal such as aluminum. The support substrate 606 may also provide mounting for and electrical connections to the detector elements 610. A processor 614 for processing the outputs of the detector elements 610 may also be mounted on the support substrate 606.

It is a particular feature of this embodiment of the present invention that the detector assembly 600 is extremely thin, preferably under 1 mm overall. Accordingly, the support substrate 606 is preferably 50-200 microns in thickness and the linear arrangement 608 of detector elements 610 is preferably 100-400 microns in thickness and the cover layer 612 is preferably 100-500 microns in thickness.

The input devices shown in FIG. 10A-10D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 616 which typically includes one or more electromagnetic radiation emitting sources, here shown as multiple IR emitting LEDs 618. The illumination subassembly 616 preferably forms part of the integrated display and input device. Examples of various suitable configurations of illumination subassembly 616 are described herein below in FIGS. 18A-18F. Optionally, the light emitted by LEDs 618 may be modulated by modulating circuitry (not shown).

Figure 10A:
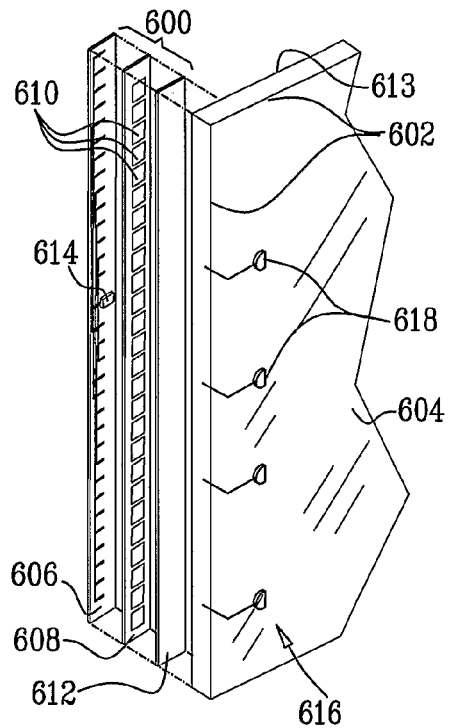
FIGS. 10A, 10B, 10C, and 10D are simplified illustrations of four alternative embodiments of a portion of an input device constructed and operative in accordance with still another preferred embodiment of the present invention, employing forward-facing detectors arranged behind edges of a display element.

In the embodiment of FIG. 10A, cover layer 612 is formed of glass or any other suitable light transparent material.

Figure 10B:
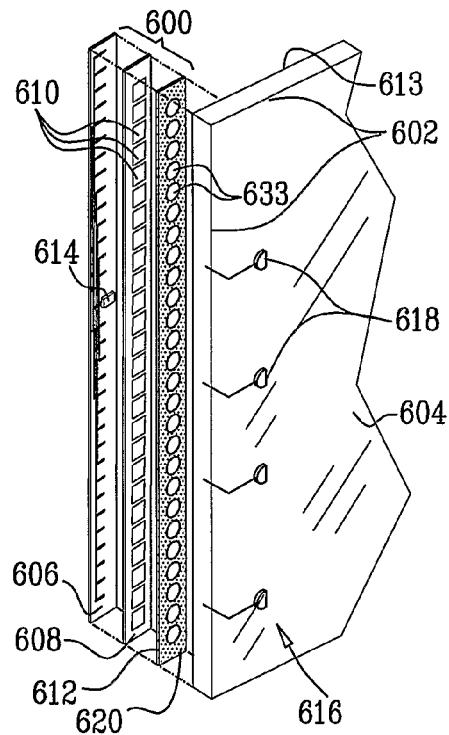

Reference is now made to FIG. 10B, in which it is seen that cover layer 612 includes a field-of-view defining mask 620 having apertures 633 formed therein in sizes and arrangements which provide desired fields-of-view for the various corresponding detector elements 610. Each detector element 610 may have associated therewith a single aperture 633 as shown or a plurality of smaller apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 633 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Figure 10C:
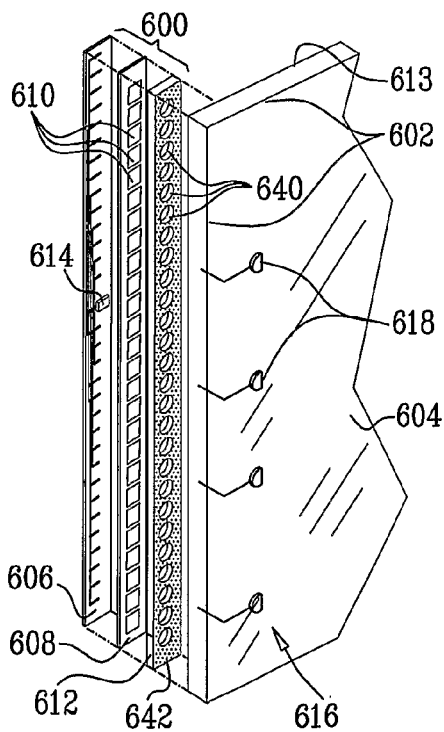

Reference is now made to FIG. 10C, which differs from that of FIG. 10B in that apertures 633 in mask 620 are replaced by light collimating tunnel-defining apertures 640 in a mask 642.

Each detector element 610 may have associated therewith a single tunnel-defining aperture 640 as shown or a plurality of smaller tunnel-defining apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 640 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Figure 10D:
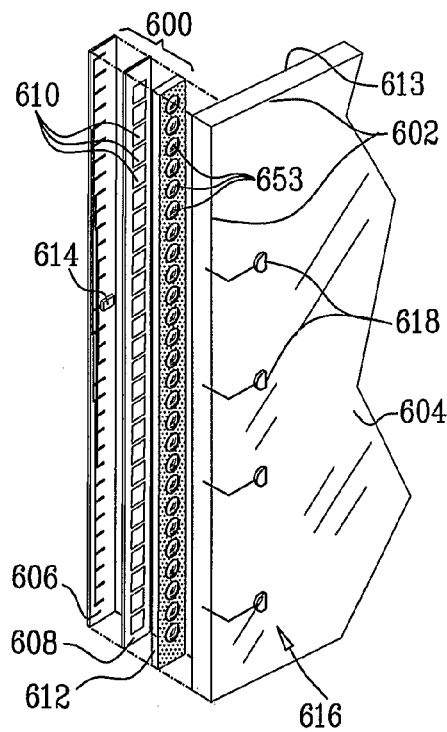

Reference is now made to FIG. 10D, which differs from that of FIGS. 10B and 10C in that the apertures in FIGS. 10B and 10C are replaced by lenses 653. Lenses 653 may be integrally formed with cover layer 612 or may be discrete elements fitted within suitably sized and positioned apertures in cover layer 612. Lenses 653 may be associated with tunnel-defining apertures or may comprise an array of microlenses aligned with one or more of detector elements 610.

Field-of-view limiting functionality may be desirable in this context because it enhances resolution by limiting overlap between the fields-of-view of adjacent detector elements 610. Extent of field-of-view limiting may be controlled by the size, pitch and arrangement of lenses 653 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Reference is now made to FIGS. 11A, 11B, 11C, and 11D which are simplified illustrations of four alternative embodiments of a portion of an input device constructed and operative in accordance with a further preferred embodiment of the present invention, employing forward-facing detector elements arranged behind edges of a display element.

In the structure of FIGS. 11A-11D, at least one detector assembly 700 is arranged behind at least one edge 702 of a viewing plane defining plate 704 to sense light impinging onto detector assembly 700 after propagating through plate 704. Viewing plane defining plate 704 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A.

Preferably, detector assemblies 700 are provided behind at least two mutually perpendicular edges 702, though detector assemblies 700 may be provided behind all or most of edges 702. Alternatively, a single detector assembly 700 may be provided behind plate 704 at only one edge thereof.

In accordance with a preferred embodiment of the present invention, the detector assembly 700 comprises a support substrate 706 onto which is mounted a linear arrangement 708 of detector elements 710. As distinct from the embodiments of FIGS. 4-7, in the embodiments of FIGS. 11A-11D, the detector assembly 700 and the detector elements 710 are generally forward facing, in the sense illustrated generally in FIG. 1B and described hereinabove with respect thereto. Also, as distinct from the embodiments of FIGS. 10A-10D, the cover layer is obviated and its functionality is provided by suitable conditioning of a rearward facing surface 711 of plate 704 at the edge 702 lying in front of the linear arrangement 708. This functionality may provide multiple functions including physical protection, light intensity limitation and field-of-view limitation, and may have optical power.

The support substrate 706 may be mounted onto a display housing (not shown) or may be integrally formed therewith. The support substrate 706 may alternatively be mounted onto the rearward facing surface 711 of plate 704 at the edge 702. The support substrate 706 may be formed of a ceramic material, a material such as FR-4 which is commonly used for PCBs, glass, plastic or a metal such as aluminum.

The support substrate may also provide mounting for and electrical connections to the detector elements 710. A processor 714 for processing the outputs of the detector elements 710 may also be mounted on the support substrate 706.

It is a particular feature of this embodiment of the present invention that the detector assembly 700 is extremely thin, preferably under 1 mm overall.

Accordingly, the support substrate 706 is preferably 50-200 microns in thickness and the linear arrangement 708 of detector elements 710 is preferably 100-400 microns in thickness.

The input devices shown in FIG. 11A-11D may also include a source of light which is preferably external to the input device, for example as shown in FIG. 19.

Suitable external light sources include sunlight, artificial room lighting and IR illumination emitted from a human body or other heat source. In an alternate preferred embodiment, the source of light may comprise an illumination subassembly 716 which typically includes one or more electromagnetic radiation emitting sources, here shown as multiple IR emitting LEDs 718. The illumination subassembly 716 preferably forms part of the integrated display and input device. Examples of various suitable configurations of illumination subassembly 716 are described herein below in FIGS. 18A-18F. Optionally, the light emitted by LEDs 718 may be modulated by modulating circuitry (not shown).

Figure 11A:
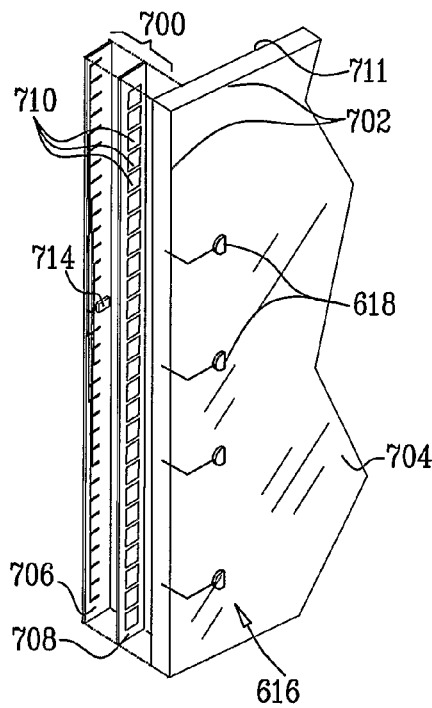
FIGS. 11A, 11B, 11C, and 11D are simplified illustrations of four alternative embodiments of a portion of an input device constructed and operative in accordance with a further preferred embodiment of the present invention, employing forward-facing detectors arranged behind edges of a display element.
Figure 11B:
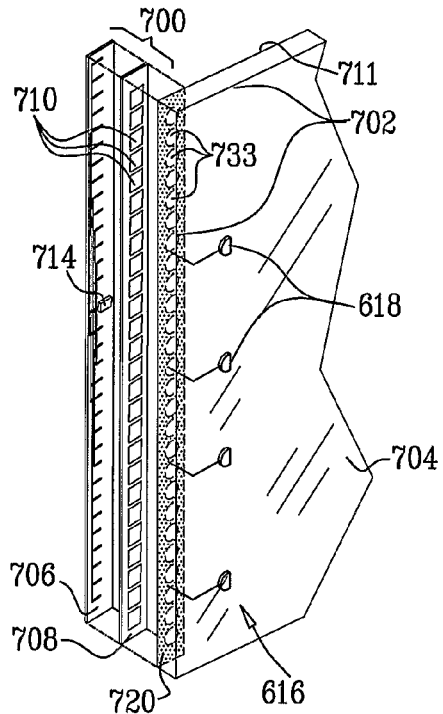

In the embodiment of FIG. 11A, the rearward facing surface 711 of plate 704 at the edge 702 lying in front of the linear arrangement 708 is uniformly polished for unimpeded light transmission therethrough to linear arrangement 708 of detector elements 710. Reference is now made to FIG. 11B, in which it is seen that the rearward facing surface 711 of plate 704 at the edge 702 lying in front of the linear arrangement 708 is conditioned to define a field-of-view defining mask 720 having apertures 733 formed therein in sizes and arrangements which provide desired fields-of-view for the various corresponding detector elements 710. Each detector element 710 may have associated therewith a single aperture 733 as shown or a plurality of smaller apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 733 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 11C:
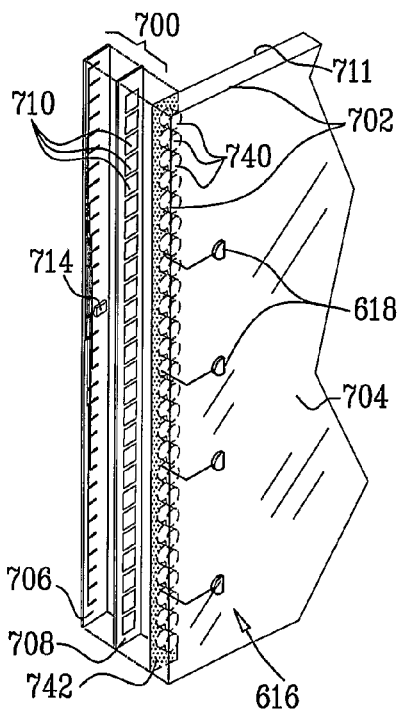

Reference is now made to FIG. 11C, which differs from that of FIG. 11B in that apertures 733 in mask 720 are replaced by light collimating tunnel-defining apertures 740 in a mask 742.

Each detector element 710 may have associated therewith a single tunnel-defining aperture 740 as shown or a plurality of smaller tunnel-defining apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 740 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 11D:
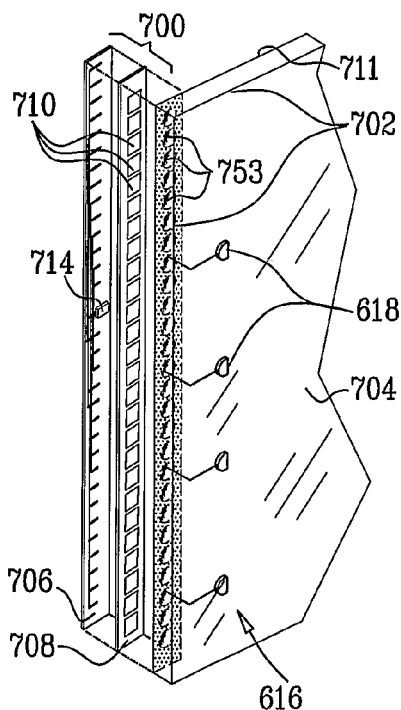

Reference is now made to FIG. 11D, which differs from that of FIGS. 11B and 11C in that the apertures in FIGS. 11B and 11C are replaced by lenses 753. Lenses 753 may be integrally formed at edges 702 or may be discrete elements fitted within suitably sized and positioned apertures in plate 704. Lenses 753 may be associated with tunnel-defining apertures or may comprise an array of microlenses aligned with one or more of detector elements 710.

Field-of-view limiting functionality may be desirable in this context because it enhances resolution by limiting overlap between the fields-of-view of adjacent detector elements 710. Extent of field-of-view limiting may be controlled by the size, pitch and arrangement of lenses 753 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Reference is now made to FIGS. 12A, 12B, 12C, and 12D, which are simplified illustrations of four alternative embodiments of a portion of an input device constructed and operative in accordance with a yet further preferred embodiment of the present invention, employing detector elements arranged along edges of a display element.

In the structure of FIGS. 12A-12D, at least one detector assembly 800 is arranged along at least one edge 802 of a viewing plane defining plate 804 to sense light impinging on plate 804 and propagating within the plate to the edges 802 thereof. Viewing plane defining plate 804 may be a single or multiple layer plate and may have one or more coating layers associated therewith. Preferably, detector assemblies 800 are provided along at least two mutually perpendicular edges 802, though detector assemblies 800 may be provided along all or most of edges 802. Alternatively, a single detector assembly 800 may be provided along only one edge 802 of plate 804.

The detector assembly 800 includes a linear arrangement 808 of detector elements 810. As distinct from the embodiments of FIGS. 8A-8D, the detector assembly 800 does not comprise a support substrate onto which is mounted a linear arrangement of detector elements. In the embodiments of FIGS. 12A-12D, the support substrate of FIGS. 8A-8D is replaced by a portion of a peripheral housing 812. Similarly to the embodiments of FIGS. 4-7 there is provided a cover layer 814 which provides multiple functions including physical protection, light intensity limitation and field-of-view limitation, and may have optical power.

The peripheral housing 812 may be formed of any suitable material including, for example, ceramic material, a material such as FR-4 which is commonly used for PCBs, glass, plastic or a metal such as aluminum. The peripheral housing 812 may also provide mounting for and electrical connections to the detector elements 810. A processor 816 for processing the outputs of the detector elements 810 may also be mounted on the peripheral housing 812.

It is a particular feature of this embodiment of the present invention that the detector assembly 800 is extremely thin, preferably under 1 mm overall. Accordingly, the linear arrangement 808 of detector elements 810 is preferably 100-400 microns in thickness.

The input devices shown in FIG. 12A-12D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 817 which typically includes one or more electromagnetic radiation emitting sources, here shown as multiple IR emitting LEDs 818. The illumination subassembly 817 preferably forms part of the integrated display and input device. Examples of various suitable configurations of illumination subassembly 817 are described herein below in FIGS. 18A-18F. Optionally, the light emitted by LEDs 818 may be modulated by modulating circuitry (not shown).

Figure 12A:
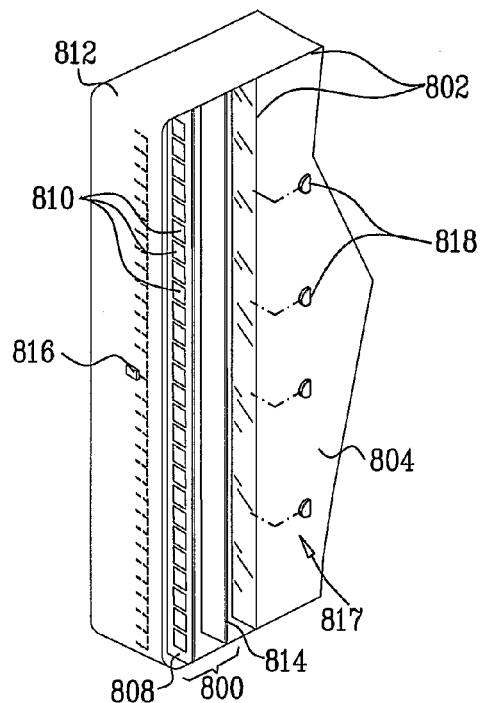
FIGS. 12A, 12B, 12C, and 12D are simplified illustrations of four alternative embodiments of a portion of an input device constructed and operative in accordance with a yet further preferred embodiment of the present invention, employing detectors arranged along edges of a display element.

In the embodiment of FIG. 12A, cover layer 814 provides generally unimpeded light transmission therethrough to linear arrangement 808 of detector elements 810.

Figure 12B:
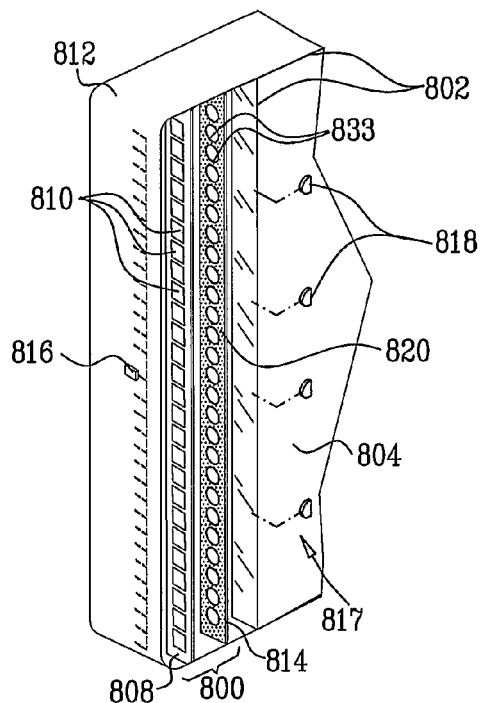

Reference is now made to FIG. 12B, in which it is seen that cover layer 814 defines a field-of-view defining mask 820 having apertures 833 formed therein in sizes and arrangements which provide desired fields-of-view for the various corresponding detector elements 810. Each detector element 810 may have associated therewith a single aperture 833 as shown or a plurality of smaller apertures.

Field-of-view limiting functionality may be desirable in this context because it enhances resolution by limiting overlap between the fields-of-view of adjacent detector elements 810. Extent of field-of-view limiting may be controlled by the size, pitch and arrangement of apertures 833 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Figure 12C:
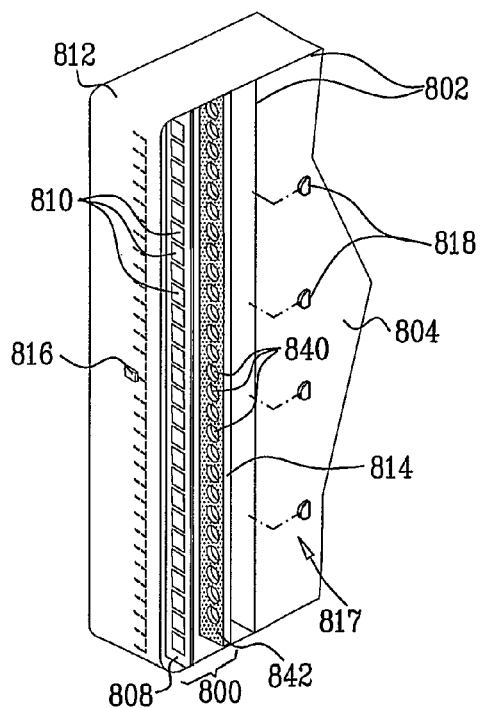

Reference is now made to FIG. 12C, which differs from that of FIG. 12B in that apertures 833 in mask 820 are replaced by light collimating tunnel-defining apertures 840 in a mask 842.

Each detector element 810 may have associated therewith a single tunnel-defining aperture 840 as shown or a plurality of smaller tunnel-defining apertures. Field-of-view limiting functionality may be desirable in this context because it enhances resolution by limiting overlap between the fields-of-view of adjacent detector elements 810. Extent of field-of-view limiting may be controlled by the size, pitch and arrangement of apertures 840 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Figure 12D:
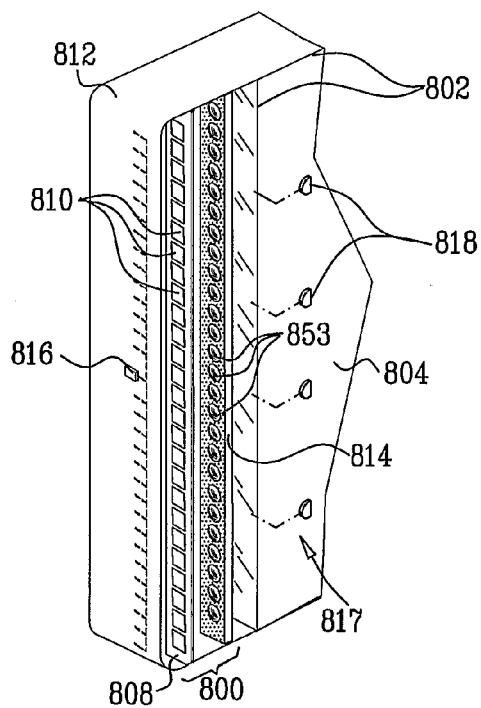

Reference is now made to FIG. 12D, which differs from that of FIGS. 12B and 12C in that the apertures in FIGS. 12B and 12C are replaced by lenses 853. Lenses 853 may be integrally formed at edges 802 or may be discrete elements fitted within suitably sized and positioned apertures in plate 804. Lenses 853 may be associated with tunnel-defining apertures or may comprise an array of microlenses aligned with one or more of detector elements 810.

Field-of-view limiting functionality may be desirable in this context because it enhances resolution by limiting overlap between the fields-of-view of adjacent detector elements 810. Extent of field-of-view limiting may be controlled by the size, pitch and arrangement of lenses 853 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Reference is now made to FIGS. 13A, 13B, 13C, and 13D, which are simplified illustrations of four alternative embodiments of a portion of an input device constructed and operative in accordance with a still further preferred embodiment of the present invention, employing detector elements arranged along edges of a display element.

In the structure of FIGS. 13A-13D, at least one detector assembly 860 is arranged along at least one edge 862 of a viewing plane defining plate 864 to sense light impinging on plate 864 and propagating within the plate 864 to the edges 862 thereof. Viewing plane defining plate 864 may be a single or multiple layer plate and may have one or more coating layers associated therewith. Preferably, detector assemblies 860 are provided along at least two mutually perpendicular edges 862, though detector assemblies 860 may be provided along all or most of edges 862. Alternatively, a single detector assembly 860 may be provided along only one edge 862 of plate 864. The detector assembly 860 includes a linear arrangement 868 of detector elements 870. As distinct from the embodiments of FIGS. 12A-12D, in the embodiments of FIGS. 13A-13D, the cover layer is obviated and its functionality is provided by suitable conditioning of edge 862 of viewing plane defining plate 864. This functionality may provide multiple functions including physical protection, light intensity limitation and field-of-view limitation, and may have optical power.

As in the embodiment of FIGS. 13A-13D, detector assembly 860 does not comprise a support substrate onto which is mounted a linear arrangement of detector elements. In the embodiments of FIGS. 13A-13D, the support substrate of FIGS. 8A-8D is replaced by a portion of a peripheral housing 872. The peripheral housing 872 may be formed of any suitable material including, for example, ceramic material, a material such as FR-4 which is commonly used for PCBs, glass, plastic or a metal such as aluminum. The peripheral housing 872 may also provide mounting for and electrical connections to the detector elements 870. A processor 876 for processing the outputs of the detector elements 870 may also be mounted on the peripheral housing 872.

It is a particular feature of this embodiment of the present invention that the detector assembly 860 is extremely thin, preferably under 1 mm overall. Accordingly, the linear arrangement 868 of detector elements 0.870 is preferably 100-400 microns in thickness. The input devices shown in FIG. 13A-13D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 877 which typically includes one or more electromagnetic radiation emitting sources, here shown as multiple IR emitting LEDs 878. The illumination subassembly 877 preferably forms part of the integrated display and input device. Examples of various suitable configurations of illumination subassembly 877 are described herein below in FIGS. 18A-18F. Optionally, the light emitted by LEDs 878 may be modulated by modulating circuitry (not shown).

Figure 13A:
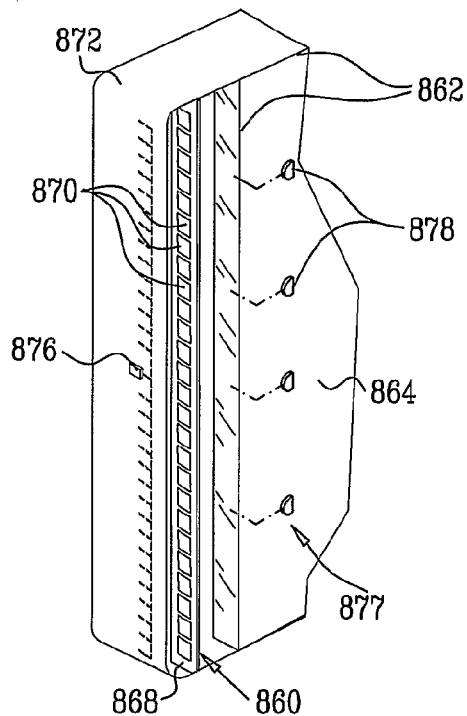
FIGS. 13A, 13B, 13C, and 13D are simplified illustrations of four alternative embodiments of a portion of an input device constructed and operative in accordance with a still further preferred embodiment of the present invention, employing detectors arranged along edges of a display element.

In the embodiment of FIG. 13A, edge 862 is uniformly polished for unimpeded light transmission therethrough to linear arrangement 868 of detector elements 870.

Figure 13B:
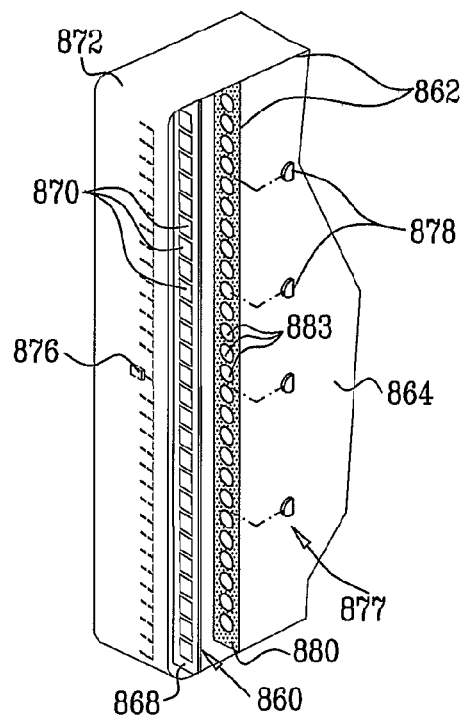

Reference is now made to FIG. 13B, in which it is seen that edge 862 is conditioned to define a field-of-view defining mask 880 having apertures 883 formed therein in sizes and arrangements which provide desired fields-of-view for the various corresponding detector elements 870. Each detector element 870 may have associated therewith a single aperture 883 as shown or a plurality of smaller apertures.

Field-of-view limiting functionality may be desirable in this context because it enhances resolution by limiting overlap between the fields-of-view of adjacent detector elements 870. Extent of field-of-view limiting may be controlled by the size, pitch and arrangement of apertures 883 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Figure 13C:
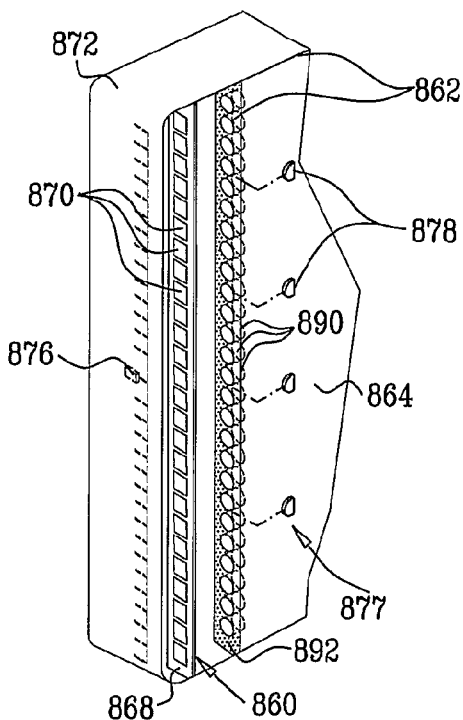

Reference is now made to FIG. 13C, which differs from that of FIG. 13B in that apertures 883 in mask 880 are replaced by light collimating tunnel-defining apertures 890 in a mask 892. Each detector element 870 may have associated therewith a single tunnel-defining aperture 890 as shown or a plurality of smaller tunnel-defining apertures.

Field-of-view limiting functionality may be desirable in this context because it enhances resolution by limiting overlap between the fields-of-view of adjacent detector elements 870. Extent of field-of-view limiting may be controlled by the size, pitch and arrangement of apertures 890 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Figure 13D:
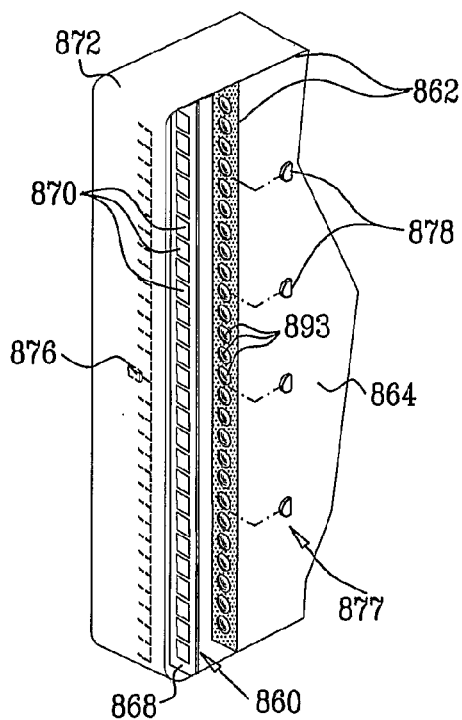

Reference is now made to FIG. 13D, which differs from FIGS. 13B and 13C in that the apertures in FIGS. 13B and 13C are replaced by lenses 893. Lenses 893 may be integrally formed at edges 862 or may be discrete elements fitted within suitably sized and positioned apertures in plate 864.

Lenses 893 may be associated with tunnel-defining apertures or may comprise an array of microlenses aligned with one or more of detector elements 870.

Field-of-view limiting functionality may be desirable in this context because it enhances resolution by limiting overlap between the fields-of-view of adjacent detector elements 870. Extent of field-of-view limiting may be controlled by the size, pitch and arrangement of lenses 893 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Reference is now made to FIGS. 14A, 14B, 14C, and 14D, which are simplified illustrations of four alternative embodiments of a portion of an input device constructed and operative in accordance with an additional preferred embodiment of the present invention, employing forward-facing detector elements arranged about edges of a display element.

In the structure of FIGS. 14A-14D, at least one detector assembly 900 is arranged about at least one edge 902 of a viewing plane defining plate 904 to sense light impinging directly onto detector assembly 900. Viewing plane defining plate 904 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 900 are provided along at least two mutually perpendicular edges 902, though detector assemblies 900 may be provided along all or most of edges 902. Alternatively, a single detector assembly 900 may be provided along only one edge 902 of plate 904. The detector assembly 900 includes a linear arrangement 908 of detector elements 910. As distinct from the embodiments of FIGS. 9A-9D, the detector assembly 900 does not comprise a support substrate onto which is mounted a linear arrangement of detector elements. In the embodiments of FIGS. 14A-14D, the support substrate of FIGS. 9A-9D is replaced by a portion of a peripheral housing 912. Similarly to the embodiments of FIGS. 9A-9D there is provided a cover layer 914 which provides multiple functions including physical protection, light intensity limitation and field-of-view limitation, and may have optical power.

The peripheral housing 912 may be formed of any suitable material including, for example, ceramic material, a material such as FR-4 which is commonly used for PCBs, glass, plastic or a metal such as aluminum. The peripheral housing 912 may also provide mounting for and electrical connections to the detector elements 910. A processor 916 for processing the outputs of the detector elements 910 may also be mounted on the peripheral housing 912.

It is a particular feature of this embodiment of the present invention that the detector assembly 900 is extremely thin, preferably under 1 mm overall. Accordingly, the linear arrangement 908 of detector elements 910 is preferably 100-400 microns in thickness and the cover layer 914 is preferably 100-500 microns in thickness.

The input devices shown in FIG. 14A-14D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 917 which typically includes one or more electromagnetic radiation emitting sources, here shown as multiple IR emitting LEDs 918. The illumination subassembly 917 preferably forms part of the integrated display and input device. Examples of various suitable configurations of illumination subassembly 917 are described herein below in FIGS. 18A-18F. Optionally, the light emitted by LEDs 918 may be modulated by modulating circuitry (not shown).

In the embodiment of FIG. 14A, cover layer 914 is formed of glass or any other suitable light transparent material. Reference is now made to FIG. 14B, in which it is seen that cover layer 914 includes a field-of-view defining mask 920 having apertures 933 formed therein in sizes and arrangements which provide desired fields-of-view for the various corresponding detector elements 910. Each detector element 910 may have associated therewith a single aperture 933 as shown or a plurality of smaller apertures. Field-of-view limiting functionality may be desirable in this context because it enhances resolution by limiting overlap between the fields-of-view of adjacent detector elements 910. Extent of field-of-view limiting may be controlled by the size, pitch and arrangement of apertures 933 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees. Reference is now made to FIG. 14C, which differs from that of FIG. 14B in that apertures 933 in mask 920 are replaced by light collimating tunnel-defining apertures 940 in a mask 942.

Each detector element 910 may have associated therewith a single tunnel-defining aperture 940 as shown or a plurality of smaller tunnel-defining apertures.

Field-of-view limiting functionality may be desirable in this context because it enhances resolution by limiting overlap between the fields-of-view of adjacent detector elements 910. Extent of field-of-view limiting may be controlled by the size, pitch and arrangement of apertures 940 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees.

Reference is now made to FIG. 14D, which differs from that of FIGS. 14B and 14C in that the apertures in FIGS. 14B and 14C are replaced by lenses 953. Lenses 953 may be integrally formed with cover layer 914 or may be discrete elements fitted within suitably sized and positioned apertures in cover layer 914. Lenses 953 may be associated with tunnel-defining apertures or may comprise an array of microlenses aligned with one or more of detector elements 910. Field-of-view limiting functionality may be desirable in this context because it enhances resolution by limiting overlap between the fields-of-view of adjacent detector elements 910. Extent of field-of-view limiting may be controlled by the size, pitch and arrangement of lenses 953 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees. Reference is now made to FIGS. 15A, 15B, 15C, and 15D, which are simplified illustrations of four alternative embodiments of a portion of an input device constructed and operative in accordance with another preferred embodiment of the present invention, employing forward-facing detector elements arranged behind edges of a display element. In the structure of FIGS. 15A-15D, at least one detector assembly 960 is arranged behind at least one edge 962 of a viewing plane defining plate 964 to sense light impinging onto detector assembly 960 after propagating through plate 964. Viewing plane defining plate 964 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 960 are provided behind at least two mutually perpendicular edges 962, though detector assemblies 960 may be provided behind all or most of edges 962. Alternatively, a single detector assembly 960 may be provided behind only one of edges 962.

The detector assembly 960 includes a linear arrangement 968 of detector elements 970. As distinct from the embodiments of FIGS. 10A-10D, the detector assembly 960 does not comprise a support substrate onto which is mounted a linear arrangement of detector elements. In the embodiments of FIGS. 15A-15D, the support substrate of FIGS. 10A-10D is replaced by a portion of a peripheral housing 972. Similarly to the embodiments of FIGS. 10A-10D there is provided a cover layer 974 which provides multiple functions including physical protection, light intensity limitation and field-of-view limitation, and may have optical power.

The peripheral housing 972 may be formed of any suitable material including, for example, ceramic material, a material such as FR-4 which is commonly used for PCBs, glass, plastic or a metal such as aluminum. The peripheral housing 972 may also provide mounting for and electrical connections to the detector elements 970. A processor 976 for processing the outputs of the detector elements 970 may also be mounted on the peripheral housing 972.

It is a particular feature of this embodiment of the present invention that the detector assembly 960 is extremely thin, preferably under 1 mm overall. Accordingly, the linear arrangement 968 of detector elements 970 is preferably 100-400 microns in thickness and the cover layer 974 is preferably 100-500 microns in thickness.

The input devices shown in FIG. 15A-15D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 977 which typically includes one or more electromagnetic radiation emitting sources, here shown as multiple IR emitting LEDs 978. The illumination subassembly 977 preferably forms part of the integrated display and input device. Examples of various suitable configurations of illumination subassembly 977 are described herein below in FIGS. 18A-18F. Optionally, the light emitted by LEDs 978 may be modulated by modulating circuitry (not shown).

Figure 15A:
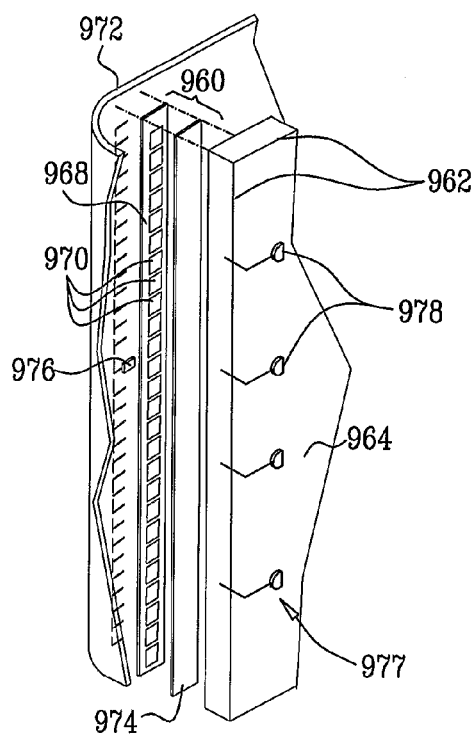
FIGS. 15A, 15B, 15C, and 15D are simplified illustrations of four alternative embodiments of a portion of an input device constructed and operative in accordance with another preferred embodiment of the present invention, employing forward-facing detectors arranged behind edges of a display element.
Figure 15B:
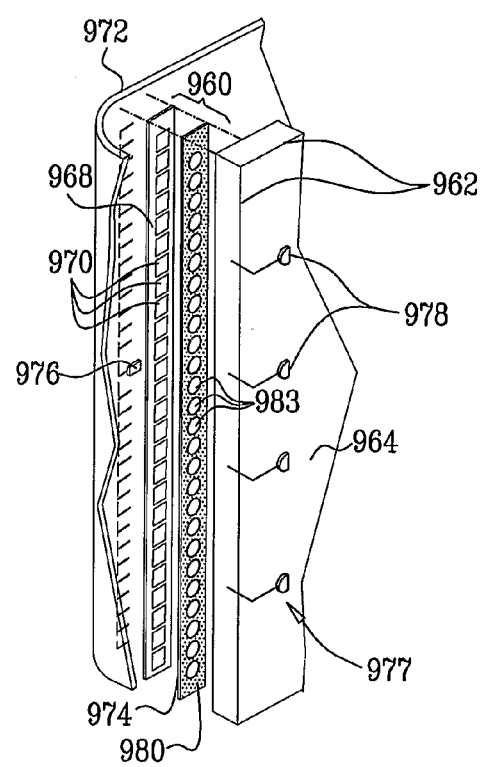
Figure 15C:
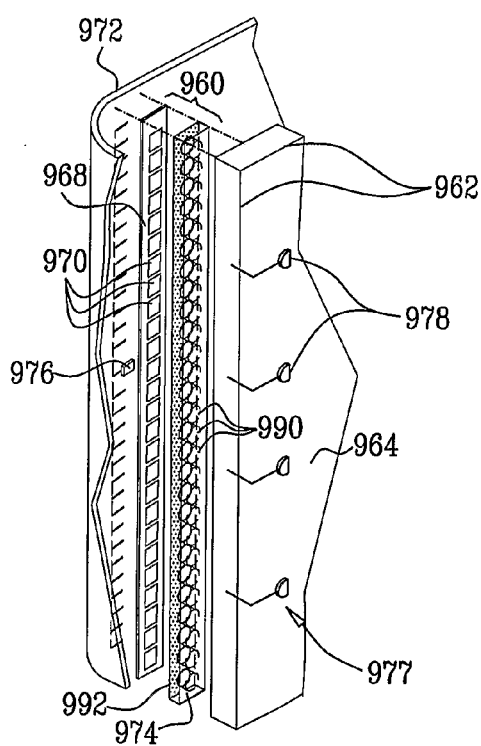

In the embodiment of FIG. 15A, cover layer 974 is formed of glass or any other suitable light transparent material. Reference is now made to FIG. 15B, in which it is seen that cover layer 974 includes a field-of-view defining mask 980 having apertures 983 formed therein in sizes and arrangements which provide desired fields-of-view for the various corresponding detector elements 970. Each detector element 970 may have associated therewith a single aperture 983 as shown or a plurality of smaller apertures. Field-of-view limiting functionality may be desirable in this context because it enhances resolution by limiting overlap between the fields-of-view of adjacent detector elements 970. Extent of field-of-view limiting may be controlled by the size, pitch and arrangement of apertures 983 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees. Reference is now made to FIG. 15C, which differs from that of FIG. 15B in that apertures 983 in mask 980 are replaced by light collimating tunnel-defining apertures 990 in a mask 992.

Each detector element 970 may have associated therewith a single tunnel-defining aperture 990 as shown or a plurality of smaller tunnel-defining apertures.

Field-of-view limiting functionality may be desirable in this context because it enhances resolution by limiting overlap between the fields-of-view of adjacent detector elements 970. Extent of field-of-view limiting may be controlled by the size, pitch and arrangement of apertures 990 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Figure 15D:
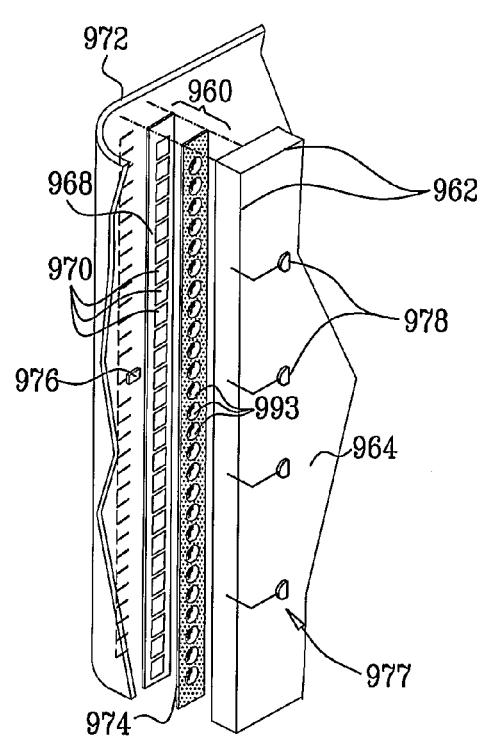

Reference is now made to FIG. 15D, which differs from that of FIGS. 15B and 15C in that the apertures in FIGS. 15B and 15C are replaced by lenses 993. Lenses 993 may be integrally formed with cover layer 974 or may be discrete elements fitted within suitably sized and positioned apertures in cover layer 974. Lenses 993 may be associated with tunnel-defining apertures or may comprise an array of microlenses aligned with one or more of detector elements 970. Field-of-view limiting functionality may be desirable in this context because it enhances resolution by limiting overlap between the fields-of-view of adjacent detector elements 970. Extent of field-of-view limiting may be controlled by the size, pitch and arrangement of lenses 993 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees. Reference is now made to FIGS. 16A, 16B, 16C, and 16D, which are simplified illustrations of four alternative embodiments of a portion of an input device constructed and operative in accordance with yet another preferred embodiment of the present invention, employing forward-facing detector elements arranged behind edges of a display element. In the structure of FIGS. 16A-16D, at least one detector assembly 1000 is arranged behind at least one edge 1002 of a viewing plane defining plate 1004 to sense light impinging on plate 1004 and propagating within the plate to the edges 1002 thereof. Viewing plane defining plate 1004 may be a single or multiple layer plate and may have one or more coating layers associated therewith. Preferably, detector assemblies 1000 are provided behind at least two mutually perpendicular edges 1002, though detector assemblies 1000 may be provided behind all or most of edges 1002.

Alternatively, a single detector assembly 1000 may be provided behind plate 1004 at only one edge thereof.

The detector assembly 1000 includes a linear arrangement 1008 of detector elements 1010. As distinct from the embodiments of FIGS. 15A-15D, in the embodiments of FIGS. 16A-16D, the cover layer is obviated and its functionality is provided by suitable conditioning of edge 1002 of viewing plane defining plate 1004.

This functionality may provide multiple functions including physical protection, light intensity limitation and field-of-view limitation, and may have optical power.

As in the embodiment of FIGS. 15A-15D, detector assembly 1000 does not comprise a support substrate onto which is mounted a linear arrangement of detector elements. In the embodiments of FIGS. 16A-16D, the support substrate of FIGS. 11A-11D is replaced by a portion of a peripheral housing 1012.

The peripheral housing 1012 may be formed of any suitable material including, for example, ceramic material, a material such as FR-4 which is commonly used for PCBs, glass, plastic or a metal such as aluminum. The peripheral housing 1012 may also provide mounting for and electrical connections to the detector elements 1010.

A processor 1016 for processing the outputs of the detector elements 1010 may also be mounted on the peripheral housing 1012.

It is a particular feature of this embodiment of the present invention that the detector assembly 1000 is extremely thin, preferably under 1 mm overall.

Accordingly, the linear arrangement 1008 of detector elements 1010 is preferably 100-400 microns in thickness.

The input devices shown in FIG. 16A-16D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 1017 which typically includes one or more electromagnetic radiation emitting sources, here shown as multiple IR emitting LEDs 1018. The illumination subassembly 1017 preferably forms part of the integrated display and input device. Examples of various suitable configurations of the illumination subassembly 1017 are described herein below in FIGS. 18A-18F. Optionally, the light emitted by LEDs 1018 may be modulated by modulating circuitry (not shown).

Figure 16A:
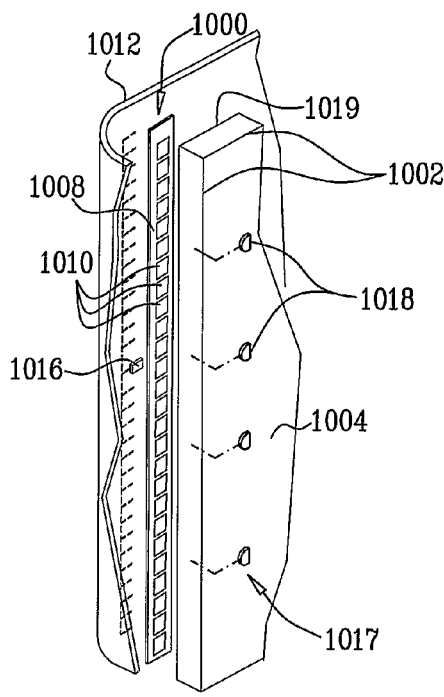
FIGS. 16A, 16B, 16C, and 16D are simplified illustrations of four alternative embodiments of a portion of an input device constructed and operative in accordance with yet another preferred embodiment of the present invention, employing forward-facing detectors arranged behind edges of a display element.

In the embodiment of FIG. 16A, a rearward facing surface 1019 of plate 1004 at the edge 1002 lying in front of the linear arrangement 1008 is uniformly polished for unimpeded light transmission therethrough to linear arrangement 1008 of detector elements 1010.

Figure 16B:
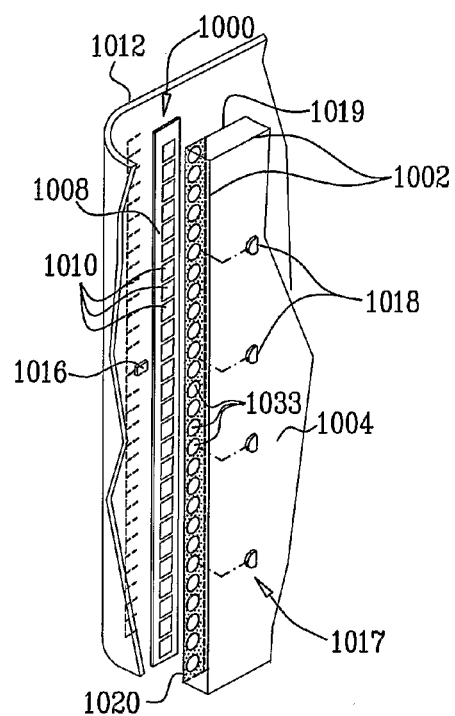

Reference is now made to FIG. 16B, in which it is seen that the rearward facing surface 1019 of plate 1004 at the edge 1002 lying in front of the linear arrangement 1008 is conditioned to define a field-of-view defining mask 1020 having apertures 1033 formed therein in sizes and arrangements which provide desired fields-of-view for the various corresponding detector elements 1010. Each detector element 1010 may have associated therewith a single aperture 1033 as shown or a plurality of smaller apertures.

Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1033 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 16C:
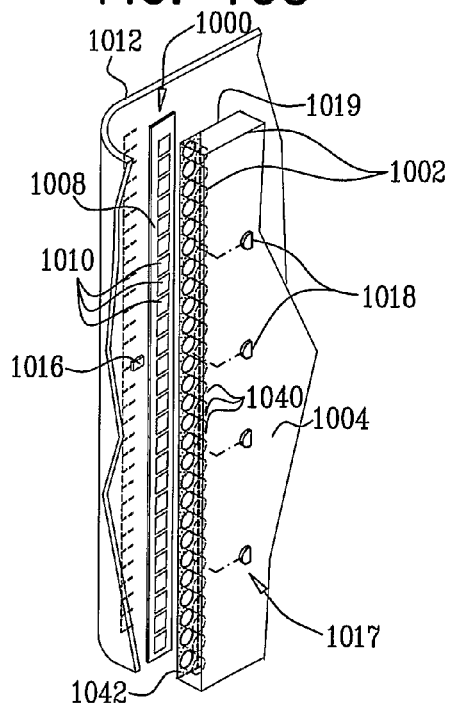

Reference is now made to FIG. 16C, which differs from that of FIG. 16B in that apertures 1033 in mask 1020 are replaced by light collimating tunnel-defining apertures 1040 in a mask 1042.

Each detector element 1010 may have associated therewith a single tunnel-defining aperture 1040, as shown, or a plurality of smaller tunnel-defining apertures. Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1040 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 16D:
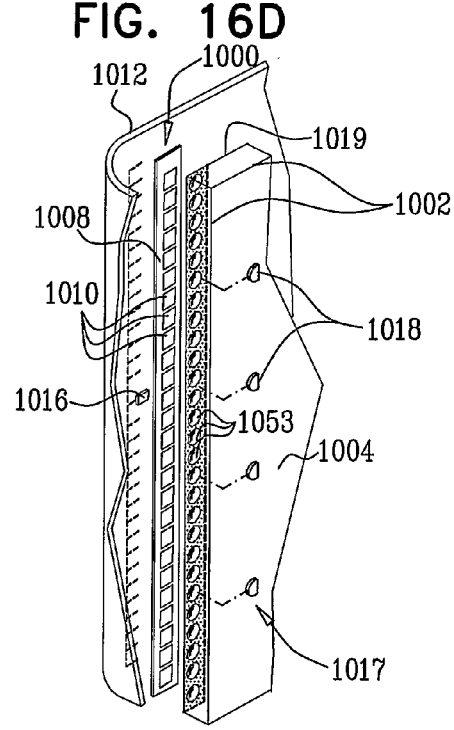

Reference is now made to FIG. 16D, which differs from that of FIGS. 16B and 16C in that the apertures in FIGS. 16B and 16C are replaced by lenses 1053. Lenses 1053 may be integrally formed at edges 1002 or may be discrete elements fitted within suitably sized and positioned apertures in plate 1004. Lenses 1053 may be associated with tunnel-defining apertures or may comprise an array of microlenses aligned with one or more of detector elements 1010.

Field-of-view limiting functionality may be desirable in this context because it enhances resolution by limiting overlap between the fields-of-view of adjacent detector elements 1010. Extent of field-of-view limiting may be controlled by the size, pitch and arrangement of lenses 1053 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 17A:
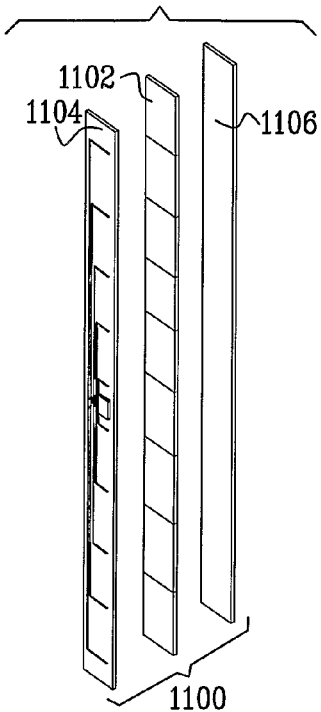
FIGS. 17A, 17B, and 17C are simplified illustrations of three alternative embodiments of a detector assembly forming part of an integrated display and input device constructed and operative in accordance with a preferred embodiment of the present invention.
Figure 17B:
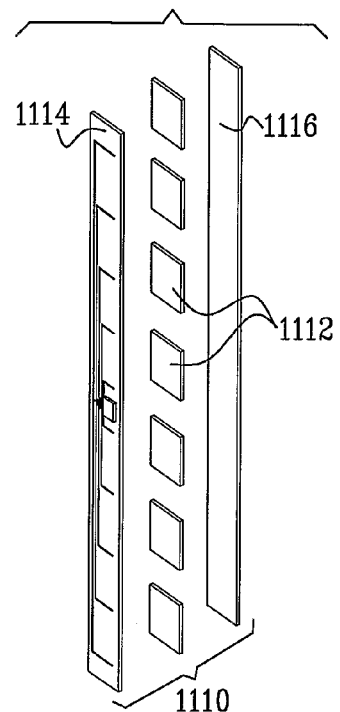
Figure 17C:
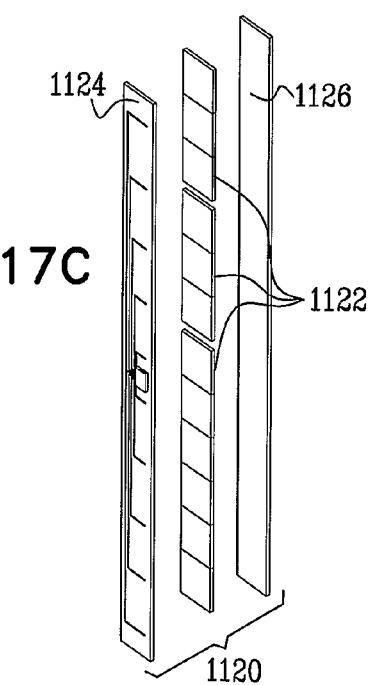

Reference is now made to FIGS. 17A, 17B, and 17C, which are simplified illustration of three alternative embodiments of a detector assembly forming part of an integrated display and input device constructed and operative in accordance with a preferred embodiment of the present invention.

In the structure of FIGS. 17A-17C, at least one detector assembly is arranged about at least one edge (not shown) of a viewing plane defining plate (not shown). The detector assemblies of FIGS. 17A-17C may be employed in any of the embodiments of the present invention described hereinabove and illustrated in FIGS. 1A-16D. Preferably, detector assemblies are provided along at least two mutually perpendicular edges of the plate, though detector assemblies may be provided along all or most of the edges. Alternatively, a single detector assembly may be provided along only one edge of the plate.

In accordance with a preferred embodiment of the present invention, the detector assembly comprises a support substrate onto which is mounted a linear arrangement of detector elements. Preferably, a cover layer is placed over the arrangement of detector elements and may provide multiple functions including physical protection, light intensity limitation and field-of-view limitation, and may have optical power. The support substrate may be mounted onto a display housing (not shown) or may be integrally formed therewith. The support substrate may alternatively be mounted onto an edge of the plate. The support substrate may be formed of a ceramic material, a material such as FR-4 which is commonly used for PCBs, glass, plastic or a metal such as aluminum. The support substrate may also provide mounting for and electrical connections to the detector elements. A processor for processing the outputs of the detector elements may also be mounted on the support substrate.

It is a particular feature of this embodiment of the present invention that the detector assembly is extremely thin, preferably under 1 mm overall. Accordingly, the support substrate is preferably 50-200 microns in thickness and the linear arrangement of detector elements is preferably 100-400 microns in thickness and the cover layer is preferably 100-500 microns in thickness.

In the embodiment of FIG. 17A, the detector assembly, here designated by reference numeral 1100, includes an integrally formed multi-element detector array 1102. The detector array 1102 is preferably mounted onto a support substrate 1104 and overlaid with a cover layer 1106.

In the embodiment of FIG. 17B, the detector assembly, here designated by reference numeral 1110, includes a plurality of discrete single-element detector elements 1112 such as Solderable Silicon Photodiodes commercially available from Advanced Photonix Incorporated of Camarillo, Calif., USA under catalog designator PDB-C601-1. The discrete detector elements 1112 are preferably mounted onto a support substrate 1114 and overlaid with a cover layer 1116.

In the embodiment of FIG. 17C, the detector assembly, here designated by reference numeral 1120, includes a plurality of discrete multi-element detector elements 1122. The discrete multi-element detector elements 1122 need not be all of the same size and are preferably all mounted onto a support substrate 1124 and overlaid with a cover layer 1126.

Reference is now made to FIGS. 18A, 18B, 18C, 18D, 18E and 18F, which are simplified illustrations of four alternative embodiments of an illumination subassembly forming part of an integrated display and input device constructed and operative in accordance with preferred embodiments of the present invention. Alternatively or additionally, a touch responsive input functionality may preferably be operative to detect the position of a stylus (not shown) or any other suitable reflective object.

FIGS. 18A-18F show an integrated display and input device having touch responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT International Patent Application Publication No. WO 2005/094176, the disclosures of which are hereby incorporated by reference. FIGS. 18A-18F illustrate object detection functionality of the type described hereinabove with reference to FIGS. 1A to 1D. As shown, a position of a user's finger is detected by means of a touch responsive input functionality operative in accordance with preferred embodiments of the present invention.

Turning specifically to FIG. 18A, it is seen that arrays 1202 of light detector elements 1204 are arranged at least two mutually perpendicular edge surfaces 1206 of a viewing plane defining plate 1208. Alternatively, detector arrays 1202 may be provided along all or most of the edges 1206. As a further alternative, a single detector array 1202 may be provided along only one edge 1206 of the plate 1208. Viewing plane defining plate 1208 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D, and 16A-16D, about edges as in the embodiments shown in FIGS. 9A-9D and 14A-14D, and along edges as in the embodiments shown in FIGS. 4-7, 8A-8D, 12A-12D, and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18A preferably includes an illumination subassembly 1212 which typically includes one or more electromagnetic radiation emitting sources. The illumination subassembly 1212 preferably provides a baseline illumination level which is typically detected by detector elements 1204.

In accordance with a preferred embodiment of the present invention, shown in FIG. 18A, a single IR emitting LED 1216 is provided at or generally adjacent to an intersection of the mutually perpendicular edges 1206 along which detector elements 1214 are arranged. The LED 1216 is arranged such that light emitted therefrom is projected generally across the surface of plate 1208. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1216 may be affected by the specific placement of LED 1216 relative to detector arrays 1202 and the interaction between a light beam emitted from the LED 1216 and the various components of the integrated display and input device, including the plate 1208, the detector elements 1204 and other layers of the integrated display and input device. Optionally, the light emitted by LED 1216 may be modulated by modulating circuitry (not shown). Light, preferably including light in the IR band emitted by illumination subassembly 1212, is reflected from a user's finger, a stylus (not shown) or any other suitable reflective object, touching or located in propinquity to plate 1208. The reflected light is propagated within plate 1208 and is detected by one or more of detector elements 1204. Alternatively or additionally, the reflected light is propagated above the surface of plate 1208 and is detected by one or more of detector elements 1204, which may extend slightly above edge surfaces 1206. Furthermore, additionally or alternatively, the reflected light may propagate or be transmitted through plate 1208 directly to one or more of detector elements 1204 and detected thereby.

When the user's finger touches or is located in propinquity to plate 1208, the light reflected from the finger is detected by one or more of detector elements 1204, as described hereinabove, in addition to the baseline level of light detected by the detector elements 1204. Detector analyzing processing circuitry (not shown) preferably receives outputs of the detector elements 1204 on detector arrays 1202, digitally processes these outputs and determines whether the absolute amount of light detected by each of the detector elements 1204 or the change in the amount of light detected by each of the detector elements 1204 exceeds a predetermined threshold.

The amount of light detected by the individual detector elements 1204 on a given detector array 1202, as determined by the detector analyzing processing circuitry, is further processed to provide an array detection output. The array detection output includes information corresponding to the location of an impingement point of the user's finger relative to the given detector array 1202. Typically, the location of at least one detector element 1204, in which the amount of light measured or the change in the amount of light measured exceeds a predetermined threshold, corresponds to the location of the user's finger along an axis parallel to the given detector array 1202.

In the configuration shown, in FIG. 18A, two-dimensional location determining circuitry (not shown) preferably calculates the two-dimensional position of the impingement point of the user's finger on or above plate 1208 by combining the array detection outputs of at least two detector arrays, typically arranged along at least two mutually perpendicular edges 1206 of plate 1208.

Reference is now made to FIG. 18B, which shows arrays 1222 of light detector elements 1224 arranged at least two mutually perpendicular edge surfaces 1226 of a viewing plane defining plate 1228. Alternatively, detector arrays 1222 may be provided along all or most of the edges 1226. As a further alternative, a single detector array 1222 may be provided along only one edge 1226 of the plate 1228. Viewing plane defining plate 1228 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D, and 16A-16D, about edges as in the embodiments shown in FIGS. 9A-9D and 14A-14D, and along edges as in the embodiments shown in FIGS. 4-7, 8A-8D, 12A-12D, and 13A-13D.

Suitable detector elements are, for example/Solderable Silicon Photodiodes commercially available from Advanced Photonix Incorporated of Camarillo, Calif., USA under catalog designator PDB-C601-1.

The integrated display and input device shown in FIG. 18B preferably includes an illumination subassembly 1232 which typically includes one or more electromagnetic radiation emitting sources. The illumination subassembly 1232 preferably provides a baseline illumination level which is typically detected by detector elements 1224.

In accordance with a preferred embodiment of the present invention, shown in FIG. 18B, a single IR emitting LED 1236 is provided at or generally adjacent to an intersection of mutually perpendicular edges 1226 along which detector elements 1224 are not arranged. The LED 1236 is arranged such that light emitted therefrom is projected generally across the surface of plate 1228. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1236 may be affected by the specific placement of LED 1236 relative to detector arrays 1222 and the interaction between a light beam emitted from the LED 1236 and the various components of the integrated display and input device, including the plate 1228, the detector elements 1224 and other layers of the integrated display and input device. Optionally, the light emitted by LED 1236 may be modulated by modulating circuitry (not shown). Light, preferably including light in the IR band emitted by illumination subassembly 1232, is propagated generally across the surface of plate 1228 and is detected by one or more of detector elements 1224. Alternatively or additionally, the light is propagated above the surface of plate 1228 and is detected by one or more of detector elements 1224, which may optionally extend slightly above edge surfaces 1226. Furthermore, additionally or alternatively, the light may propagate or be transmitted through plate 1228 directly to one or more of detector elements 1224 and detected thereby.

The light is deflected by a user's finger, a stylus (not shown) or any other suitable object, touching or located in propinquity to plate 1228. When the user's finger touches or is located in propinquity to plate 1228, the amount of light detected by one or more of detector elements 1224 is typically reduced relative to the baseline level of light detected by the detector elements 1224. Detector analyzing processing circuitry (not shown) preferably receives outputs of the detector elements 1224 on detector arrays 1222, digitally processes these outputs and determines whether the absolute amount of light detected by each of the detector elements 1224 is below a predetermined threshold, or whether the change in the amount of light detected by each of the detector elements 1224 exceeds a predetermined threshold.

The amount of light detected by the individual detector elements 1224 on a given detector array 1222, as determined by the detector analyzing processing circuitry, is further processed to provide an array detection output. The array detection output includes information corresponding to the location of an impingement point of the user's finger relative to the given detector array 1222. Typically, the location of at least one detector element 1224, in which the amount of light measured is below a predetermined threshold or the change in the amount of light measured exceeds a predetermined threshold, corresponds to the location of the user's finger along an axis parallel to the given detector array 1222.

In the configuration shown in FIG. 18B, two-dimensional location determining circuitry (not shown) preferably calculates the two-dimensional position of the impingement point of the user's finger on or above plate 1228 by combining the array detection outputs of at least two detector arrays, typically arranged along at least two mutually perpendicular edges 1226 of plate 1228. Reference is now made to FIG. 18C, which shows an array 1242 of detector elements 1244 arranged in a plane, parallel to a viewing plane

1246. As seen in FIG. 18C, in one example of a display and input device structure, detector array 1242 is arranged behind an IR transmissive display panel 1248, such as a panel including LCD or OLED elements, underlying a viewing plane defining plate 1250. In accordance with a preferred embodiment of the present invention the array 1242 is formed of a plurality of discrete detector elements 1244 placed on a plane integrally formed therewith.

Alternatively, the array 1242 may be formed of one or more CCD or CMOS arrays, or may be created by photolithography.

Viewing plane defining plate 1250 may be a single or multiple layer plate and may have one or more coating layers associated therewith. In one example of an integrated display and input system employing an LCD, there are provided one or more light diffusing layers 1252 overlying a reflector 1254. One or more collimating layers 1256 are typically interposed between reflector 1254 and IR transmissive display panel 1248.

The integrated display and input device shown in FIG. 18C preferably includes an illumination subassembly 1262 which typically includes one or more electromagnetic radiation emitting sources. The illumination subassembly 1262 preferably provides a baseline illumination level which is typically detected by detector elements 1244.

In accordance with a preferred embodiment of the present invention, shown in FIG. 18C, a generally linear arrangement of multiple IR emitting LEDs 1266 is provided, in parallel with one or more of edges 1268 of the integrated display and input device. The LEDs 1266 are arranged such that light emitted therefrom is projected generally across the surface of plate 1208. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1266 may be affected by the specific placement of the LEDs 1266 relative to array 1242 and the interaction between light beams emitted from the LEDs 1266 and the various components of the integrated display and input device, including the plate 1250, the detector elements 1244, the diffusing layers 1252, collimating layers 1256, reflecting layers 1254 and other layers of the integrated display and input device. Optionally, the light emitted by LEDs 1266 may be modulated by modulating circuitry (not shown).

Light, preferably including light in the IR band emitted by illumination subassembly 1262, is reflected from a user's finger, a stylus (not shown) or any other suitable reflective object, touching or located in propinquity to plate 1250. The reflected light is propagated through plate 1250 and is detected by one or more of detector elements 1244.

When the user's finger touches or is located in propinquity to plate 1250, the light reflected from the finger is detected by one or more of detector elements 1244, as described hereinabove, in addition to the baseline level of light detected by the detector elements 1244. Detector analyzing processing circuitry (not shown) preferably receives outputs of the detector elements 1244 on detector array 1242, digitally processes these outputs and determines whether the absolute amount of light detected by each of the detector elements 1244 or the change in the amount of light detected by each of the detector elements 1244 exceeds a predetermined threshold.

The amount of light detected by the individual detector elements 1244 as determined by the detector analyzing processing circuitry is further processed to provide an array detection output. The array detection output includes information corresponding to the location of an impingement point of the user's finger relative to array 1242. Typically, the location of at least one detector element 1244, in which the amount of light measured or the change in the amount of light measured exceeds a predetermined threshold, corresponds to the two-dimensional location of the user's finger in a plane parallel to array 1242.

In the configuration shown in FIG. 18C, optional three-dimensional location determining circuitry (not shown) may be provided to calculate the three-dimensional (X, Y, Z and/or angular orientation) position of the impingement point of the user's finger on or above plate 1250 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT International Patent Application Publication No. WO 2005/094176, the disclosures of which are hereby incorporated by reference.

Reference is now made FIG. 18D, which shows arrays 1272 of light detector elements 1274 arranged at least two mutually perpendicular edge surfaces 1276 of a viewing plane defining plate 1278. Alternatively, detector arrays 1272 may be provided along all or most of the edges 1276. As a further alternative, a single detector array 1272 may be provided along only one edge 1276 of the plate 1278. Viewing plane defining plate 1278 may be a single or multiple layer plate and may have one or more coating layers associated therewith. Optionally, one or more of detector arrays 1272 may be arranged such that the detector elements 1274 thereof extend slightly above the surface of viewing plane defining plate 1278.

It is appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18D preferably includes an illumination subassembly 1282 which typically includes one or more electromagnetic radiation emitting sources. The illumination subassembly 1282 preferably provides a baseline illumination level which is typically detected by detector elements 1274.

In accordance with a preferred embodiment of the present invention, shown in FIG. 18D, one or more IR emitting LEDs 1286 is provided at, generally adjacent to, or interspersed among, a linear arrangement of display backlight LEDs (not shown), typically provided underlying and aligned with edges of a plane of an IR transmissive display panel 1288, such as an LCD or OLED, which underlies and is generally parallel to a viewing plane defining plate 1278.

A suitable IR emitting LED is, for example, an SMD type IR GaAs LED commercially available from Marubeni America Corporation of Santa Clara, Calif., USA under catalog designator SMC940. It is appreciated that selection of a specific shapes and sizes of LEDs 1286 may be affected by the specific placement of LEDs 1286 relative to detector arrays 1272 and the interaction between light beams emitted from the LEDs 1286, light beams emitted from other backlight LEDs, and the various components of the integrated display and input device, including backlight LEDs, the plate 1278, the detector elements 1274 and other layers of the integrated display and input device. Optionally, the light emitted by LED 1286 may be modulated by modulating circuitry (not shown).

In one preferred embodiment of the present invention, the detector elements 1274 are operative to detect visible wavelengths of light emitted from visible light-admitting backlight LEDs. In another preferred embodiment of the present invention, backlight LEDs are selected to provide both IR and visible light wavelength emanations.

The IR emitting LEDs 1286 are arranged such that light emitted therefrom is projected generally through one or more diffusing and/or collimating layers 1290 typically underlying the IR transmissive display panel 1288. The IR emitting LEDs 1286 may additionally or alternatively be arranged such that light emitted therefrom is reflected by one or more reflecting layers 1292, underlying and generally parallel to the plane of the IR transmissive display panel 1288. Typically, both diffusing layers 1290 and reflecting layers 1292 are provided, to aid in propagating the backlight and IR light through the transmissive display panel 1288.

Light, preferably including light in the IR band emitted by illumination subassembly 1282, is reflected from a user's finger, a stylus (not shown) or any other suitable reflective object, touching or located in propinquity to plate 1278. The reflected light is propagated within plate 1278 and is detected by one or more of detector elements 1274. Alternatively or additionally, the reflected light is propagated above the surface of plate 1278 and is detected by one or more of detector elements 1274, which may extend slightly above edge surfaces 1276. Furthermore, additionally or alternatively, the reflected light may propagate or be transmitted through plate 1278 directly to one or more of detector elements 1274 and detected thereby.

When the user's finger touches or is located in propinquity to plate 1278, the light reflected from the finger is detected by one or more of detector elements 1274, as described hereinabove, in addition to the baseline level of light detected by the detector elements 1274. Detector analyzing processing circuitry (not shown) preferably receives outputs of the detector elements 1274 on detector arrays 1272, digitally processes these outputs and determines whether the absolute amount of light detected by each of the detector elements 1274 or the change in the amount of light detected by each of the detector elements 1274 exceeds a predetermined threshold.

The amount of light detected by the individual detector elements 1274 on a given detector array 1272, as determined by the detector analyzing processing circuitry, is further processed to provide an array detection output. The array detection output includes information corresponding to the location of an impingement point of the user's finger relative to the given detector array 1272. Typically, the location of at least one detector element 1274, in which the amount of light measured or the change in the amount of light measured exceeds a predetermined threshold, corresponds to the location of the user's finger along an axis parallel to detector array 1272.

In the configuration shown in FIG. 18D, two-dimensional location determining circuitry (not shown) preferably calculates the two-dimensional position of the impingement point of the user's finger on or above plate 1278 by combining the array detection outputs of at least two arrays, typically arranged along at least two mutually perpendicular edges 1276 of plate 1278.

Reference is now made to FIG. 18E, which shows a single array 1302 of light detector elements 1304 arranged at an edge surface 1306 of a viewing plane defining plate 1308. Viewing plane defining plate 1308 may be a single or multiple layer plate and may have one or more coating layers associated therewith.

It is appreciated that the phrase "at an edge" is to be interpreted broadly as including structures which are located behind an edge, as in the embodiments shown in FIGS. 10A-10D, 11A-11D, 15A-15D, and 16A-16D3 about an edge as in the embodiments shown in FIGS. 9A-9D and 14A-14D, and along an edge as in the embodiments shown in FIGS. 4-7, 8A-8D, 12A-12D, and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18E preferably includes an illumination subassembly 1312 which typically includes one or more electromagnetic radiation emitting sources. The illumination subassembly 1312 preferably provides a baseline illumination level which is typically detected by detector elements 1304.

In accordance with a preferred embodiment of the present invention, shown in FIG. 18E, a generally linear arrangement of multiple IR emitting LEDs 1316 is provided, in parallel with one or more of edges 1306, The LEDs 1316 are arranged such that light emitted therefrom is projected generally across the surface of plate 1308.

Illumination subassembly 1312 may be arranged in parallel to detector array 1302, at an edge perpendicular to detector array 1302, or may be arranged at an edge opposite or otherwise not adjacent or perpendicular to detector array 1302.

Suitable IR emitting LEDs are, for example, the IR-emitting SMD-LEDs commercially available from OSA Opto Light GmbH of Berlin, Germany under catalog designator OIS-210-X-T. It is appreciated that selection of a specific shapes and sizes of LEDs 1316 may be affected by the specific placement of the illumination subassembly 1312 relative to detector array 1302 and the interaction between light beams emitted from the LEDs 1316 and the various components of the integrated display and input device, including the plate 1308, the detector elements 1304 and other layers of the integrated display and input device. Optionally, the light emitted by LEDs 1316 may be modulated by modulating circuitry (not shown).

Light, preferably including light in the IR band emitted by illumination subassembly 1312, is reflected from a user's finger, a stylus (not shown) or any other suitable reflective object, touching or located in propinquity to plate 1308. The reflected light is propagated within plate 1308 and is detected by one or more of detector elements 1304. Alternatively or additionally, the reflected light is propagated above the surface of plate 1308 and is detected by one or more of detector elements 1304, which may extend slightly above edge surfaces 1306. Furthermore, additionally or alternatively, the reflected light may propagate or be transmitted through plate 1308 directly to one or more of detector elements 1304 and detected thereby.

When the user's finger touches or is located in propinquity to plate 1308, the light reflected from the finger is detected by one or more of detector elements 1304, as described hereinabove, in addition to the baseline level of light detected by the detector elements 1304. Detector analyzing processing circuitry (not shown) preferably receives outputs of the detector elements 1304 on detector array 1302, digitally processes these outputs and determines whether the absolute amount of light detected by each of the detector elements 1304 or the change in the amount of light detected by each of the detector elements 1304 exceeds a predetermined threshold. The amount of light detected by the individual detector elements 1304 on array 1302, as determined by the detector analyzing processing circuitry, is further processed to provide an array detection output. The array detection output includes information corresponding to the location of an impingement point of the user's finger relative to detector array 1302. Typically, the location of at least one detector element 1304, in which the amount of light measured or the change in the amount of light measured exceeds a predetermined threshold, corresponds to the location of the user's finger along an axis parallel to array 1302.

In the configuration shown in FIG. 18E, two-dimensional location determining circuitry (not shown) preferably calculates the two-dimensional position of the impingement point of the user's finger on or above plate 1308 by further utilizing the array detection output and the information corresponding to the location of the impingement point of the user's finger relative to the array included therein, as described herein below.

Whereas the location of at least one detector element 1304 on array 1302, in which the amount of light measured or the change in the amount of light measured exceeds a predetermined threshold, corresponds to the location of the user's finger along an axis parallel to array 1302, the strength of the signal output of that detector element 1304 decreases as the distance of the impingement point of the user's finger from array 1302 along an axis generally perpendicular to the axis of the array 1302 increases. Conversely, the strength of the signal output of the detector element 1304 increases as the distance of the impingement point of the user's finger from array 1302 along an axis generally perpendicular to the axis of the array 1302 decreases. These characteristics of the various components of the integrated display and input device are employed by the two-dimensional location determining circuitry to calculate the two-dimensional position of the impingement point of the user's finger on the plate 1308 or above it. Reference is now made to FIG. 18F, which shows an integrated display and input device having touch responsive input functionality. As seen in FIG. 18F, a multiplicity of light detector elements 1322 are interspersed among light emitters 1324 arranged in a plane 1326 underlying a viewing plane defining plate 1328. Examples of such a structure are described in U.S. Pat. No. 7,034,866 and U.S. Patent Application Publication Nos. 2006/0132463 A1, 2006/0007222 A1 and 2004/00012565 A1, the disclosures of which are hereby incorporated by reference.

Viewing plane defining plate 1328 may be a single or multiple layer plate and may have one or more coating layers associated therewith. In one example of an integrated display and input system employing light detector elements interspersed among light emitting elements, there are provided one or more light diffusing layers 1330 overlying a reflector 1332. One or more collimating layers 1334 may be interposed between reflector 1332 and the plane 1326 which includes the light detector and light emitting elements.

The integrated display and input device shown in FIG. 18F preferably includes an illumination subassembly 1342 which typically includes one or more electromagnetic radiation emitting sources. The illumination subassembly 1342 preferably provides a baseline illumination level which is typically detected by detector elements 1322.

In accordance with a preferred embodiment of the present invention, shown in FIG. 18F, a generally linear arrangement of multiple IR emitting LEDs 1346 is provided, generally in parallel with one or more of edges 1348 of plate 1328. The LEDs 1246 are arranged such that light emitted therefrom is projected generally across the surface of plate 1328. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1346 may be affected by the specific placement of the LEDs 1346 relative to plane 1326 and the interaction between one or more light beams emitted from LEDs 1346 and the various components of the integrated display and input device including the plate 1328, the detector elements 1322, diffusing layers 1330, collimating layers 1334, reflecting layers 1332 and other layers of the integrated display and input device. Optionally, the light emitted by LEDs 1346 may be modulated by modulating circuitry (not shown).

Light, preferably including light in the IR band emitted by illumination subassembly 1342, is reflected from a user's finger, a stylus (not shown) or any other suitable reflective object, touching or located in propinquity to plate 1328. The reflected light is propagated through plate 1328 and is detected by one or more of detector elements 1322.

When the user's finger touches or is located in propinquity to plate 1328, the light reflected from the finger is detected by one or more of detector elements 1322, in addition to the baseline level of light detected by the detector elements 1322. Detector analyzing processing circuitry preferably receives outputs of the detector elements 1322, digitally processes these outputs and determines whether the absolute amount of light detected by each of the detector elements 1322 or the change in the amount of light detected by each of the detector elements 1322 exceeds a predetermined threshold.

The amount of light detected by the individual detector elements 1322, as determined by the detector analyzing processing circuitry, is further processed to provide an array detection output. The array detection output includes information corresponding to the location of an impingement point of the user's finger. Typically, the location of at least one detector element 1322, in which the amount of light measured or the change in the amount of light measured exceeds a predetermined threshold, corresponds to the two-dimensional location of the user's finger on or above plate 1328 and parallel to plane 1326.

In the configuration shown in FIG. 18F, optional three-dimensional location determining circuitry (not shown) may be provided to calculate the three-dimensional (X, Y, Z and/or angular orientation) position of the impingement point of the user's finger on or above plate 1328 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT International Patent Application Publication No. WO 2005/094176, the disclosures of which are hereby incorporated by reference.

It is appreciated that any of the configurations of the illumination subassemblies shown in the embodiments of FIGS. 18A-18F may be combined with any of the detector array configurations shown in FIGS. 1-18F.

Reference is now made to FIG. 19, which is a simplified illustration of an integrated display and input device constructed and operative in accordance with a preferred embodiment of the present invention, utilizing electromagnetic radiation from a source external to the integrated display and input device.

As seen in FIG. 19, arrays 1402 of light detector elements 1404 are arranged at least two mutually perpendicular edge surfaces 1406 of a viewing plane defining plate 1408. Alternatively, detector arrays 1402 may be provided along all or most of the edges 1406. As a further alternative, a single detector array 1402 may be provided along only one edge 1406 of the plate 1408. Viewing plane defining plate 1408 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D, and 16A-16D, about edges as in the embodiments shown in FIGS. 9A-9D and 14A-14D, and along edges as in the embodiments shown in FIGS. 4-7, 8A-8D, 12A-12D, and 13A-13D.

Suitable detector elements are, for example, Solderable Silicon Photodiodes commercially available from Advanced Photonix Incorporated of Camarillo, Calif., USA under catalog designator PDB-C601-1.

Light incident upon the viewing plate 1408, preferably including light in the IR band emitted by one or more sources of illumination external to the integrated display and input device, is propagated within plate 1408 and is detected by one or more of detector elements 1404. Alternatively or additionally, the incident light is propagated above the surface of plate 1408 and is detected by one or more of detector elements 1404, which may extend slightly above edge surfaces 1406. Furthermore, additionally or alternatively, the incident light may propagate or be transmitted through plate 1408 directly to one or more of detector elements 1404 and detected thereby. The detection of incident light by detector elements 1404 defines a baseline illumination level therefore. Light, preferably including light in the IR band emitted by one or more sources of illumination external to the integrated display and input device, is reflected from a user's finger, a stylus (not shown) or any other suitable reflective object, touching or located in propinquity to plate 1408. The reflected light is propagated within plate 1408 and is detected by one or more of detector elements 1404. Alternatively or additionally, the reflected light is propagated above the surface of plate 1408 and is detected by one or more of detector elements 1404, which may extend slightly above edge surfaces 1406. Furthermore, additionally or alternatively, the reflected light may propagate or be transmitted through plate 1408 directly to one or more of detector elements 1404 and detected thereby.

Suitable external light sources include sunlight, artificial room lighting and IR illumination emitted from a human body or other heat source. In an alternate preferred embodiment, the quantity or intensity of the reflected light may be augmented by the addition of an illumination subassembly 1412 which typically includes one or more electromagnetic radiation emitting sources. Examples of various suitable configurations of illumination subassembly 1412 are described hereinabove with reference to FIGS. 18A-18F. When the user's finger touches or is located in propinquity to plate 1408, the light reflected from the finger is detected by one or more of detector elements 1404, as described hereinabove, in addition to the baseline level of light detected by the detector elements 1404. Detector analyzing processing circuitry (not shown) preferably receives outputs of the detector elements 1404 on arrays 1402, digitally processes these outputs and determines whether the absolute amount of light detected by each of the detector elements 1404 or the change in the amount of light detected by each of the detector elements 1404 exceeds a predetermined threshold.

The amount of light detected by the individual detector elements 1404 on a given array 1402, as determined by the detector analyzing processing circuitry, is further processed to provide an array detection output. The array detection output includes information corresponding to the location of an impingement point of the user's finger relative to the given array 1402. Typically, the location of at least one detector element 1404, in which the amount of light measured or the change in the amount of light measured exceeds a predetermined threshold, corresponds to the location of the user's finger along an axis parallel to array 1402.

In the configuration shown in FIG. 19, two-dimensional location determining circuitry (not shown) preferably calculates the two-dimensional position of the impingement point of the user's finger on or above plate 1408 by combining the array detection outputs of at least two arrays, typically arranged along at least two mutually perpendicular edges 1406 of plate 1408.

Reference is now made to FIGS. 20A, 20B, 21A, 21B and 22, which are simplified illustrations of an alternative embodiment of an illumination subassembly forming part of an integrated display and input device constructed and operative in accordance with another preferred embodiment of the present invention. Alternatively or additionally, a touch responsive input functionality and/or propinquity responsive input functionality may preferably be operative to detect the positions of one or more fingers, a stylus (not shown) or any other suitable reflective object.

FIGS. 20A-22 show an integrated display and input device having touch responsive input functionality and/or propinquity responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIGS. 20A-22 illustrate object detection functionality of the type described hereinabove with reference to FIGS. 1A to 1D. As shown, a position of a user's fingers is detected by means of a touch responsive input functionality and/or propinquity responsive input functionality operative in accordance with preferred embodiments of the present invention.

As seen in FIGS. 20A-22, it is seen that arrays 1502 of light detector elements 1504 are arranged at least two mutually perpendicular edge surfaces 1506 of a viewing plane defining plate 1508. Alternatively, detector arrays 1502 may be provided along all or most of the edges 1506. As a further alternative, a single detector array 1502 may be provided along only one edge 1506 of the plate 1508. Viewing plane defining plate 1508 may be a single or multiple layer plate and may have one or more coating layers associated therewith.

It is appreciated that the phrase "at edges" is to be interpreted broadly as including structures which are located behind edges, as in the embodiments shown in FIGS. 10A-10D, 11A-11D, 15A-15D, and 16A-16D, about edges as in the embodiments shown in FIGS. 9A-9D and 14A-14D and along edges as in the embodiments shown in FIGS. 4-7, 8A-8D 12A-12D, and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIGS. 20A-22 preferably, includes an illumination subassembly 1512 which typically includes one or more electromagnetic radiation emitting sources. The illumination subassembly 1512 preferably provides a baseline illumination level which is typically detected by detector elements 1504.

In accordance with a preferred embodiment of the present invention, shown in FIGS. 20A-22, a single IR emitting LED 1516 is provided at or generally adjacent to an intersection of the mutually perpendicular edges 1506 along which detector elements 1514 are arranged. The LED 1516 is arranged such that light emitted therefrom is projected generally across the surface of plate 1508. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1516 may be affected by the specific placement of LED 1516 relative to detector arrays 1502 and the interaction between a light beam emitted from the LED 1516 and the various components of the integrated display and input device, including the plate 1508, the detector elements 1504 and other layers of the integrated display and input device. Optionally, the light emitted by LED 1516 may be modulated by modulating circuitry (not shown).

Light, preferably including light in the IR band emitted by illumination subassembly 1512, is reflected from a user's fingers, a stylus (not shown) or any other suitable reflective object, touching or located in propinquity to plate 1508. The reflected light is propagated within plate 1508 and is detected by one or more of detector elements 1504. Alternatively or additionally, the reflected light is propagated above the surface of plate 1508 and is detected by one or more of detector elements 1504, which may extend slightly above edge surfaces 1506. Furthermore, additionally or alternatively, the reflected light may propagate or be transmitted through plate 1508 directly to one or more of detector elements 1504 and detected thereby.

Figure 20B:
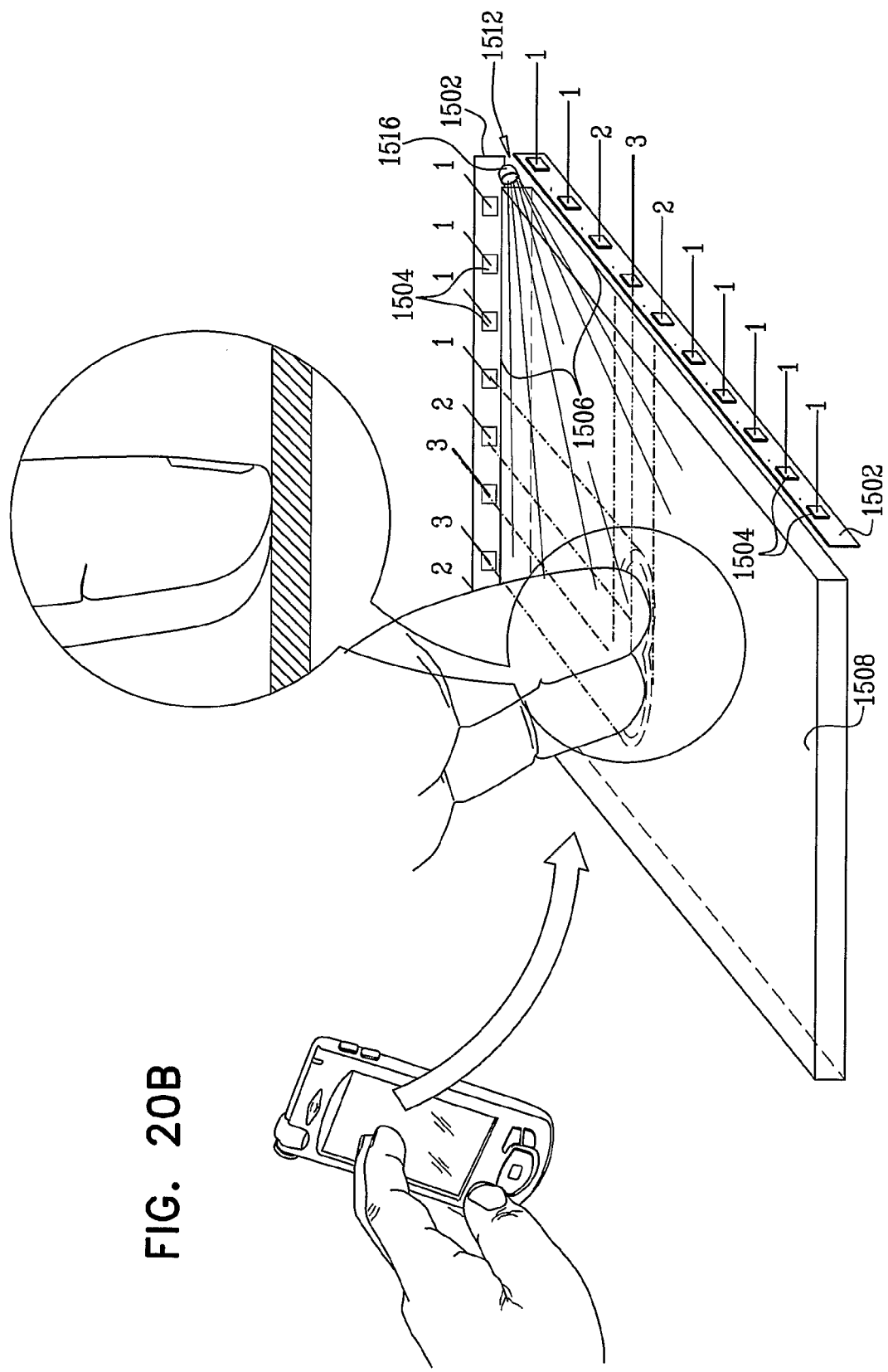

As seen in FIGS. 20A and 20B, the user's fingers are adjacent to one another. In FIG. 20A, the user's fingers are located in propinquity to plate 1508, at a height H therefrom, and in FIG. 20B, the user's fingers touch plate 1508.

When the user's fingers touch, as in FIG. 20B, or is located in propinquity to, as in FIG. 20A, plate 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold. It is noted that the finger which is closer to the plate produces a smaller, more intense, light pattern while the finger which is further from the plate produces a larger, more diffuse light pattern. These patterns are readily detected and distinguished by the array 1502 of detector elements 1504.

The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

In the configuration shown in FIGS. 20A and 20B, two-dimensional location determining circuitry (not shown) preferably calculates the two-dimensional position of the impingement points of the user's fingers on or above plate 1508 by combining the array detection outputs of at least two detector arrays, typically arranged along at least two mutually perpendicular edges 1506 of plate 1508.

Figure 21A:
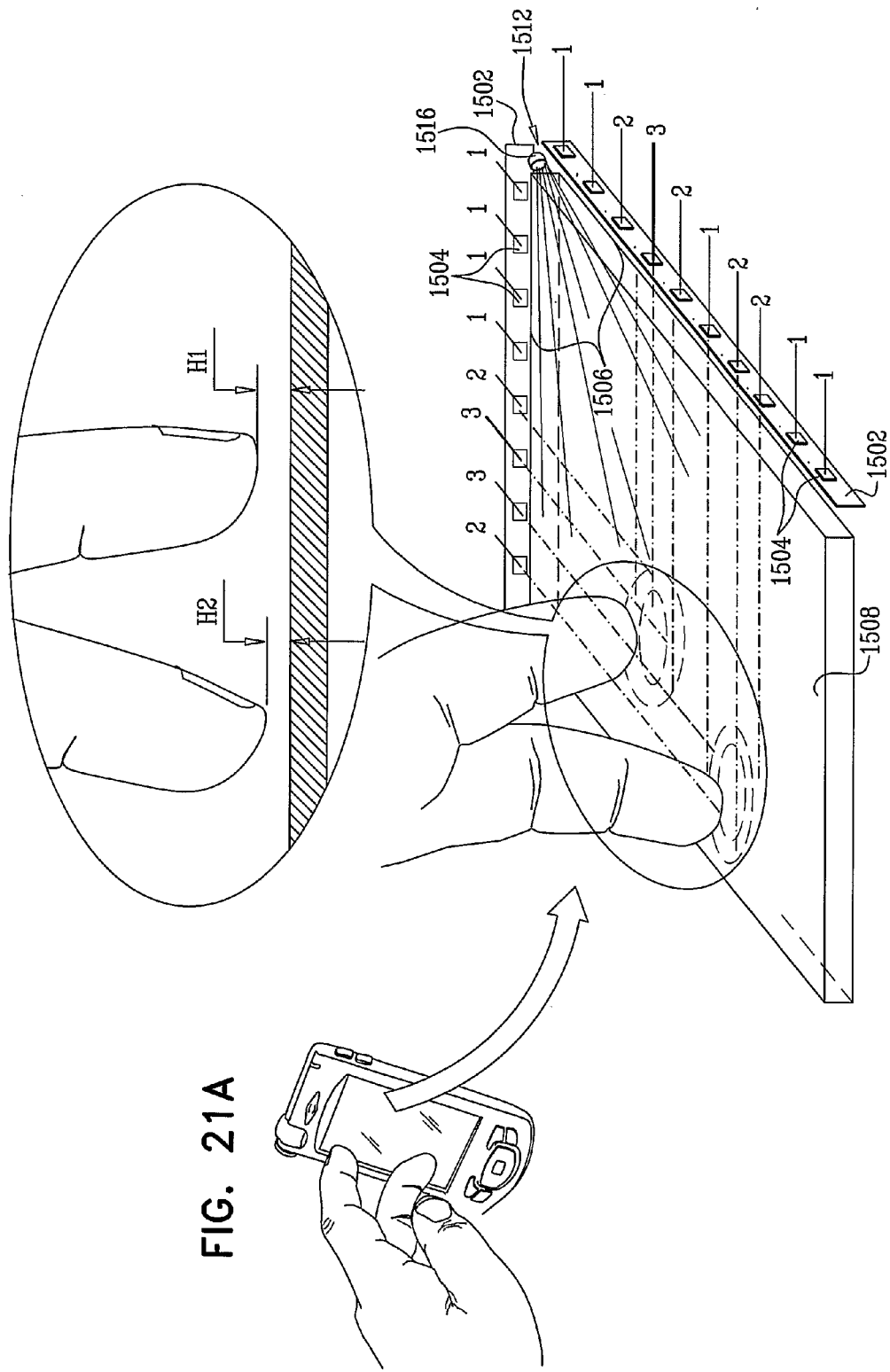

As seen in FIGS. 21A and 21B, the user's fingers are located at a distance from one another. In FIG. 21A, the user's fingers are located in propinquity to plate 1508, at respective heights H1 and H2 therefrom, and in FIG. 21B, the user's fingers touch plate 1508. It is appreciated that H1 may be less than, equal to or greater than H2.

When the user's fingers touches, as in FIG. 21B, or is located in propinquity to, as in FIG. 21A, plate 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold. The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

In the configuration shown in FIGS. 21A and 21B, two-dimensional location determining circuitry (not shown) preferably calculates the two-dimensional position of the impingement points of the user's fingers on or above plate 1508 by combining the array detection outputs of at least two detector arrays, typically arranged along at least two mutually perpendicular edges 1506 of plate 1508.

Figure 22:
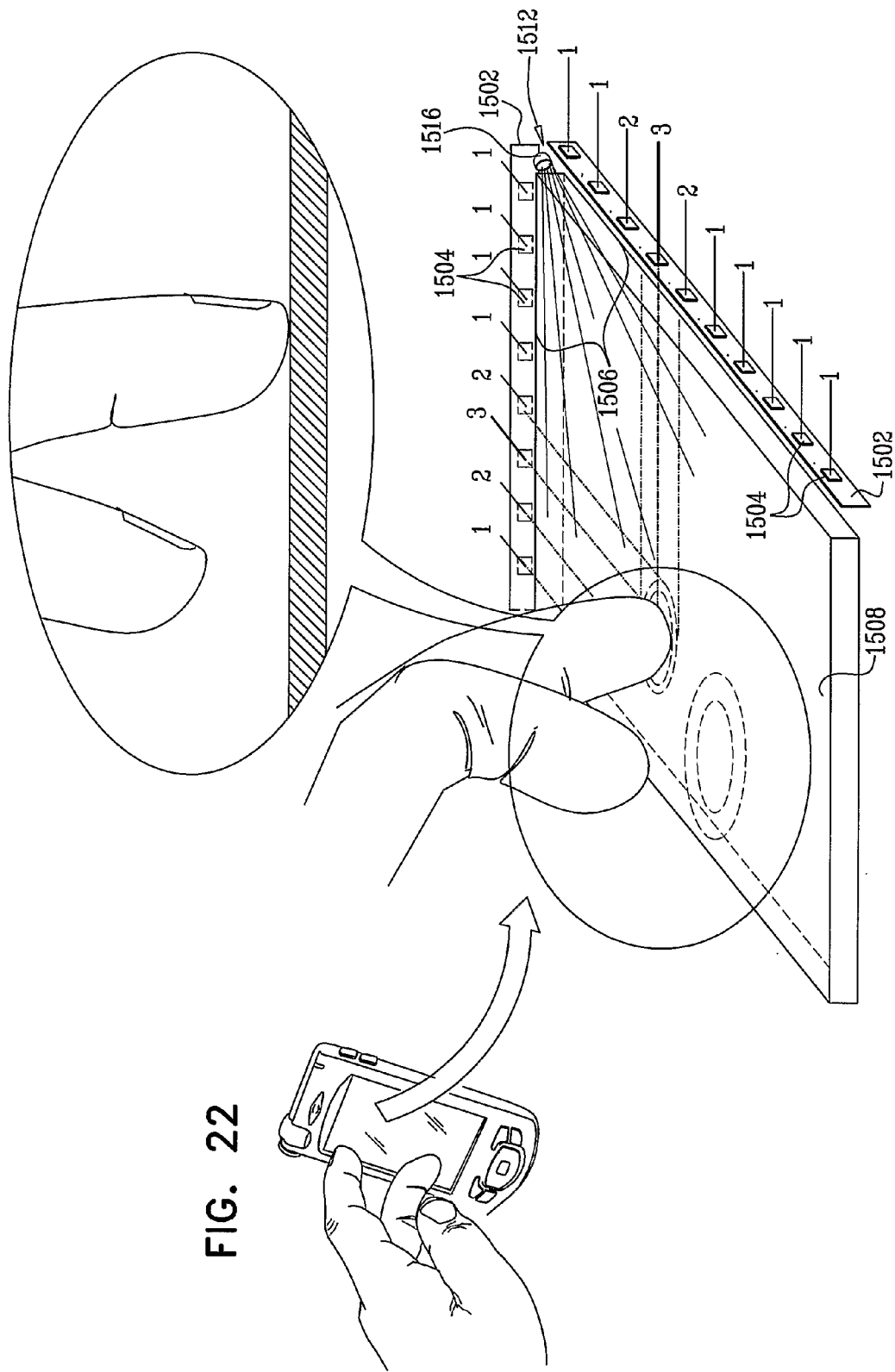

As seen in FIG. 22, one of the user's fingers is located in propinquity to but not touching plate 1508 and one of the user's fingers is touching plate 1508. When the user's fingers touch, or are located in propinquity to, plate 1508, the light reflected from the fingers is detected by one or more of detector elements 1504, as described hereinabove, in addition to the baseline level of light detected by the detector elements 1504. Detector analyzing processing circuitry (not shown) preferably receives outputs of the detector elements 1504 on detector arrays 1502, digitally processes these outputs and determines whether the absolute amount of light detected by each of the detector elements 1504 or the change in the amount of light detected by each of the detector elements 1504 exceeds a predetermined threshold.

The amount of light detected by the individual detector elements 1504 on a given detector array 1502, as determined by the detector analyzing processing circuitry, is further processed to provide an array detection output. The array detection output includes information corresponding to the locations of impingement points of the user's fingers relative to the given detector array 1502. Typically, the locations of at least one detector element 1504, in which the amount of light measured or the change in the amount of light measured exceeds a predetermined threshold, correspond to the locations of the user's fingers along an axis parallel to the given detector array 1502.

In the configuration shown in FIG. 22, two-dimensional location determining circuitry (not shown) preferably calculates the two-dimensional position of the impingement points of the user's fingers on or above plate 1508 by combining the array detection outputs of at least two detector arrays, typically arranged along at least two mutually perpendicular edges 1506 of plate 1508. As seen in the embodiment of FIG. 22, it is seen that the touching/non-touching positions of the two fingers are distinguishable from each other. In the illustrated embodiment, when one finger touches the screen and the other does not but is located in propinquity thereto, the utilization circuitry may, for example, be responsive to the touching finger and ignore then non-touching finger. Alternatively, the utilization circuitry may, for example, be differentially responsive to both the touching and the non-touching fingers and utilize their positions and/or movement to actuate different functionalities.

Reference is now made to FIGS. 23A-23E, which illustrate desktop user interface functionality of an integrated display and input device constructed and operative in accordance with a preferred embodiment of the present invention. Preferably the integrated display and input device is a mobile computer and/or communicator 1600 constructed and operative in accordance with the teachings of one or more of the following applicants'/inventors' patent documents: Published PCT International Patent Applications: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 1602 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 1604 may be provided as part of the integrated display and input device but may be obviated in accordance with a preferred embodiment of the present invention.

Figure 23A:
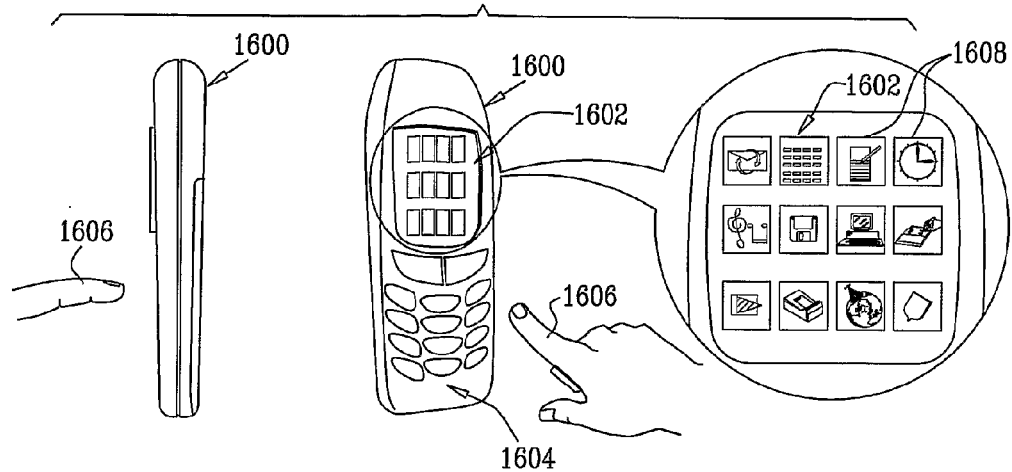
FIGS. 23A, 23B, 23C, 23D, and 23E are illustrations of desktop user interface functionality of a mobile device constructed and operative in accordance with a preferred embodiment of the present invention.

FIG. 23A shows a finger 1606 located adjacent keyboard 1604 and not adjacent display screen 1602, which display screen 1602, as described above, includes touch responsive input functionality and/or propinquity responsive input functionality. In the arrangement shown in FIG. 23A, display screen 1602 typically displays an array of application launch icons 1608.

Figure 23B:
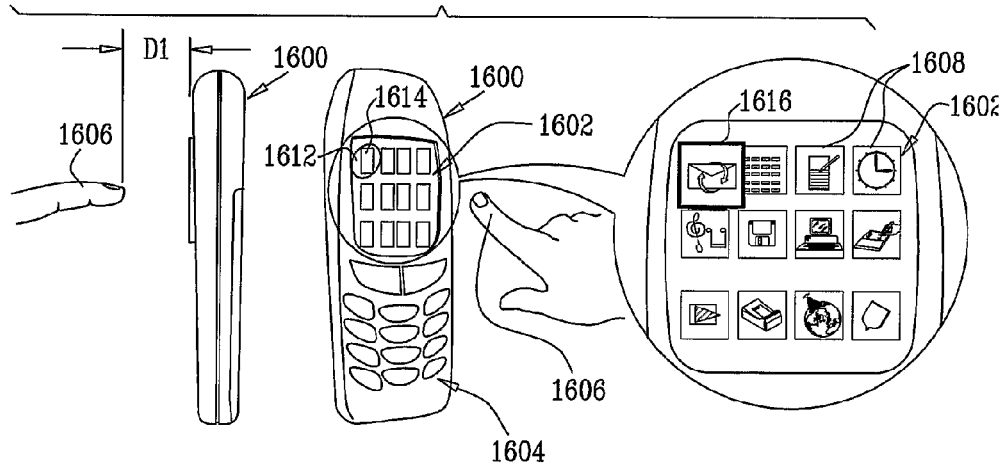

FIG. 23B shows finger 1606 located at a first distance D1 from display screen 1602, such that the propinquity responsive input functionality senses finger 1606 in propinquity to display screen 1602 which defines an impingement area 1612 of light reflected from finger 1606 that is generally centered on a first application launch icon 1614, even though it may also partially impinge on other icons. The functionality of the mobile device 1600 causes icon 1614 to appear in an enlarged or otherwise visually sensibly emphasized form, as indicated by reference numeral 1616.

Figure 23C:
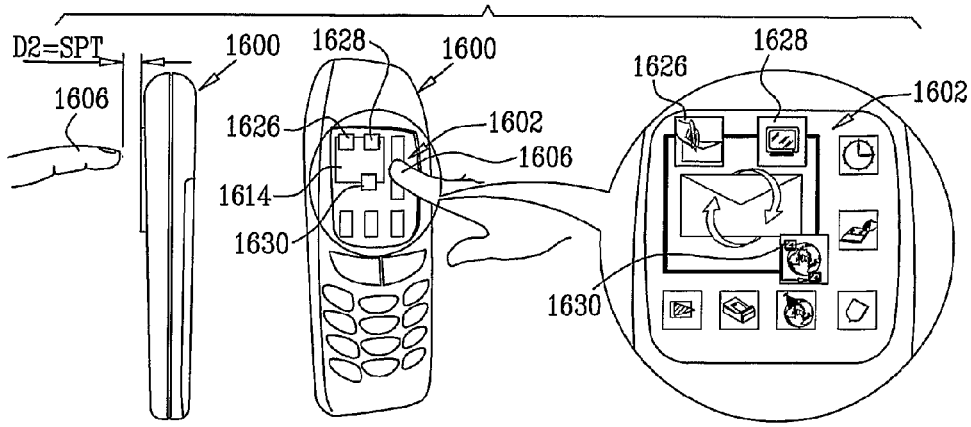

In accordance with a preferred embodiment of the present invention, as shown in FIG. 23C, when finger 1606 is located at a second distance D2 from display screen 1602, which may be less than to D1, which preferably is selected as a sub-icon presentation threshold distance SPT, the functionality of the mobile device 1600 causes sub-icons 1626, 1628 & 1630 to appear, preferably in propinquity to the icon 1614 impinged upon by finger 1606.

Figure 23D:
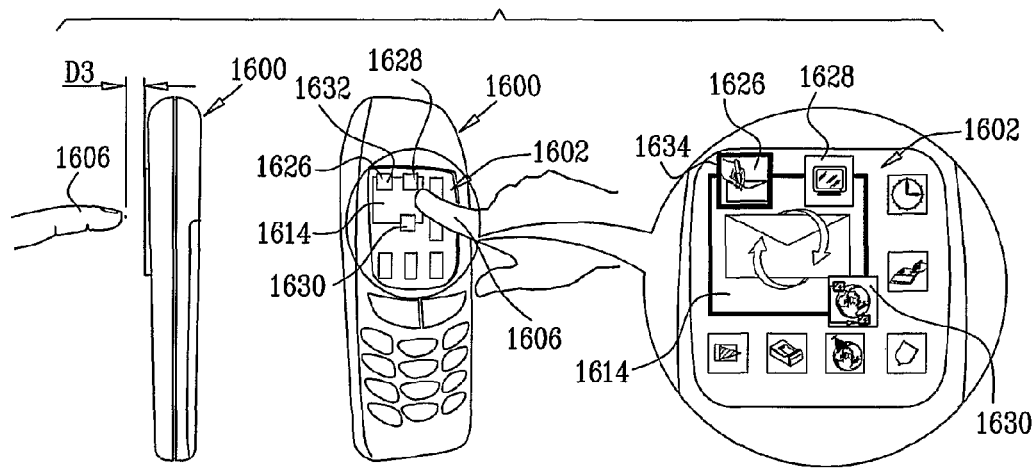

FIG. 23D shows finger 1606 located at a third distance D3 from display screen 1602, which may be greater than or less than or equal to D2, such that the impingement area 1632 of light reflected from finger 1606 is generally centered on one of the sub-icons, for example sub-icon 1626. The functionality of the mobile device 1600 causes sub-icon 1626 to appear in a visually sensibly emphasized form, as indicated by reference numeral 1634. This enables sub-icon 1626 to be readily identified by a user.

It is appreciated that the functionalities illustrated in some but not all of FIGS. 23A, 23B, 23C, and 23D may be obviated in a system which is differentially responsive to touch and propinquity, but does not distinguish between degrees of propinquity within a given threshold.

Figure 23E:
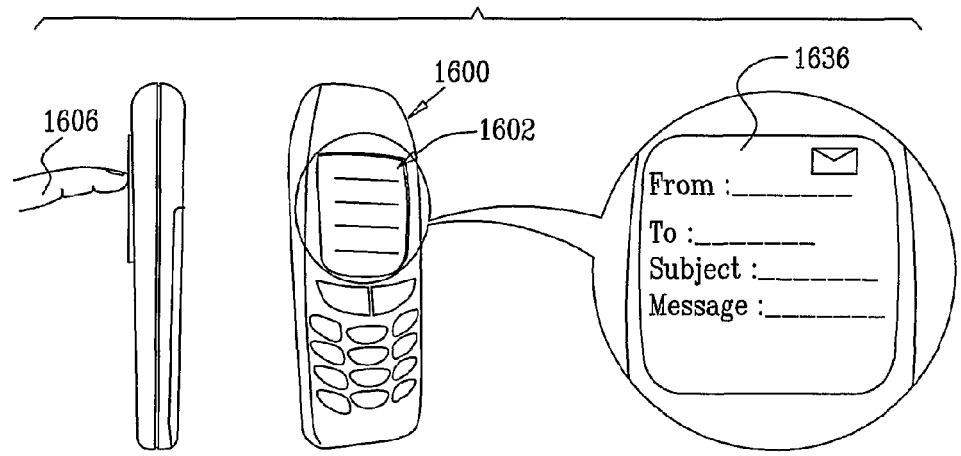

In accordance with a preferred embodiment of the present invention, as shown in FIG. 23E, when the finger 1606 touches the display screen 1602, a selection function is actuated, which may be considered akin to the click of a conventional mouse. Actuation of the selection function is preferably accompanied by feedback to the user, such as visual, auditory or tactile feedback.

In accordance with a preferred embodiment of the present invention, where an icon, such as icon 1614, launches an application at an initial or default launch stage, sub-icons, such as sub-icons 1626, 1628 and 1630, may be used to both launch the application and to actuate a given functional stage thereof. For example, if icon 1614 represents an email application and if the user selects sub-icon 1626, as illustrated in FIG. 23E, the email application is launched and an email message template 1636 is displayed, as shown. It is appreciated that as shown in the above example, a single finger movement from outside SPT to inside ST can replace multiple touch engagements required by prior art devices.

It is appreciated that the functionality of FIGS. 23A-23E may be provided and/or used alone or in combination with any other suitable functionality, such as any one or more of the other functionalities described herein below with reference to FIGS. 24A-33G.

Figure 24A:
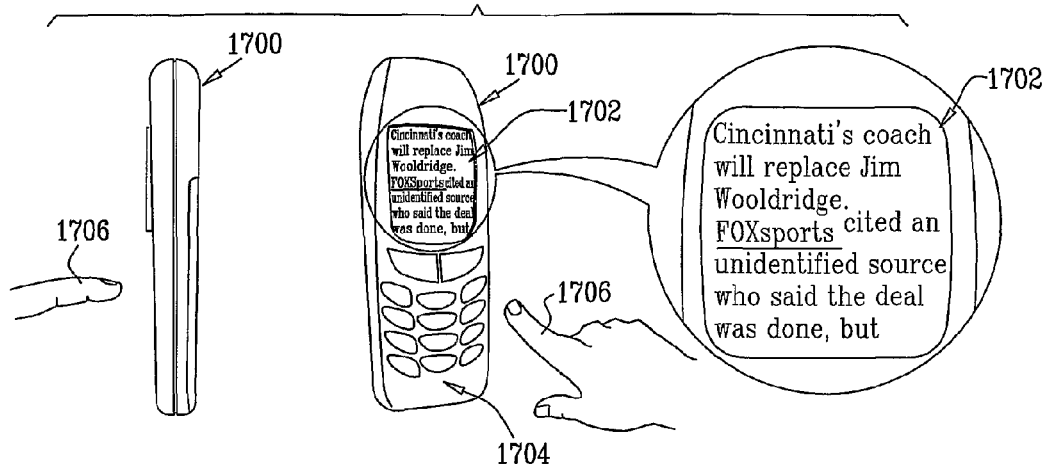
FIGS. 24A, 24B, and 24C are illustrations of browsing functionality of a mobile device constructed and operative in accordance with a preferred embodiment of the present invention.
Figure 24B:
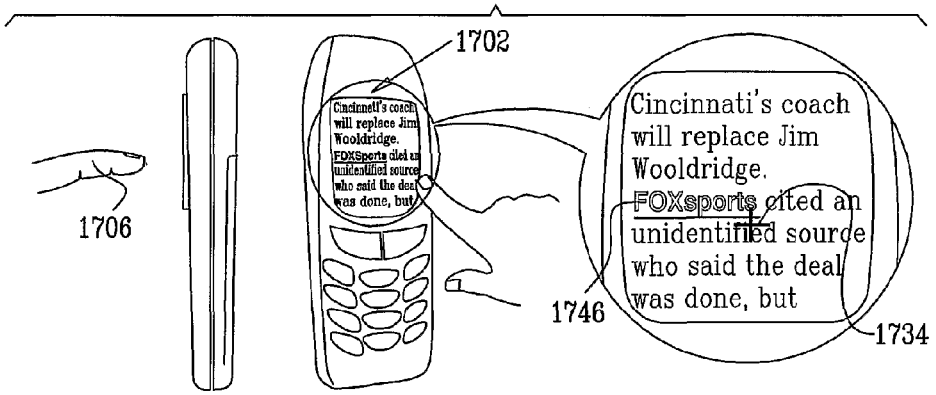
Figure 24C:
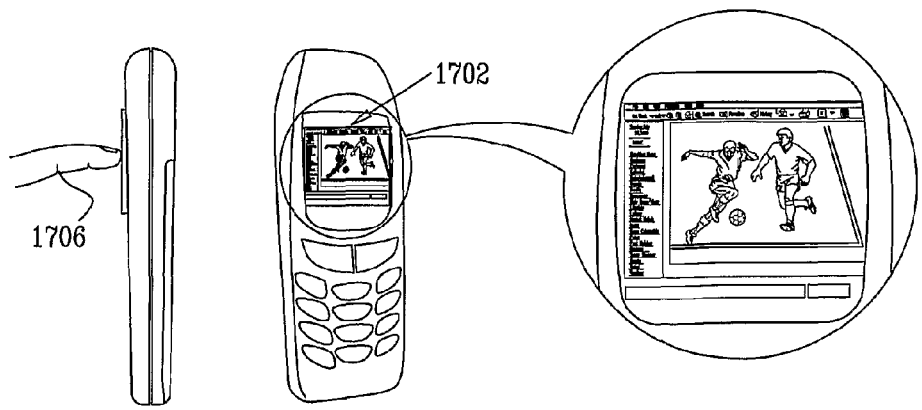

Reference is now made to FIGS. 24A-24C, which illustrate browsing functionality of an integrated display and input device constructed and operative in accordance with a preferred embodiment of the present invention. Preferably the integrated display and input device is a mobile computer and/or communicator 1700 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference. Preferably the mobile device includes a display screen 1702 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 1704 may be provided as part of the integrated display and input device but may be obviated in accordance with a preferred embodiment of the present invention.

FIG. 24A shows a finger 1706 located adjacent keyboard 1704 and not adjacent display screen 1702, which display screen 1702, as described above, includes touch responsive input functionality and/or propinquity responsive input functionality. In the arrangement shown in FIG. 24A, display screen 1702 displays a portion of a web page.

FIG. 24B shows finger 1706 located at a distance from display screen 1702, such that the propinquity responsive input functionality senses finger 1706 in propinquity to display screen 1702 which defines an impingement area for light reflected from finger 1706, having a center which preferably is indicated by a cursor 1734 or other visual indicator.

Preferably, in accordance with a preferred embodiment of the present invention, when the distance of the finger 1706 is less than or equal to a lock threshold, the screen view area is locked, for example as shown in FIG. 24B, and remains the same even if the finger 1706 is subsequently moved further away from the display screen 1702, or is subsequently located in a different direction.

In accordance with a preferred embodiment of the present invention, when the browser functionality is in a locked state, as described hereinabove, if the cursor 1734 is located in propinquity to a hyperlink, as shown in FIG. 24B, the link may appear in a visually sensibly emphasized form, as indicated by reference numeral 1746, enabling the link to be readily identified by a user.

In accordance with a preferred embodiment of the present invention, as shown in FIG. 24C, when the finger 1706 touches the display screen 1702, an additional selection function is actuated, which may be considered akin to the click of a conventional mouse. Actuation of the selection function is preferably accompanied by feedback to the user, such as visual, auditory or tactile feedback.

When the finger 1706 touches the display 1702, the link may be actuated and thus, for example, open a new web page, as shown in FIG. 24C, or launch a program or initiate a download or other functionality.

It is appreciated that some but not all of the functionalities illustrated in FIGS. 24A and 24B may be obviated in a system which is differentially responsive to touch and propinquity, but does not distinguish between degrees of propinquity within a given threshold.

It is appreciated that the functionality of FIGS. 24A-24C may be provided and/or used alone or in combination with any other suitable functionality, such as any one or more of the other functionalities described hereinabove with reference to FIGS. 23A-23E and/or herein below with reference to FIGS. 25A-33G.

Figure 25A:
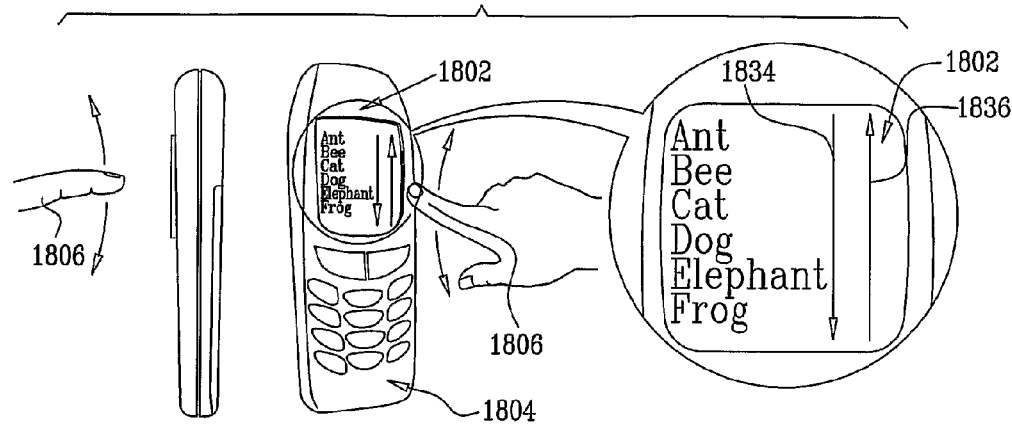
FIGS. 25A and 25B are illustrations of document viewing functionality of a mobile device constructed and operative in accordance with a preferred embodiment of the present invention.
Figure 25B:
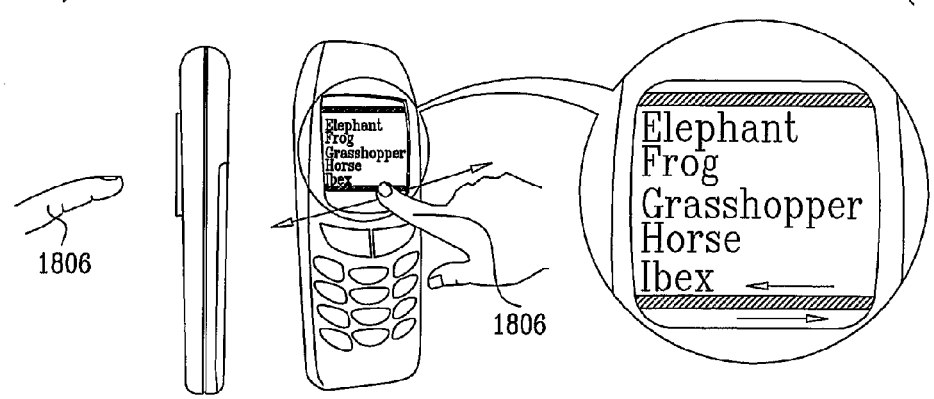

Reference is now made to FIGS. 25A and 25B, which illustrate scrolling functionality of an integrated display and input device constructed and operative in accordance with a preferred embodiment of the present invention. Preferably the integrated display and input device is a mobile computer and/or communicator 1800 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference. Preferably the mobile device includes a display screen 1802 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 1804 may be provided as part of the integrated display and input device but may be obviated in accordance with a preferred embodiment of the present invention.

As seen in FIG. 25A, when a finger 1806 is located in propinquity to the display screen 1802, and is moved upward or downward along the page, as designated respectively by reference numerals 1834 and 1836, a relatively fast upward or downward scrolling function is provided. As discussed above, the speed of the scrolling may be but need not necessarily be dependent on the distance of the finger 1806 from the display screen 1802, preferably such that when the finger 1806 is closer, the scrolling is slower.

Turning now to FIG. 25B, it is seen that in addition to upward and downward scrolling, side-to-side scrolling and diagonal scrolling may also be provided.

The speed of scrolling may be but need not necessarily be responsive to the distance of the finger 1806 from the screen 1802.

It is appreciated that the functionality of FIGS. 25A and 25B may be provided and/or used alone or in combination with any other suitable functionality, such as any one or more of the other functionalities described hereinabove with reference to FIGS. 23A-24C herein and/or as described herein below in reference to FIGS. 26A-33G. Reference is now made to FIGS. 26A, 26B, 26C, 26D and 26E, which are illustrations of contact management functionality of an integrated display and input device constructed and operative in accordance with a preferred embodiment of the present invention. Preferably the integrated display and input device is a mobile computer and/or communicator 1900 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 1902 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 1904 may be provided as part of the integrated display and input device but may be obviated in accordance with a preferred embodiment of the present invention.

Figure 26A:
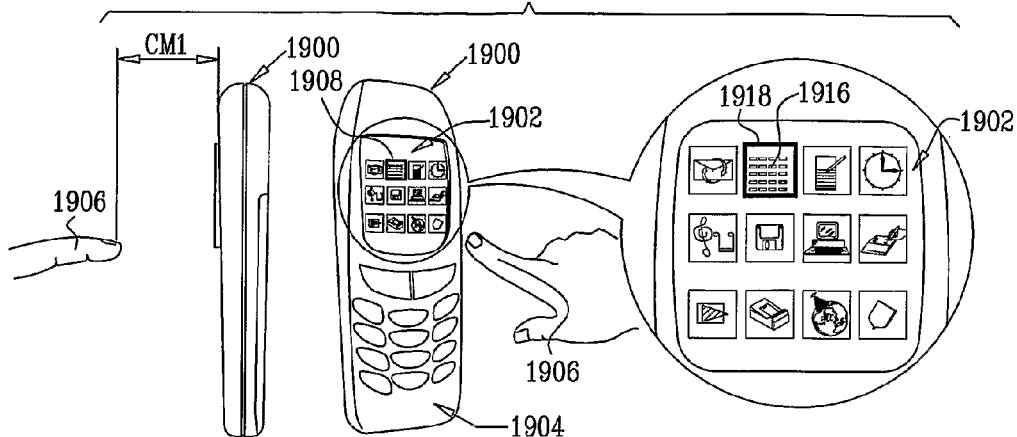
FIGS. 26A, 26B, 26C, 26D, and 26E are illustrations of contact management functionality of a mobile device constructed and operative in accordance with a preferred embodiment of the present invention.

As seen in FIG. 26A, a finger 1906, located at a distance CM1 from display screen 1902, such that the propinquity responsive input functionality senses finger 1906 in propinquity to display screen 1902, which defines an impingement area 1908 of light reflected from finger 1906 that is generally centered on a contact manager icon 1916.

Figure 26B:
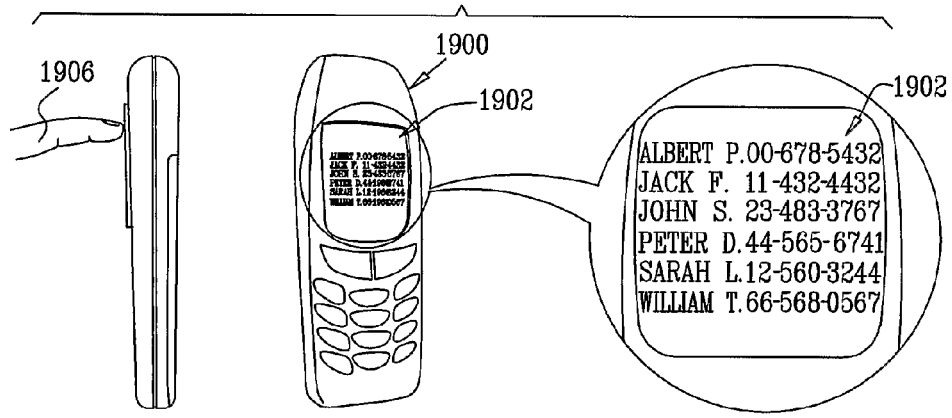

The functionality of the integrated display and input device 1900 causes icon 1916 to appear in a visually sensibly emphasized form, as indicated by reference numeral 1918. Similarly to that discussed hereinabove with reference to FIG. 23E, when, as shown in FIG. 26B, finger 1906 touches the display 1902, a selection function is actuated. For example, if a user selects icon 1916, the contact manager is launched. FIG. 26B shows the result of selection of icon 1916. Zooming functionality may also be provided. Additionally or alternatively, locking functionality of the type described hereinabove with reference to FIGS. 24B and 24C may be provided.

Additionally or alternatively, hyperlink functionality of the type described hereinabove with reference to FIGS. 24B and 24C may be provided.

Figure 26C:
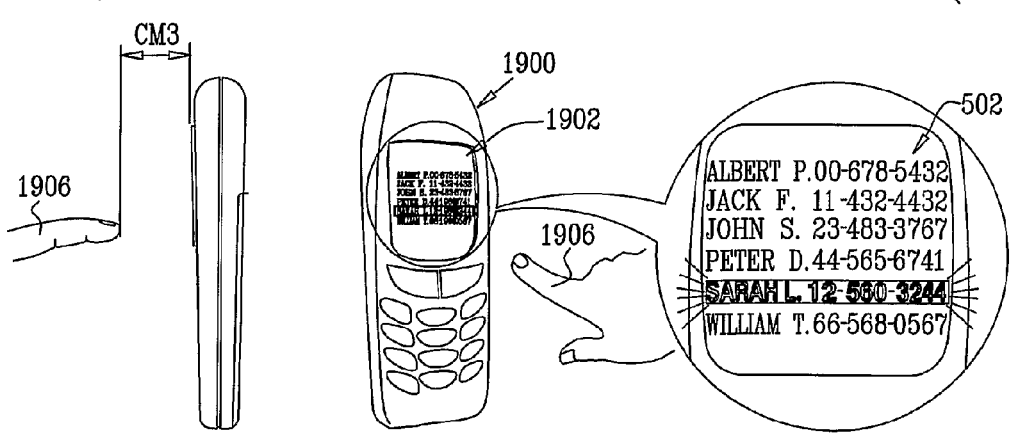
Figure 26D:
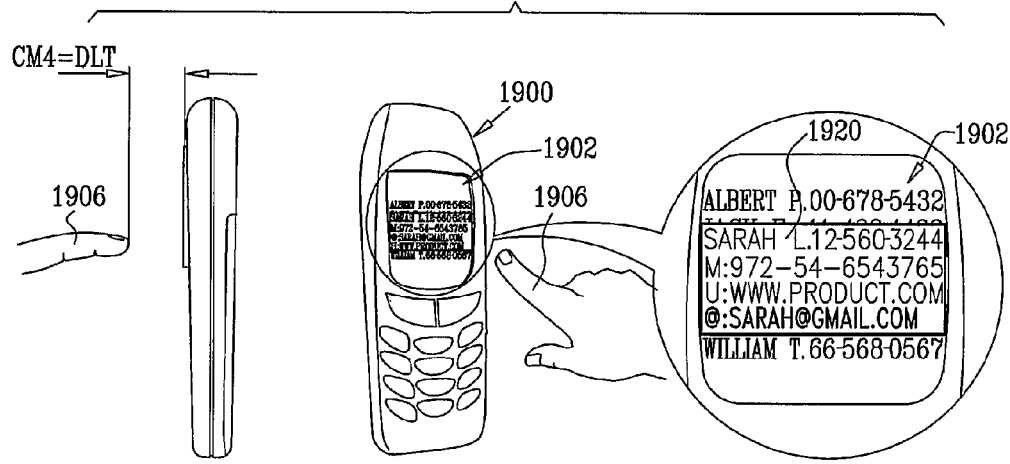
Figure 26E:
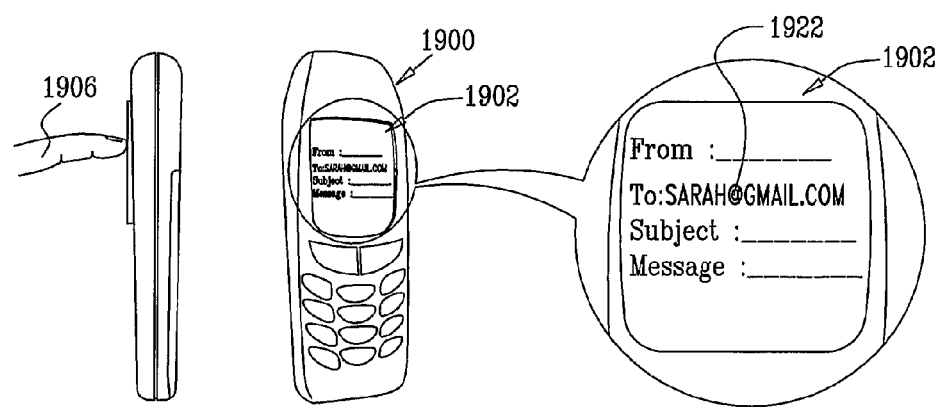

Additionally or alternatively, tool bar/tab functionality of the type described herein below with reference to FIGS. 27A-27D may be provided. Reference is now made to FIG. 26C, which illustrates highlighting a contact entry line by positioning finger 1906 such that the propinquity responsive input functionality senses finger 1906 in propinquity to display screen 1902, when finger 1906 is located at a distance CM3 from the display screen 1902. FIG. 26D shows the finger 1906 located at the same location and now located at a distance CM4 from display screen 1902, which is equal to or less than a predetermined drop list threshold DLT. This causes a sub-menu 1920 to appear on display screen 1902. The submenu 1920 typically includes contact details corresponding to a given contact entry line. These may include, for example, an email address, a fax number, a mobile telephone number, a VoIP number and a home page URL. Positioning finger 1906 at one of the items on the submenu 1920 results in the highlighting of that item, as shown in FIG. 26E. If, while at the same location, finger 1906 is brought even closer to the display screen 1902, such as to a distance CMS, equal to or less than selection threshold ST, a function associated with that item is actuated. For example, if finger 1906 is located at an email address, an email functionality is actuated and the email address is automatically inserted as designated by reference numeral 1922. As another example, if finger 1906 is located at a telephone number, the telephone number is dialed.

It is appreciated that some but not all of the functionalities illustrated in FIGS. 26A-26D may be obviated in a system which is differentially responsive to touch and propinquity, but does not distinguish between degrees of propinquity within a given threshold.

It is appreciated that the functionality of FIGS. 26A-26E may be provided and/or used alone or in combination with any other suitable functionality, such as any one or more of the other functionalities described hereinabove with reference to FIGS. 23A-25B and/or herein below with reference to FIGS. 27A-33G.

Reference is now made to FIGS. 27A, 27B, 27C and 27D, which illustrate tool bar/tab functionality, of an integrated display and input device constructed and operative in accordance with a preferred embodiment of the present invention, in a web browsing environment, such as that illustrated in FIGS. 24A-24C. Preferably, the integrated display and input device is a mobile computer and/or communicator 2000 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference. Preferably the mobile device includes a display screen 2002 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 2004 may be provided as part of the integrated display and input device but may be obviated in accordance with a preferred embodiment of the present invention.

Figure 27A:
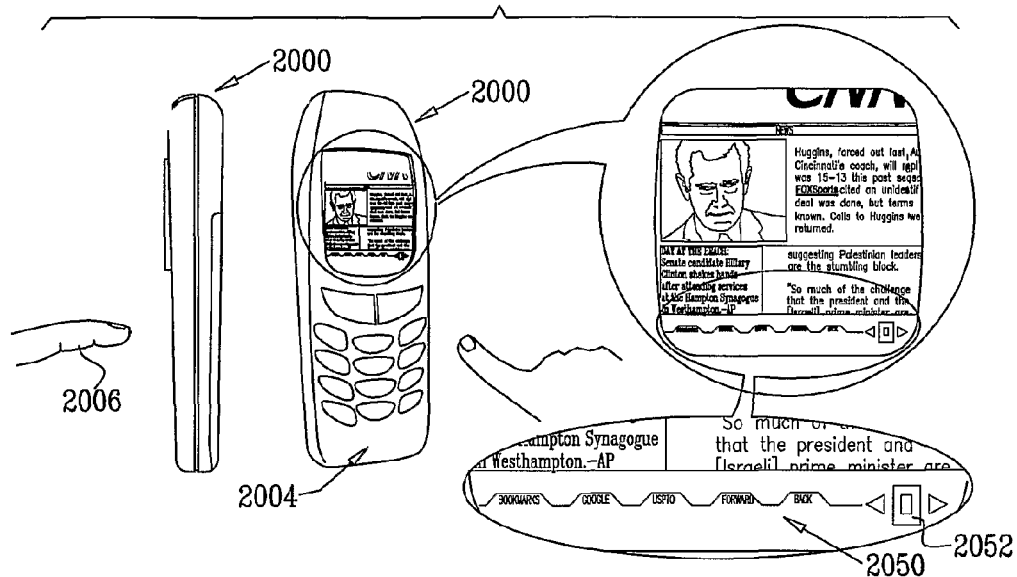
FIGS. 27A, 27B, 27C, and 27D are illustrations of desktop user interface functionality of a mobile device constructed and operative in accordance with a preferred embodiment of the present invention.

FIG. 27A shows a finger 2006 located at keyboard 2004 and not located at display screen 2002, which display screen 2002, as described above, includes touch responsive input functionality and/or propinquity responsive input functionality. In the arrangement shown in FIG. 27A, at one stage in a web-browsing environment, a tool bar 2050 including a plurality of icons, preferably including a zoom navigator icon 2052, is provided. Other functional icons which may be provided include, for example, an icon operative for restoring an image to full-page view, an icon operative for going back a page, an icon for going forward a page, an icon for navigating to a predetermined web page, an icon which creates a bookmark and an icon navigating to a selectable list of bookmarked web addresses.

Figure 27B:
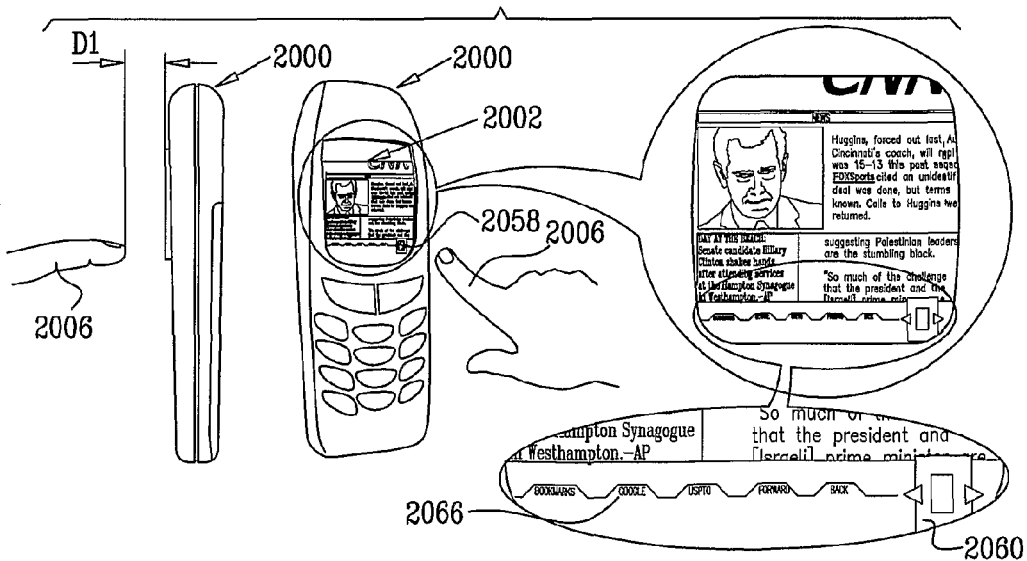

FIG. 27B shows finger 2006 located at a first distance D1 from display screen 2002, such that the propinquity responsive input functionality senses finger 2006 in propinquity to display screen 2002 which defines an impingement area of light reflected from finger 2006 which causes the appearance of icon 2052 (FIG. 27A) to be enlarged, as designated by reference numeral 2060.

Figure 27C:
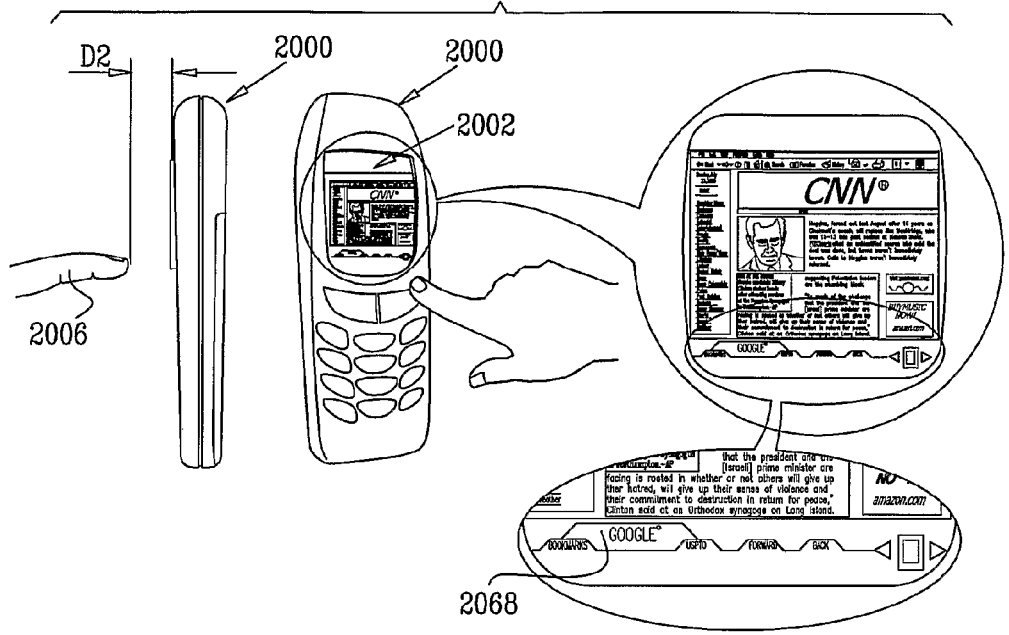

In accordance with a preferred embodiment of the present invention, as shown in FIG. 27C, when finger 2006 is located at a second distance D2 from display screen 2002, which may be less than to D1, the propinquity responsive input functionality senses finger 2006 in propinquity to display screen 2002 and defines an impingement on a search engine tab, such as a GOOGLE® tab 2066 (FIG. 27B), causing the appearance of the tab to be enlarged, as designated by reference numeral 2068.

Figure 27D:
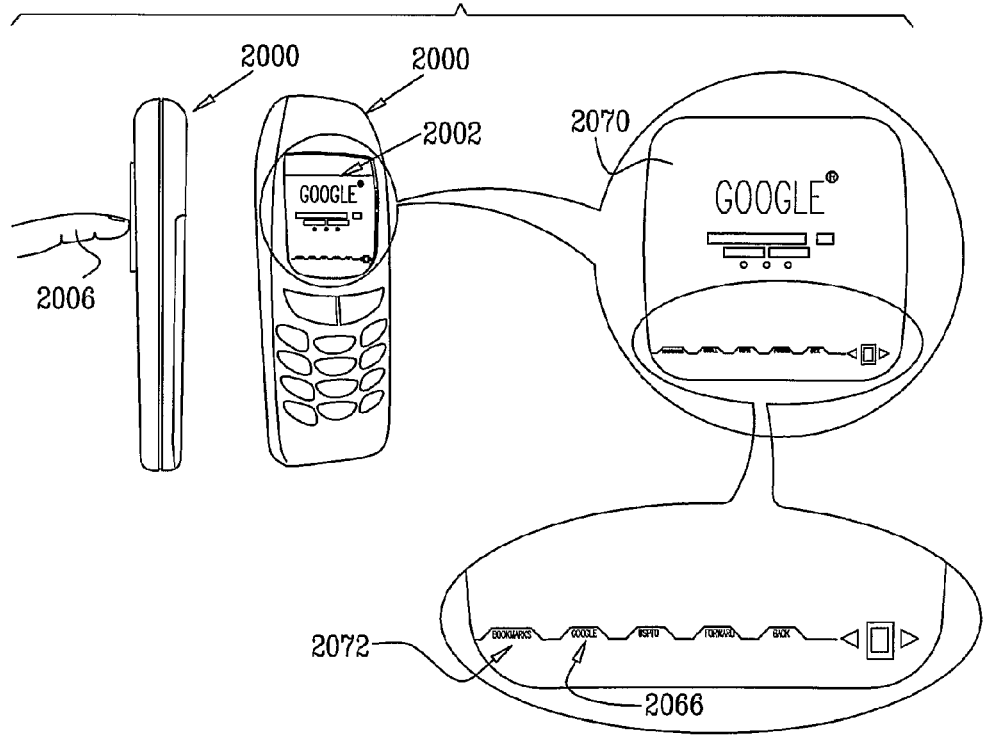

FIG. 27D shows finger 2006 touching display screen 2002. This actuates the functionality of the search engine tab 2066, which, for example, launches the GOOGLE® search engine, as designated by reference numeral 2070. It is appreciated that any of the icon and sub-icon functionalities described elsewhere herein may also be provided for tool bar or tab icons.

It is appreciated that some but not all of the functionalities illustrated in FIGS. 27A-27C may be obviated in a system which is differentially responsive to touch and propinquity, but does not distinguish between degrees of propinquity within a given threshold.

It will be appreciated that the functionalities described above with reference to FIGS. 27A-27D allow icons or buttons to be unobtrusively present when not in use, and grow and gain prominence in the display as desired. At an intermediate zoom-in level, the icons are sufficiently visibly enlarged to enable greater user discrimination, and to determine more easily if the icon does in fact represent the desired function. When fully zoomed, the icons are very usable. This also allows a greater number of functional icons to be practically available in a limited space.

It is appreciated that the functionality shown in FIGS. 24A-24C and 27A-27D enables convenient viewing of a web page without requiring reformatting of the web page to optimally fit a mobile device or provision of a pre-optimized web page.

It is appreciated that the functionality of FIGS. 27A-27D may be provided and/or used alone or in combination with any other suitable functionality, such as any one or more of the other functionalities described hereinabove with reference to FIGS. 23A-26E and/or herein below with reference to FIGS. 28A-33G.

Figure 28A:
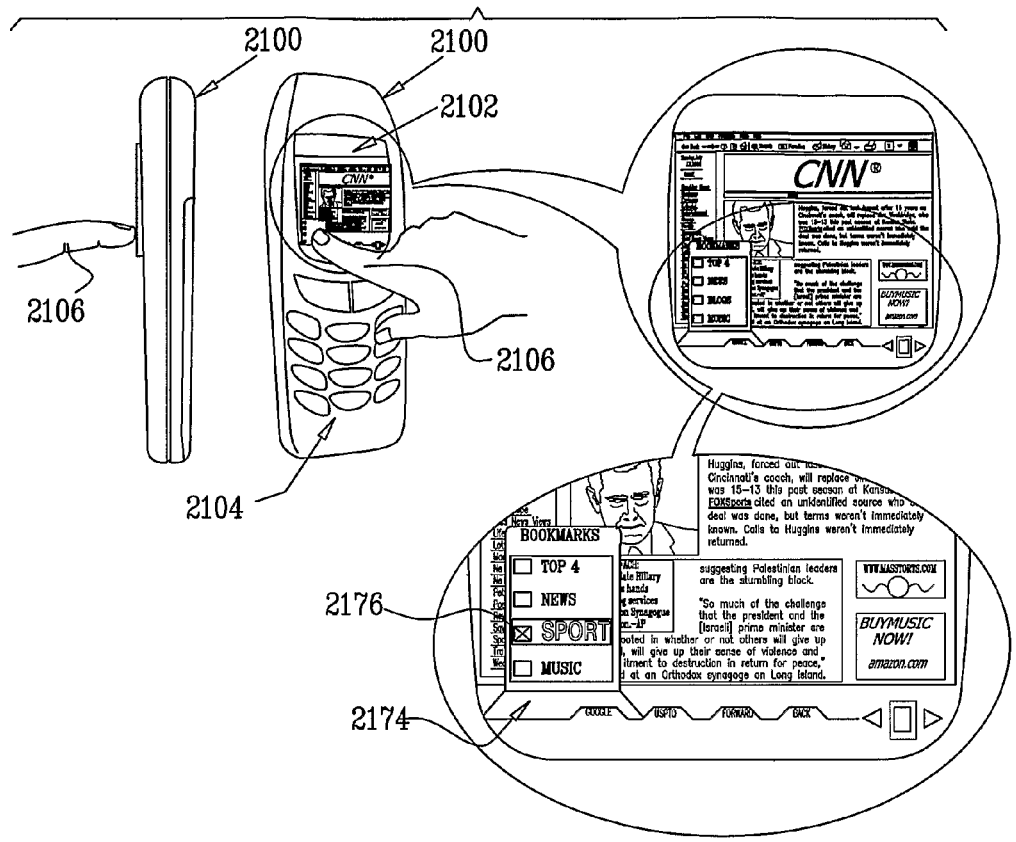
FIGS. 28A and 28B are illustrations of desktop user interface functionality of a mobile device constructed and operative in accordance with a preferred embodiment of the present invention.
Figure 28B:
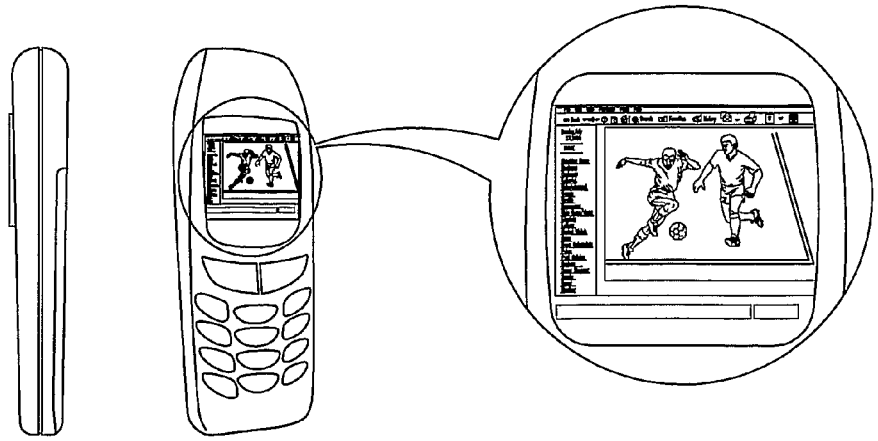

Reference is now made to FIGS. 28A and 28B, which illustrate additional browsing functionality of an integrated display and input device constructed and operative in accordance with a preferred embodiment of the present invention, in a web-browsing environment, such as that illustrated in FIGS. 24A-24C and FIGS. 27A-27D. Preferably, the integrated display and input device is a mobile computer and/or communicator 2100 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 2102 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 2104 may be provided as part of the integrated display and input device but may be obviated in accordance with a preferred embodiment of the present invention.

FIG. 28A shows a finger 2106 located at display screen 2102, which display screen 2102, as described above, includes touch responsive input functionality and/or propinquity responsive input functionality. In the arrangement shown in FIG. 28A, at one stage in a web-browsing environment, a selection box 2174 including a plurality of selections, preferably including a sports selection 2176, is provided. Other selections which may be provided include, for example, a group of favorites or bookmarked web addresses.

As seen in FIG. 28A, finger 2106 is touching display screen 2102, such that the touch responsive input functionality senses finger 2106 and actuates the selection function, similar to the click of a conventional mouse. Actuation of the selection function preferably loads the selected web page, as seen in FIG. 28B, or launches a program or initiates a download or other functionality.

Alternatively, finger 2106 may be at a distance from display screen 2102, such that the propinquity responsive input functionality senses finger 2106 in propinquity to display screen 2102 and actuates the selection function.

It is appreciated that the functionality of FIGS. 28A-28B may be provided and/or used alone or in combination with any other suitable functionality, such as any one or more of the other functionalities described hereinabove with reference to FIGS. 23A-27D and/or herein below with reference to FIGS. 29A-33G.

Reference is now made to FIGS. 29A-29E, which illustrate document viewing functionality of an integrated display and input device constructed and operative in accordance with a preferred embodiment of the present invention. Preferably the integrated display and input device is a mobile computer and/or communicator 2200 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 2202 having touch responsive input functionality and/or propinquity responsive input functionality, as described hereinabove with reference to FIGS. 20A-22, and user interface function selection functionality which is responsive to inputs received from the touch responsive input functionality and/or propinquity responsive input functionality. A keyboard 2204 may be provided as part of the integrated input and display device but may be obviated in accordance with a preferred embodiment of the present invention.

FIG. 29 A shows a finger 2206 located at a distance D1 from display screen 2202, such that the propinquity responsive input functionality senses finger 2206 in propinquity to display screen 2202 which defines an impingement area 2208 of light reflected from finger 2206 that is generally centered on one of the sub-icons, for example sub-icon 2216.

Figure 29A:
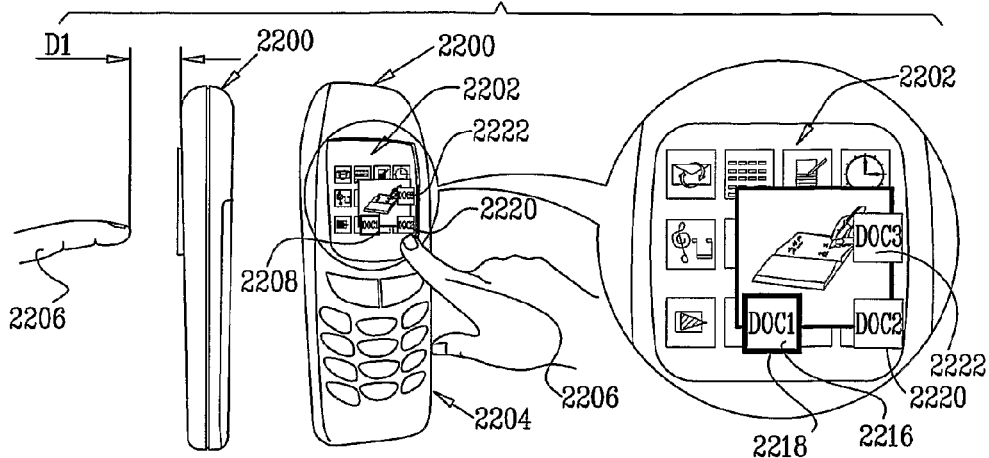
FIGS. 29A, 29B, 29C, 29D, and 29E are illustrations of browsing functionality of a mobile device constructed and operative in accordance with a preferred embodiment of the present invention.
Figure 29B:
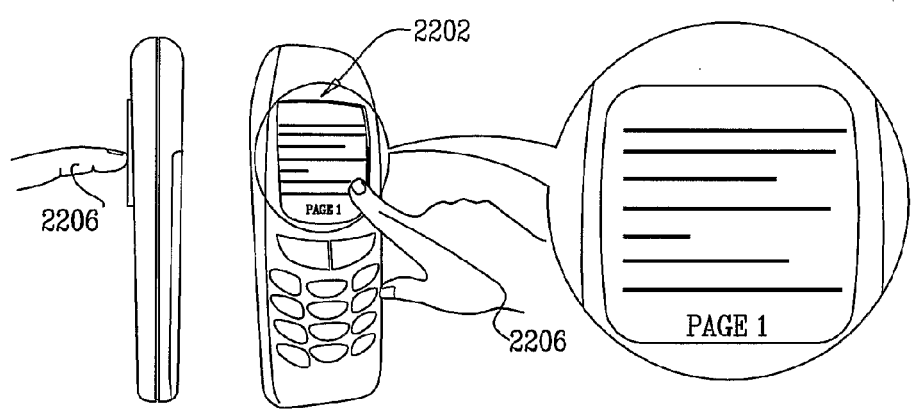

The functionality of the integrated display and input device 2200 causes sub-icon 2216 to appear in a visually sensibly emphasized form, as indicated by reference numeral 2218. Similarly to that discussed hereinabove with reference to FIG. 23E, when, as shown in FIG. 29B, finger 2206 touches the display 2202, a selection function is actuated.

In accordance with a preferred embodiment of the present invention sub-icons, such as sub-icons 2216, 2220 and 2222 (FIG. 29A) may be used to launch a document viewing application showing various user-selectable, pre-selected documents. For example, if a user selects sub-icon 2216, the document viewer is launched and document associated with the selected sub-icon appears. FIG. 29B shows the result of selection of sub-icon 2216. Zooming functionality may also be provided.

Additionally or alternatively, locking functionality of the type described hereinabove with reference to FIGS. 24B and 24C may be provided.

Additionally or alternatively, hyperlink functionality of the type described hereinabove with reference to FIGS. 24B and 24C may be provided.

Figure 29C:
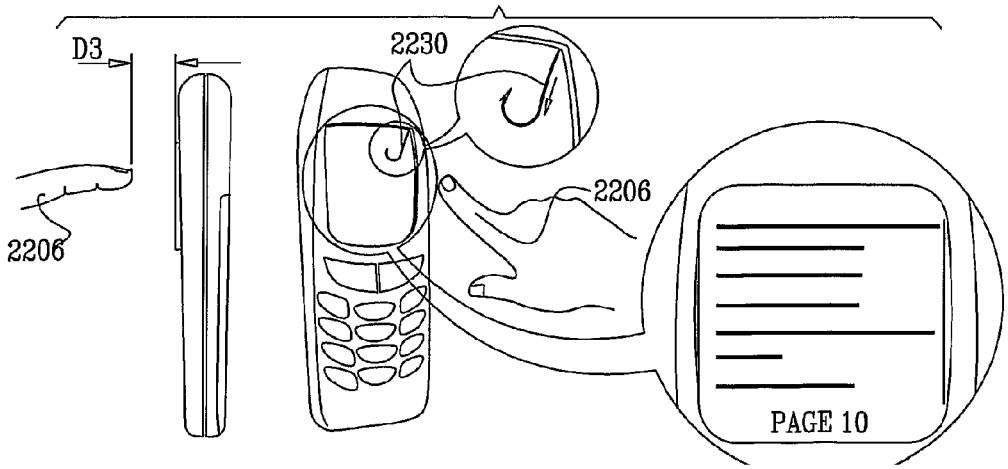
Figure 29D:
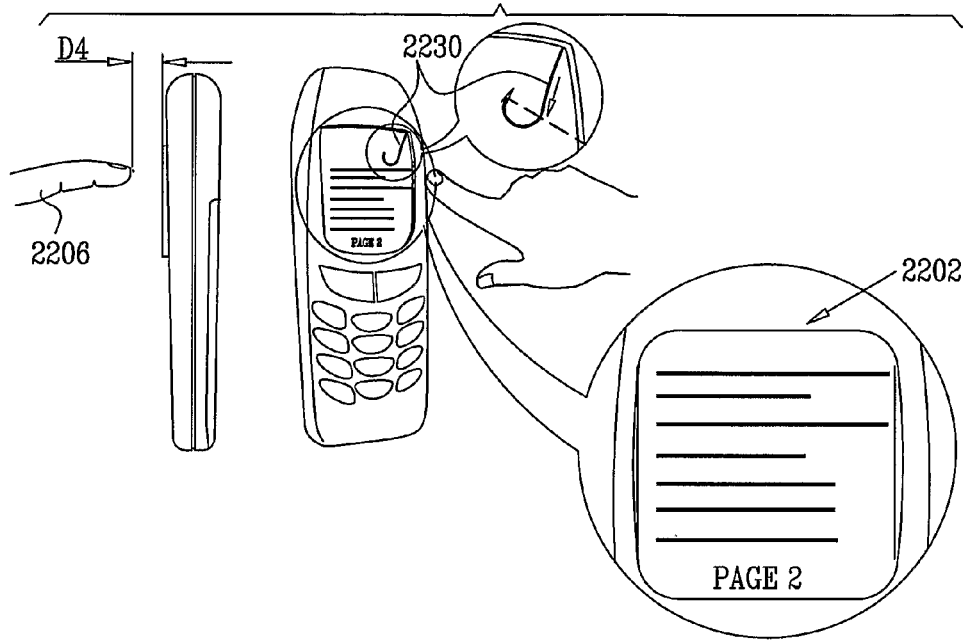

Additionally or alternatively, tool bar/tab functionality of the type described hereinabove with reference to FIGS. 27A-27D may be provided. Reference is now made to FIGS. 29C and 29D, which illustrate forward page turning functionality which is preferably provided in accordance with a preferred embodiment of the present invention. As seen in FIG. 29C, when finger 2206 is located at a relatively large distance from the display screen 2202 such as D3, and is moved in a predetermined pattern such as a hook pattern, as designated by reference numeral 2230, a relatively fast forward page turning function is provided, typically going from page 1, as shown in FIG. 29B, to page 10, as shown in FIG. 29C.

As seen in FIG. 29D, when finger 2206 is located at a relatively small distance from the display screen 2202, such as D4, which is less than D3, and is moved in a predetermined pattern such as the hook pattern 2230, as illustrated, a relatively slow forward page turning function is provided, typically going from page 1, as shown in FIG. 29B, to page 2, as shown in FIG. 29C.

It is appreciated that for distances between D3 and D4, a range of different speeds of page turning may be provided.

Figure 29E:
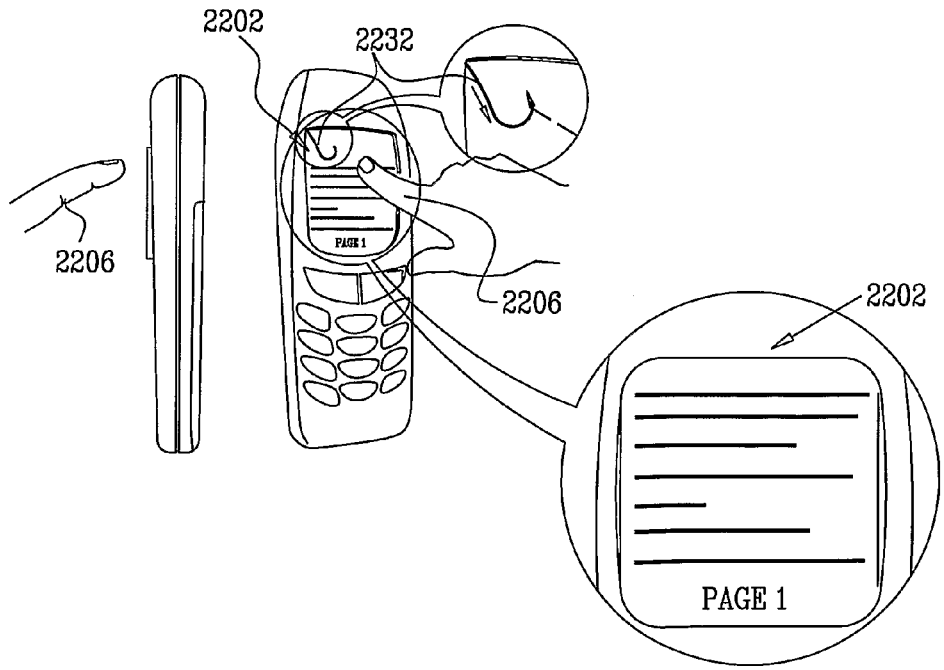

It is further appreciated that a similar motion in a different direction or a different motion may provide a different functionality. For example, as seen in FIG. 29E, a hook pattern designated by reference numeral 2232 provides a backward page turning functionality. The distance difference functionality described above with reference to FIGS. 29C and 29D preferably also is operative for the backward page turning functionality of FIG. 29E and other types of pattern dependent functionalities.

Finger motion pattern functionalities of the type described hereinabove with reference to FIGS. 29C-29E may use any suitable type of pattern recognition software, such as, for example, Graffiti™, which is commercially available from U.S. Robotics. It is a particular feature of the present invention that, as distinguished from the prior art, contact between the user's finger and the screen is not required and both contact and non-contact positioning of a user's finger may be used to control one or more aspects of the functionality, for example as described hereinabove in FIGS. 29C and 29D wherein the speed of page turning is dependent on the distance, if any, from the screen.

It is appreciated that the functionality of FIGS. 29A-29E may be provided and/or used alone or in combination with any other suitable functionality, such as any one or more of the other functionalities described hereinabove with reference to FIGS. 23A-28B and/or described herein below with reference to FIGS. 30A-33G.

Reference is now made to FIGS. 30A, 30B, 30C, 30D, 30E, 30F, 30G and 30H, which are illustrations of contact management functionality of an integrated display and input device constructed and operative in accordance with a preferred embodiment of the present invention. Preferably the integrated display and input device is a mobile computer and/or communicator 2300 constructed and operative in accordance with the teachings of one or more of the following applicants '/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 2302 having touch responsive input functionality and/or propinquity responsive input functionality, as described hereinabove with reference to FIGS. 20A-22, and user interface function selection functionality which is responsive to inputs received from the touch responsive input functionality and/or propinquity responsive input functionality. A keyboard 2304 may be provided as part of the mobile device but may be obviated in accordance with a preferred embodiment of the present invention.

Figure 30A:
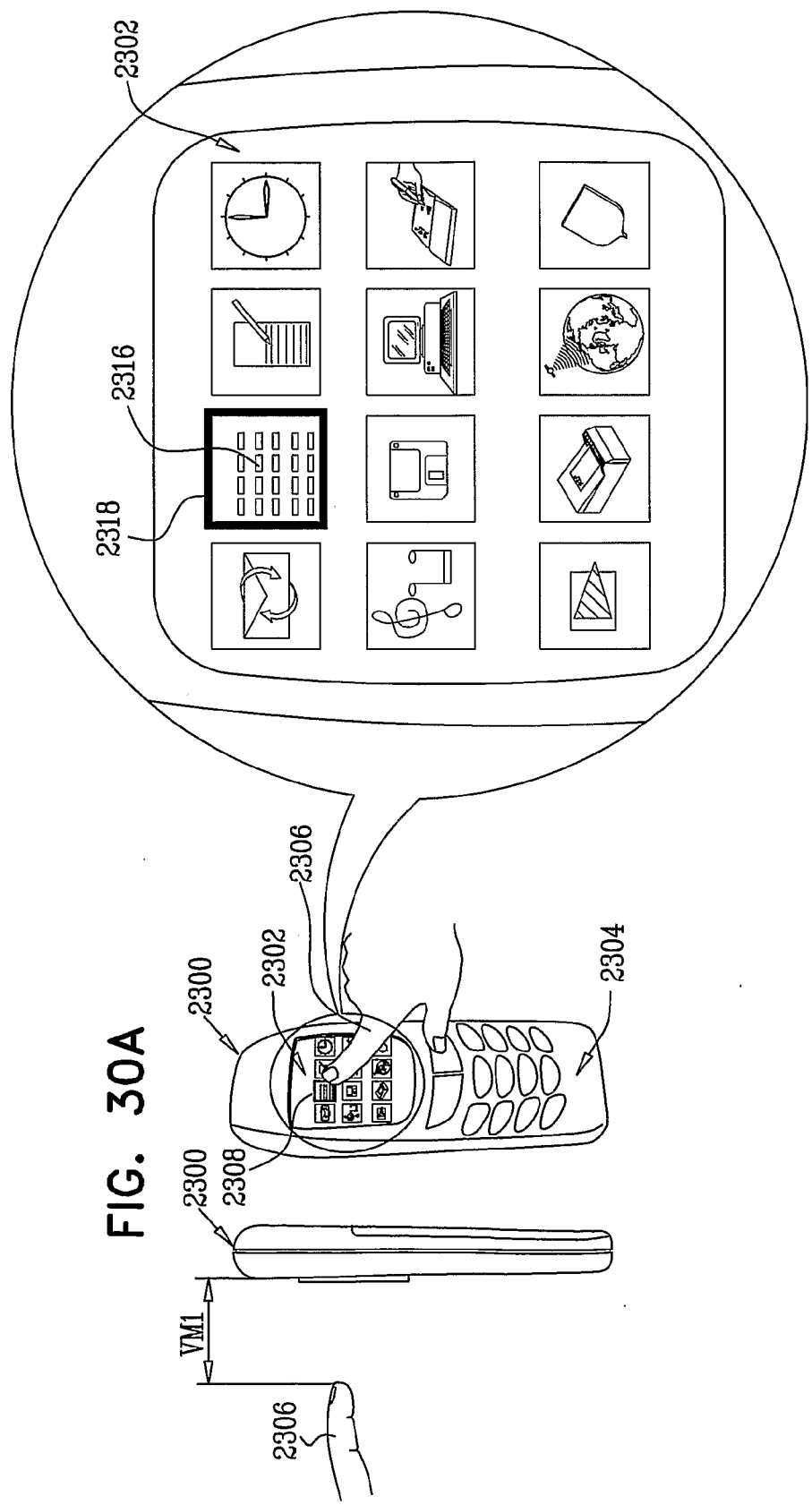

FIG. 30A shows a finger 2306 located adjacent display screen 2302 at a distance VM1 from display screen 2302 such that the propinquity responsive input functionality senses finger 2306 in propinquity to display screen 2302 which defines an impingement area 2308 of light reflected from finger 2306 that is generally centered on a contact manager icon 2316.

The functionality of the integrated display and input device 2300 causes icon 2316 to appear in a visually sensibly emphasized form, as indicated by reference numeral 2318. Similarly to that discussed hereinabove with reference to FIG. 23E, when, as shown in FIG. 30B, finger 2306 touches display screen 2302, a selection function is actuated. For example, if a user selects icon 2316, the contact manager is launched. FIG. 23B shows the result of selection of icon 2316, which is a contact word entry form.

Zooming functionality may also be provided. Additionally or alternatively, locking functionality of the type described hereinabove with reference to FIGS. 24B and 24C may be provided.

Additionally or alternatively, hyperlink functionality of the type described hereinabove with reference to FIGS. 24B and 24C may be provided.

Additionally or alternatively, tool bar/tab functionality of the type described hereinabove with reference to FIGS. 27A-27D may be provided. Reference is now made to FIG. 30C, which illustrates entry of a contact word, BURGER and locating finger 2306 at a distance VM2 from the display screen 2302. FIG. 30D shows finger 2306 located at the same location and now located at a distance VM3 from display screen 602, which is equal to or less than a predetermined selection threshold ST. This causes a web-like array of related contact identifiers to appear. The arrangement of contact identifiers is preferably of the type provided by ThinkMap Inc. as described at www.thinkmap.com. The contact identifiers are typically grouped as to their general relationship with the contact word. Thus Elizabeth Burger, Sally Burger, Nathan Burger, Jed Burger appear as possibly related persons, and Burger King, McDonalds and Wendy's appear as burger purveyors and Burger, Idaho; Hamburg, Germany and Burger Ave., Passaic N.J., appear as geographical designations.

Figure 30E:
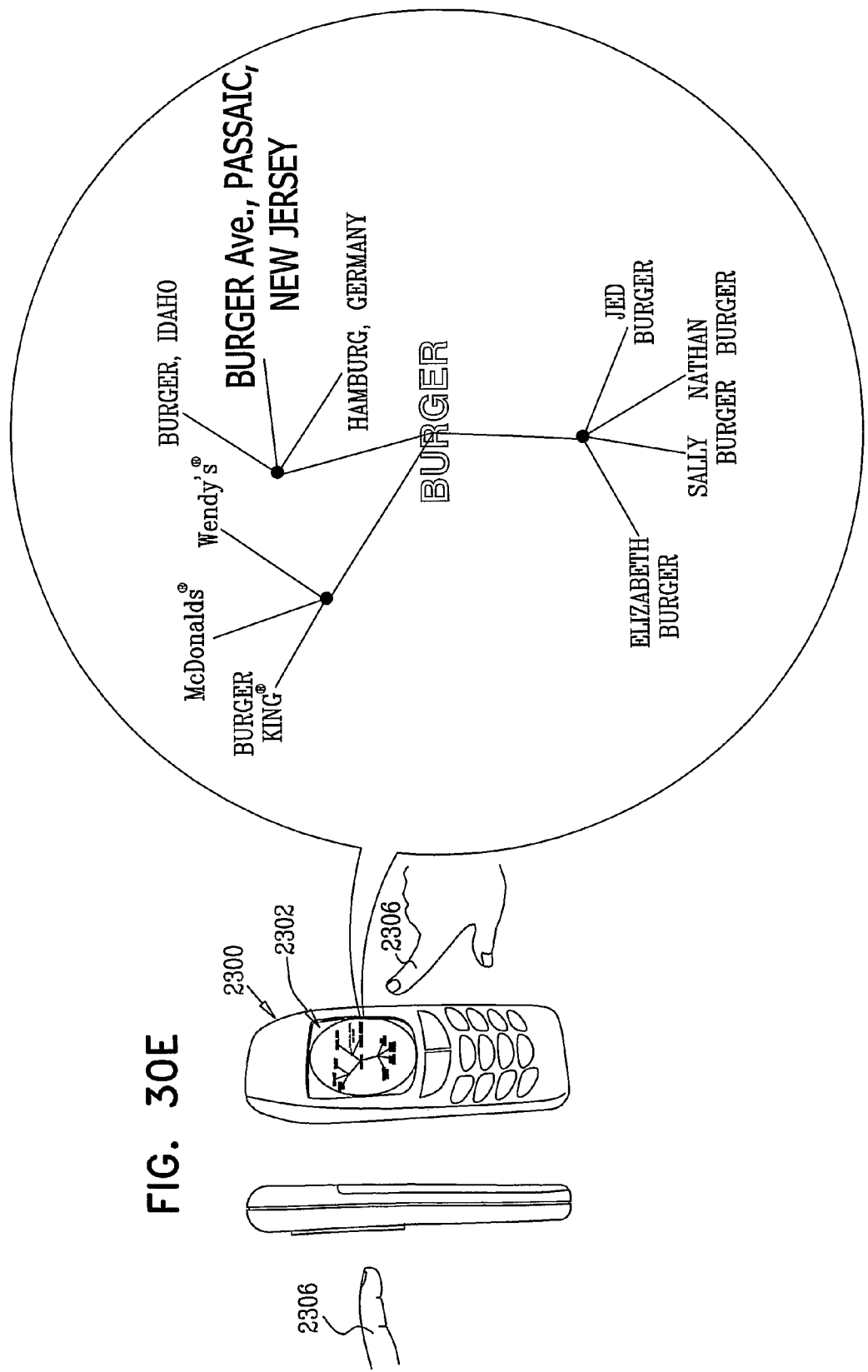

Positioning finger 2306 at one of the contact identifiers results in the highlighting of that item, as shown in FIG. 30E. If, while located at the same location, finger 2306 is brought even closer to the display screen 2302, such as to a distance VM4, a function associated with that contact identifier is actuated. For example, if the finger is located at Burger Avenue, as seen in FIG. 30F, Burger Avenue is placed at the center of the screen and arranged around it are contact identifiers associated with Burger Avenue, such as the names of various businesses located on Burger Avenue, names of adjacent streets. The other contact identifiers may still appear on the screen, typically in a very small, but zoomable, format.

Figure 30G:
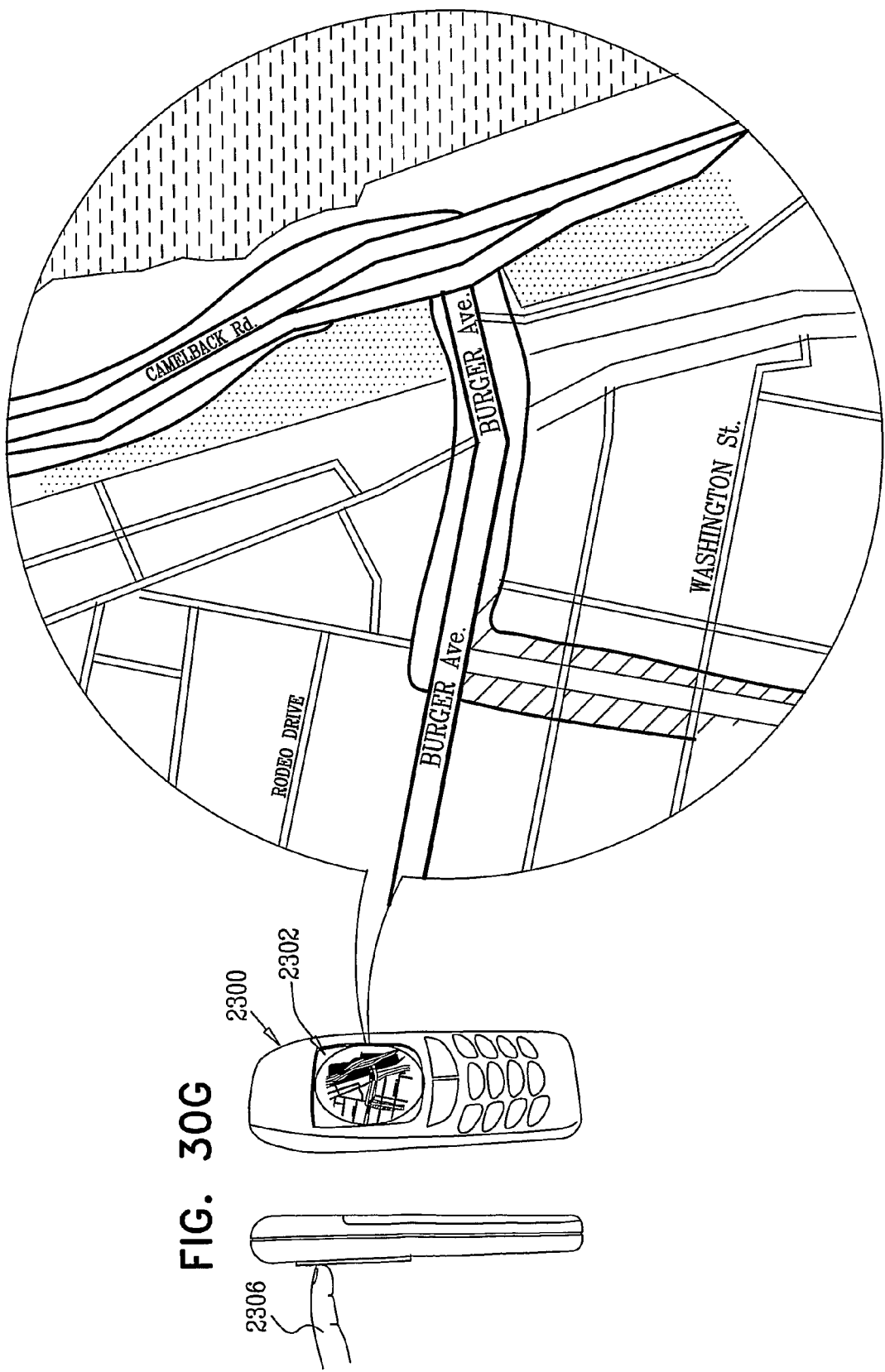

Referring now to FIG. 30G, which shows finger 2306 touching Burger Avenue on the screen of FIG. 30F which causes a function associated with Burger Avenue to be actuated. For example, as seen in FIG. 30G, the function is display of a map of Burger Avenue and the surrounding region. It is appreciated that some but not all of the functionalities illustrated in FIGS. 30A-30G may be obviated in a system which is differentially responsive to touch and propinquity, but does not distinguish between degrees of propinquity within a given threshold.

It is appreciated that the functionality of FIGS. 30A-30G may be provided and/or used alone or in combination with any other suitable functionality, such as any one or more of the other functionalities described hereinabove with reference to FIGS. 23A-29E and/or herein below with reference to FIGS. 31A-33G.

Reference is now made to FIGS. 31A-31G which illustrate picture viewer functionality of an integrated display and input device constructed and operative in accordance with a preferred embodiment of the present invention. Preferably the integrated display and input device is a mobile computer and/or communicator 2400 constructed and operative in accordance with the teachings of. one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 2402 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 2404 may be provided as part of the integrated display and input device but may be obviated in accordance with a preferred embodiment of the present invention.

Figure 31A:
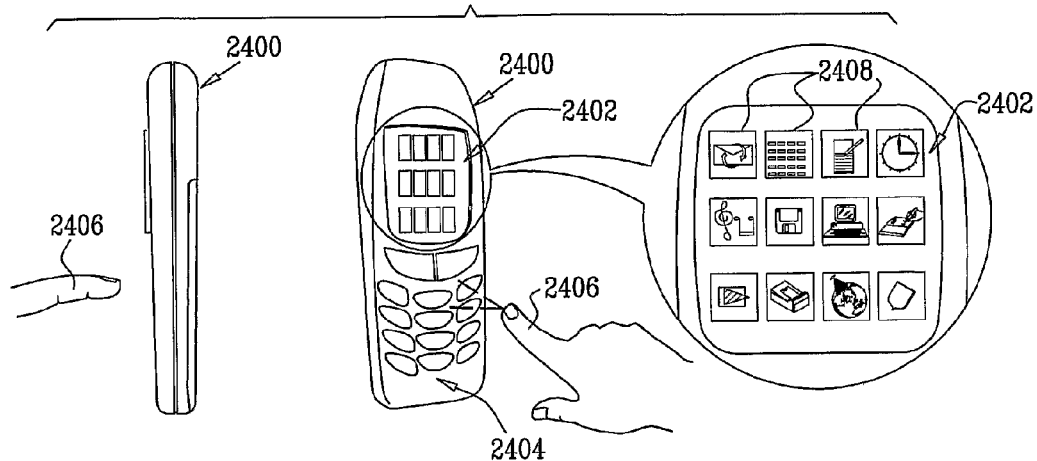
FIGS. 31A, 31B, 31C, 31D, 31E, 31F, and 31G are illustrations of picture viewing functionality of a mobile device constructed and operative in accordance with a preferred embodiment of the present invention.

FIG. 31A shows a finger 2406 located adjacent keyboard 2404 and not adjacent display screen 2402, which display screen 2402, as noted above, includes touch responsive input functionality and/or propinquity responsive input functionality. In the arrangement shown in FIG. 31A, display screen 2402 typically displays an array of application launch icons 2408.

Figure 31B:
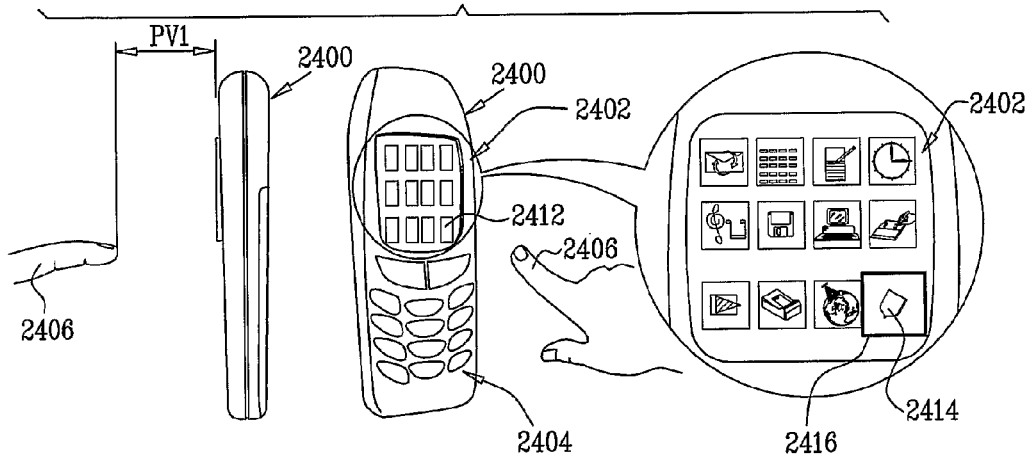

FIG. 31B shows finger 2406 located at a first distance PV1 from display screen 2402, such that the propinquity responsive input functionality senses finger 2406 in propinquity to display screen 2402 which defines an impingement area 2412 of light reflected from finger 2406 that is generally centered on a first application launch icon 2414, even though it may also partially impinge on other icons. The functionality of the mobile device 2400 causes icon 2414 to appear in an enlarged or otherwise visually sensibly emphasized form, as indicated by reference numeral 2416. In this case icon 2414 is a picture viewer application icon.

Figure 31C:
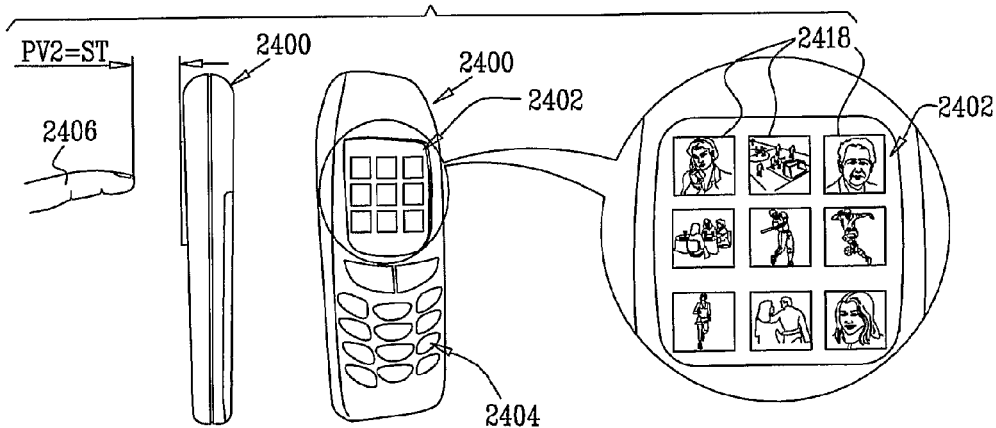

Similarly to that discussed hereinabove with reference to FIG. 23E, when, as shown in FIG. 31C, finger 2406 touches the display screen 2402, a selection function is actuated. For example, if a user selects icon 2414, the picture viewer is launched. FIG. 31C shows the result of selection of icon 2414, which is an array of picture thumbnails 2418. Zooming functionality may also be provided.

Additionally or alternatively, locking functionality of the type described hereinabove with reference to FIGS. 24B and 24C may be provided.

Additionally or alternatively, hyperlink functionality of the type described hereinabove with reference to FIGS. 24B and 24C may be provided. Additionally or alternatively, tool bar/tab functionality of the type described hereinabove with reference to FIGS. 27A-27D may be provided.

Figure 31D:
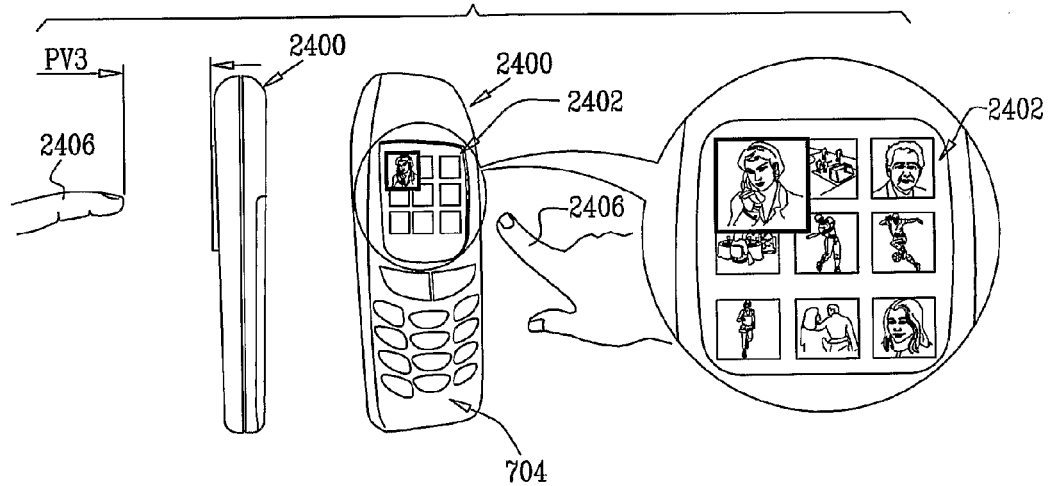

Reference is now made to FIG. 31D, which illustrates highlighting one of the picture thumbnails by positioning finger 2406 such that the propinquity responsive input functionality senses finger 2406 in propinquity to display screen 2402, when finger 2406 is located at a distance PV3 from the display screen 2402, thus producing a slight enlargement of the picture thumbnail on which finger 2406 impinges and optionally display an identifier of the picture thumbnail.

Figure 31E:
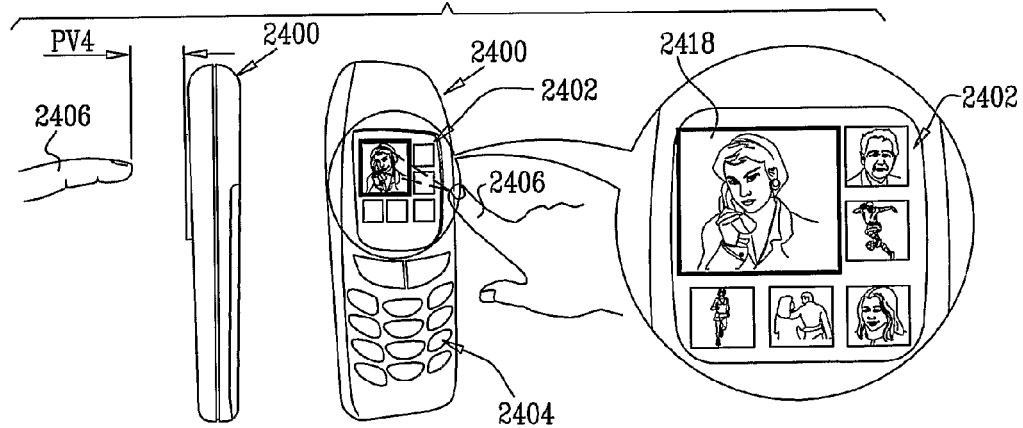

FIG. 31E shows finger 2406 positioned at the same location and now located at a distance PV4 from display screen 2402, which produces yet further enlargement of the picture thumbnail 2418. Conversely, the transition from the relative orientation of finger 2406 and the display screen

2402 in FIG. 31E to that of FIG. 31D creates zooming-out feedback for the user. It is appreciated that the ability to quickly enlarge and reduce pictures on the screen allows for rapid review of a large number of possibly similar pictures without requiring individual selection and exit from each picture.

Figure 31F:
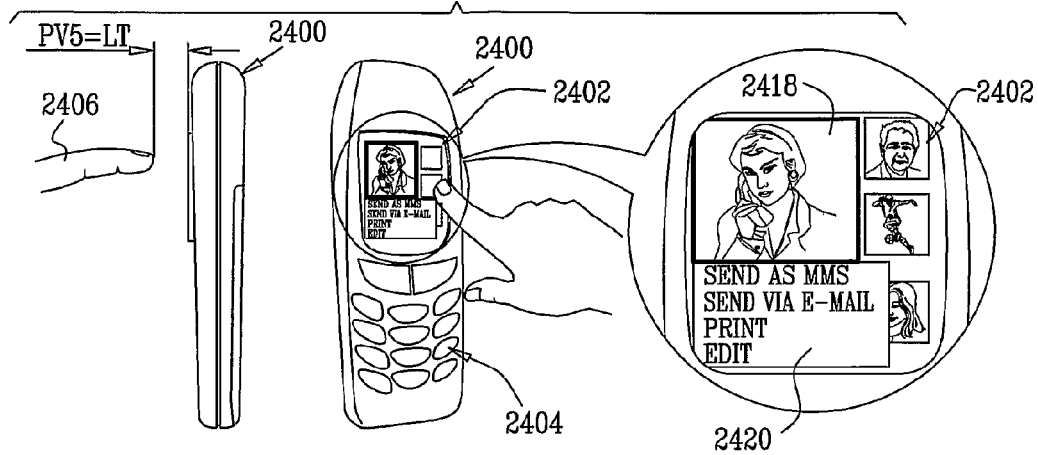
Figure 31G:
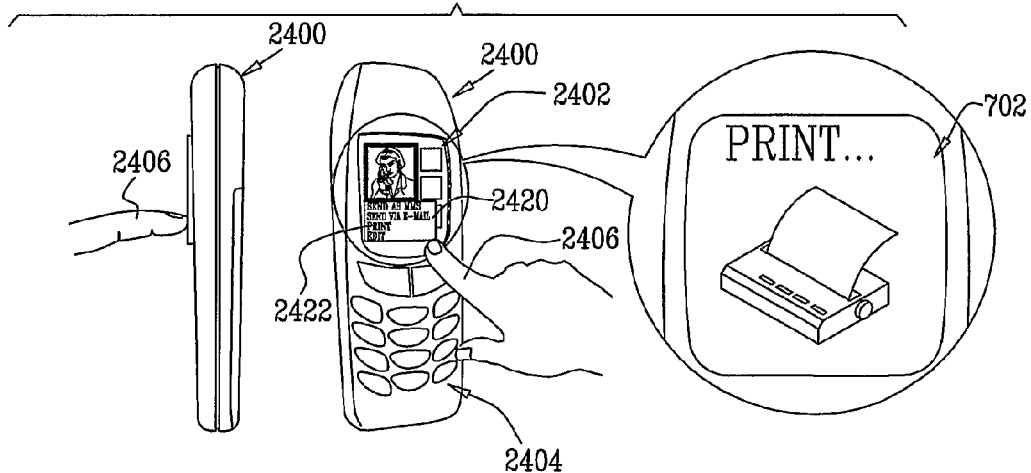

FIG. 31F shows the finger 2406 positioned at the same location and now located at a distance PV5 from display screen 2402, which is equal to or less than a predetermined locking distance threshold LT, which locks the extent of enlargement of the picture thumbnail 2418 notwithstanding further movement of finger 2406. Preferably, a drop-down menu 2420 is displayed, providing options for various picture related functions, such as sending via MMS, sending via email, printing and editing. In accordance with a preferred embodiment of the present invention, as shown in FIG. 31G when finger 2406 touches the display screen 2402, a selection function is actuated, which may be considered akin to the click of a conventional mouse. Actuation of the selection function is preferably accompanied by feedback to the user, such as visual, auditory or tactile feedback. In accordance with the illustrated preferred embodiment of the present invention, when finger 2406 touches display screen 2402 at a menu item on the dropdown-menu 2420, the corresponding function is actuated. For example, if the printing function is selected, the picture is downloaded to a printer.

It is appreciated that some but not all of the functionalities illustrated in FIGS. 31A-31G may be obviated in a system which is differentially responsive to touch and propinquity, but does not distinguish between degrees of propinquity within a given threshold.

It is appreciated that the functionality of FIGS. 31A-31G may be provided and/or used alone or in combination with any other suitable functionality, such as any one or more of the other functionalities described hereinabove with reference to FIGS. 23A-30G and/or herein below with reference to FIGS. 32A-33G.

Reference is now made to FIGS. 32A-32H, which illustration interactive television functionality of an integrated display and input device constructed and operative in accordance with a preferred embodiment of the present invention. Preferably the integrated display and input device is a mobile computer and/or communicator 2500 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference. 'Preferably the mobile device includes a display screen 2502 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 2504 may be provided as part of the integrated display and input device but may be obviated in accordance with a preferred embodiment of the present invention.

Figure 32A:
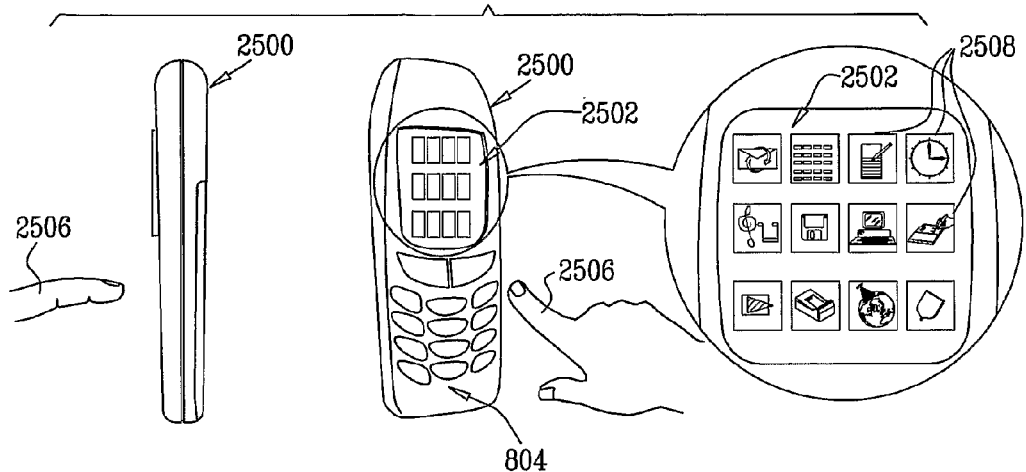
FIGS. 32A, 32B, 32C, 32D, 32E, 32F, 32G, and 32H are illustrations of interactive television functionality of a mobile device constructed and operative in accordance with a preferred embodiment of the present invention.

FIG. 32A shows a finger 2506 located adjacent keyboard 2504 and not adjacent display screen 2502, which display screen 2502, as noted above, includes touch responsive input functionality and/or propinquity responsive input functionality. In the arrangement shown in FIG. 32A, display screen 2502 typically displays an array of application launch icons 2508.

Figure 32B:
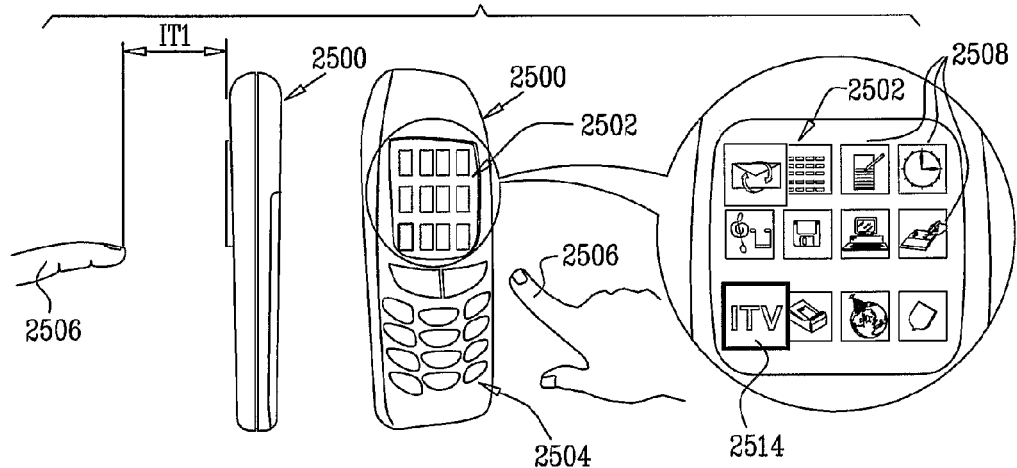
Figure 32C:
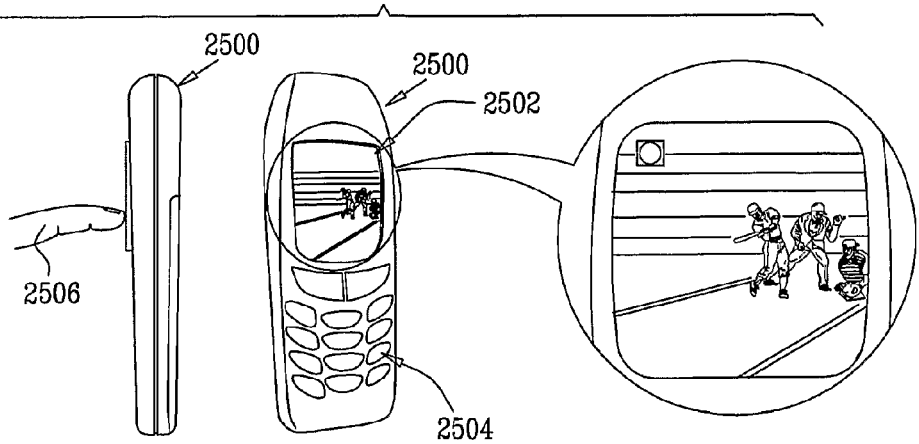

FIG. 32B shows finger 2506 located at a first distance IT1 from display screen 2502, such that the propinquity responsive input functionality senses finger 2506 in propinquity to display screen 2502 which defines an impingement area 2512 of light reflected from finger 2506 that is generally centered on a first application launch icon 2514, even though it may also partially impinge on other icons. The functionality of the mobile device 2500 causes icon 2514 to appear in an enlarged or otherwise visually sensibly emphasized form, as indicated by reference numeral 2516. In this case icon 2514 is an interactive television application icon. Similarly to that discussed hereinabove with reference to FIG. 23E, when, as shown in FIG. 32C, finger 2506 touches display screen 2502, a selection function is actuated. For example, if a user selects icon 2514, the interactive television viewer is launched. FIG. 32C shows the result of selection of icon 2514, which is a television picture. Zooming functionality may also be provided.

Additionally or alternatively, locking functionality of the type described hereinabove with reference to FIGS. 24B and 24C may be provided. Additionally or alternatively, hyperlink functionality of the type described hereinabove with reference to FIGS. 24B and 24C may be provided.

Additionally or alternatively, tool bar/tab functionality of the type described hereinabove with reference to FIGS. 27A-27D may be provided.

Figure 32D:
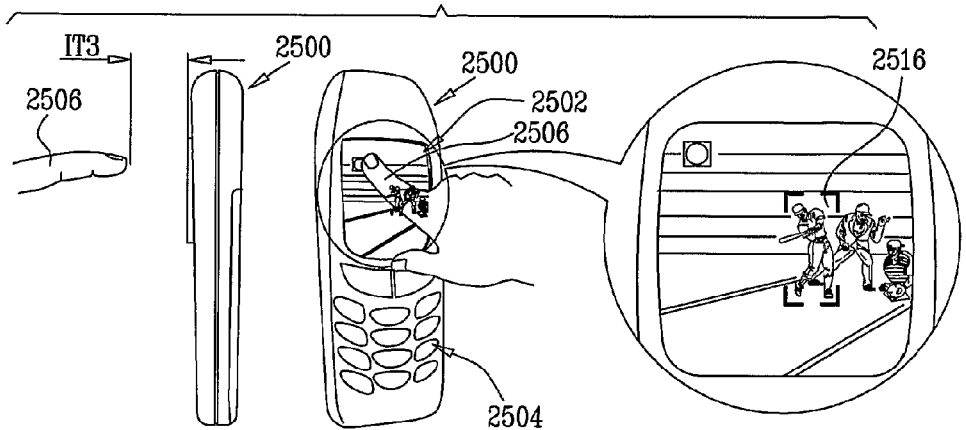

Reference is now made to FIG. 32D, which illustrates highlighting a location 2516 on the television picture by positioning finger 2506 such that the propinquity responsive input functionality senses finger 2506 in propinquity to display screen 2502, when finger 2506 is located at a distance IT3 from the display screen 2502, thus producing a visibly sensible indication of that location. Preferably, the visibly sensible indication only appears on regions of the picture which have a selectably actuatable functionality. The selectably actuatable functionality may be, for example, display of related information, such as player statistics, enhanced detail, or a link to a related web site.

Figure 32E:
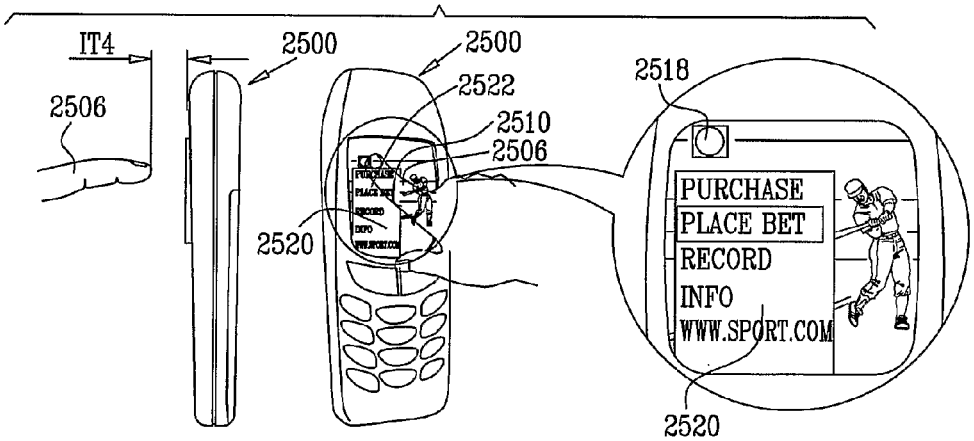
Figure 32F:
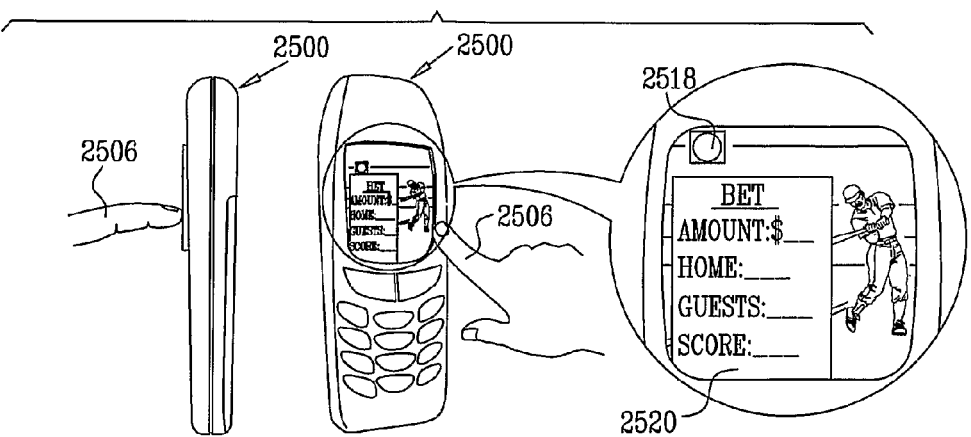

FIG. 32E illustrates additional functionality wherein an icon 2518 is visibly or invisibly superimposed on the television picture and positioning finger 2506 such that the propinquity responsive input functionality senses finger 2506 in propinquity to display screen 2502 at the location of icon 2518 and causes a drop-down menu 2520 to be displayed, providing options for various content related functions, such as purchasing a product, placing a bet, recording content, requesting further information and linking to a related web site. In accordance with a preferred embodiment of the present invention, as shown in FIG. 32F when finger 2506 touches the display screen 2502, a selection function is actuated, which may be considered akin to the click of a conventional mouse. Actuation of the selection function is preferably accompanied by feedback to the user, such as visual, auditory or tactile feedback. In accordance with the illustrated preferred embodiment of the present invention, when finger 2506 touches display screen 2502 at a menu item on the sub-menu 2520, the corresponding function is actuated. For example, if the betting function is selected, a betting menu 2524 appears, as shown in FIG. 32F.

Figure 32G:
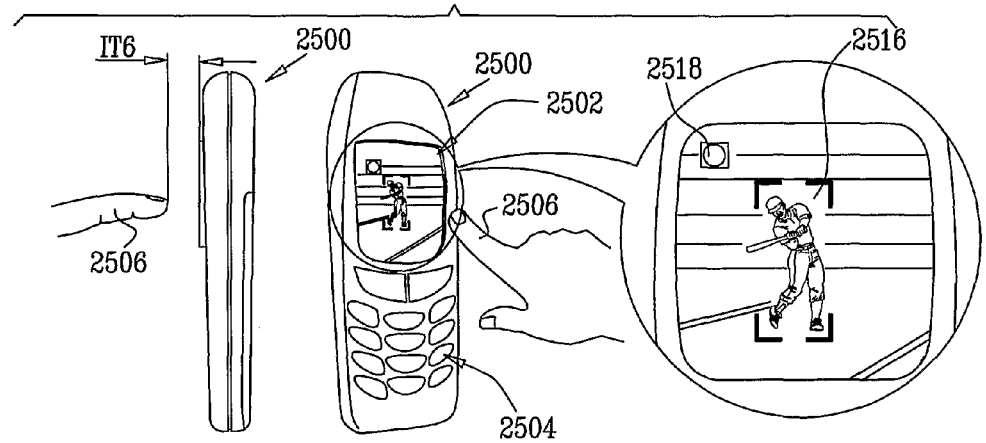

FIG. 32G shows finger 2506 located at location 2516 and now located at a distance IT6 from display screen 2502, which produces enlargement of the television picture in a way such that the impinged upon location remains visible. Conversely, the transition from the relative orientation of the finger 2506 and the display screen 2502 in FIG. 32G to that of FIG. 32D creates zooming-out feedback for the user.

Figure 32H:
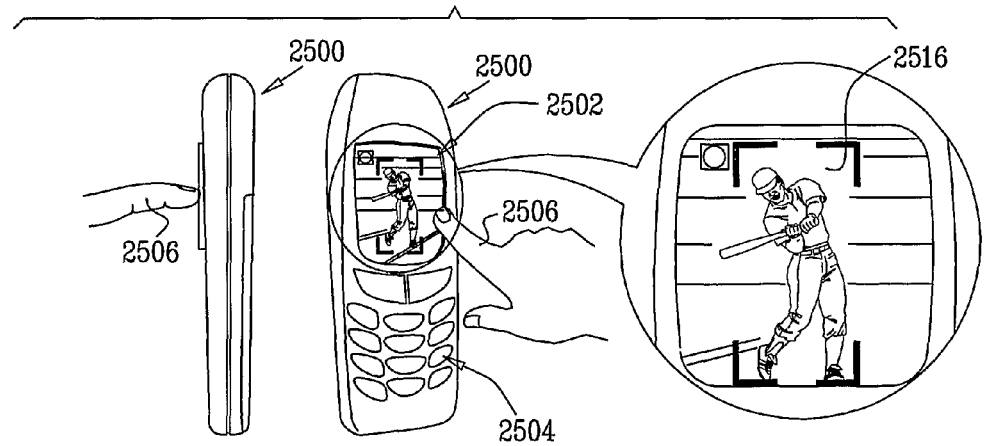

FIG. 32H shows finger 2506 located at location 2516 and at a distance IT7 from display screen 2502, which is equal to or less than a predetermined locking distance threshold LT, which locks the extent of enlargement of the television picture notwithstanding further movement of finger 2506.

It is appreciated that even though the interactive television application described herein is illustrated in the context of mobile devices, it is equally applicable to stationary television receivers. The functionality of FIGS. 32A-32H enables interactive television operation with a minimum or zero buttons on a user control.

It is appreciated that some but not all of the functionalities illustrated in FIGS. 32A-32H may be obviated in a system which is differentially responsive to touch and propinquity, but does not distinguish between degrees of propinquity within a given threshold. It is appreciated that the functionality of FIGS. 32A-32H may be provided and/or used alone or in combination with any other suitable functionality, such as any one or more of the other functionalities described hereinabove with reference to FIGS. 23A-31G and/or herein below with reference to FIGS. 33A-33G.

Reference is now made to FIGS. 33A-33G, which illustrate desktop user interface functionality of an integrated display and input device constructed and operative in accordance with a preferred embodiment of the present invention. Preferably the integrated display and input device is a mobile computer and/or communicator 2600 constructed and operative in accordance with the teachings of one or more of the following applicants'/inventors' patent documents: Published PCT International Patent Application Nos.: WO 03/104965 A2 and WO 2005/094176 A3, U.S. Provisional Patent Application No. 60/715,546, filed Sep. 8, 2005, entitled OPTICAL SENSOR FOR MEASUREMENT OF LIGHT SCATTERING; U.S. Provisional Patent Application No. 60/734,027, filed Nov. 3, 2005, entitled CONTROL APPARATUS; U.S. Provisional Patent Application No. 60/789,188, filed Apr. 3, 2006 and entitled USER INTERFACE FUNCTIONALITIES, U.S. Provisional Patent Application No. 60/682,604, filed May 18, 2005 and entitled NOVEL DISTORTION LENS and U.S. Patent Application Publication No. 2005/0156914A1, the disclosures of which are hereby incorporated by reference.

Preferably the mobile device includes a display screen 2602 having touch responsive input functionality and/or propinquity responsive input functionality, as described hereinabove particularly with reference to FIGS. 20A-22, and user interface function selection functionality which is responsive to inputs received from the touch responsive input functionality and/or propinquity responsive input functionality. A keyboard 2604 may be provided as part of the integrated display and input device but may be obviated in accordance with a preferred embodiment of the present invention.

Figure 33A:
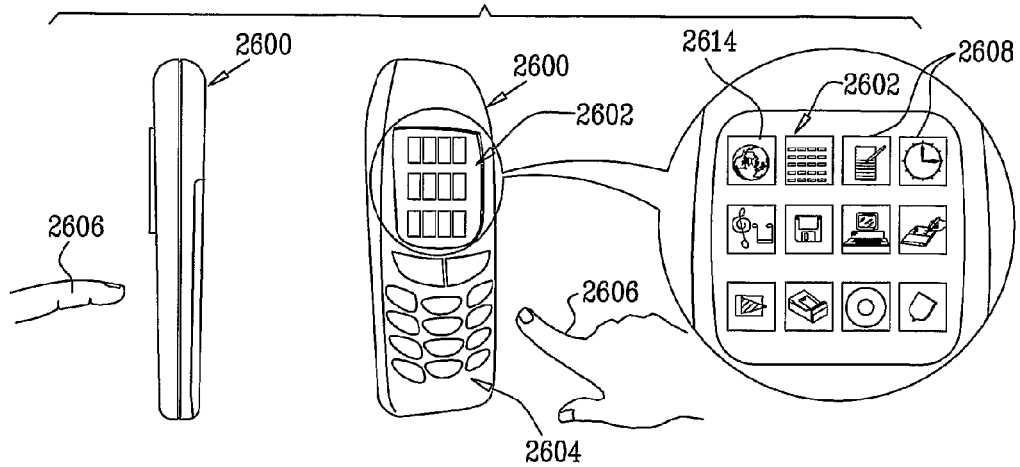

FIG. 33A shows a finger 2606 located adjacent keyboard 2604 and not adjacent display screen 2602, which display screen 2602, as described above, includes touch responsive input functionality and/or propinquity responsive input functionality. In the arrangement shown in FIG. 33A, display screen 2602 typically displays an array of application launch icons 2608.

Figure 33B:
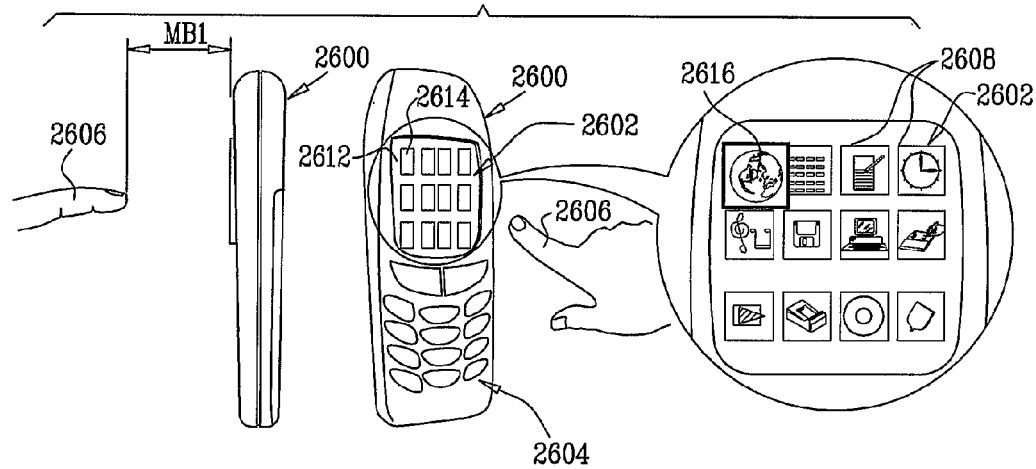

FIG. 33B shows finger 2606 located at a first distance MB1 from display screen 2602, such that the propinquity responsive input functionality senses finger 2606 in propinquity to display screen 2602 which defines an impingement area 2612 of light reflected from finger 2606 that is generally centered on a first application launch icon 2614, even though it may also partially impinge on other icons. The functionality of the mobile device 2600 causes icon 2614 to appear in an enlarged or otherwise visually sensibly emphasized form, as indicated by reference numeral 2616. In this case icon 2614 is a map browser application icon.

Figure 33C:
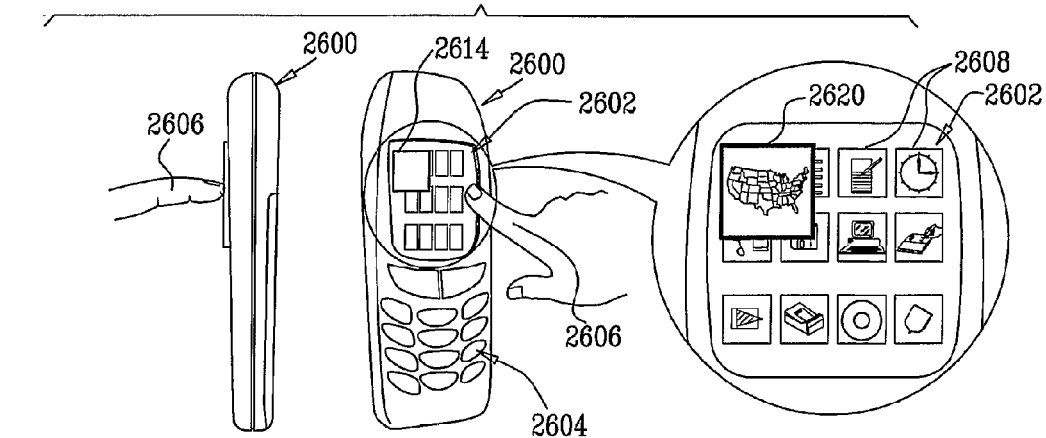

Similarly to that discussed hereinabove with reference to FIG. 23E, when, as shown in FIG. 33C, finger 2606 touches display screen 2602, a selection function is actuated. For example, if a user selects icon 2614, the map browser is launched. FIG. 33C shows the result of selection of icon 2614, which is an extremely general map or aerial view 2620, such as a map of North America which may be superimposed over a corresponding satellite image. Zooming functionality may also be provided.

Additionally or alternatively, locking functionality of the type described hereinabove with reference to FIGS. 24B and 24C may be provided.

Additionally or alternatively, hyperlink functionality of the type described hereinabove with reference to FIGS. 24B and 24C may be provided. Additionally or alternatively, tool bar/tab functionality of the type described hereinabove with reference to FIGS. 27A-27D may be provided.

Additionally or alternatively, scrolling functionality of the type described hereinabove with reference to FIGS. 25A and 25B may be provided.

Figure 33D:
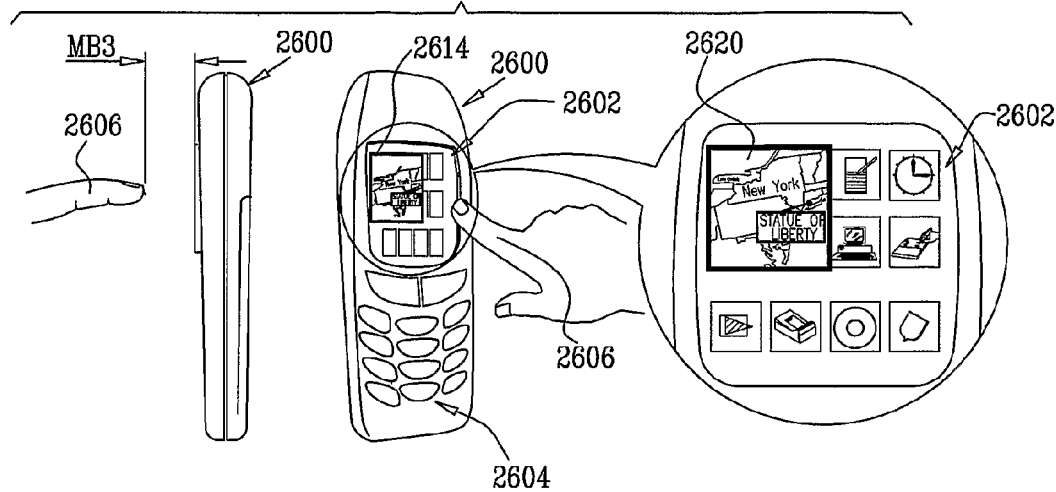

Reference is now made to FIG. 33D, which illustrates highlighting a region on the map or image by positioning finger 2606 such that the propinquity responsive input functionality senses finger 2506 in propinquity to display screen 2502, when finger 2506 is located at a distance MB3 from the display screen 2502, thus producing zooming in on the selected region of the map and optionally displaying appropriate text or icons, which identify items of interest, such as for example, historical sites, gas stations and shops or tagged locations.

Figure 33E:
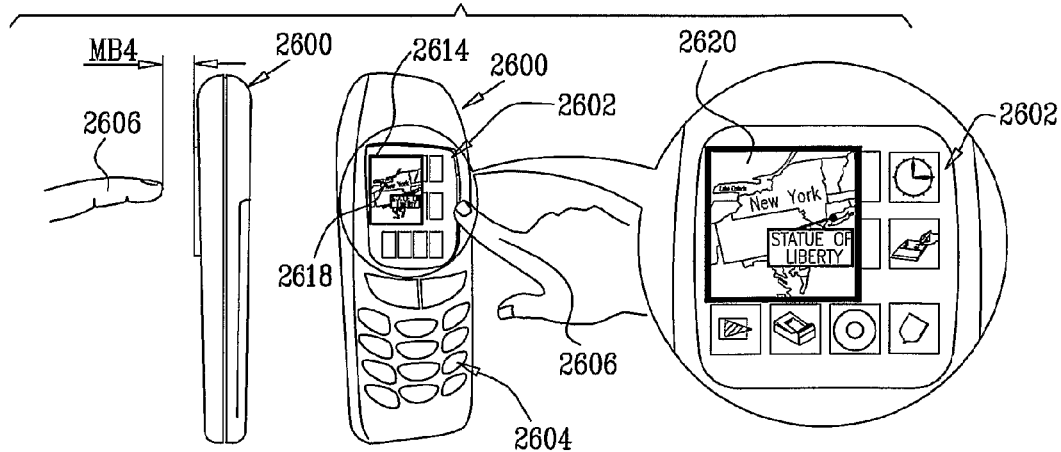

FIG. 33E shows finger 2606 located at the same location and at a distance MB4 from display screen 2602, which produces yet further zooming in. Conversely, the transition from the relative orientation of finger 2606 and display screen 2602 in FIG. 33E to that of FIG. 33D creates zooming-out feedback for the user. FIG. 33F shows finger 2606 located at the same location and at a distance MB5 from display screen 2602, which is equal to or less than predetermined locking distance threshold LT, which locks the extent of enlargement of the picture thumbnail notwithstanding further movement of finger 2606. Preferably, a drop-down menu 2622 is displayed, providing options for various location-related functions, such as dialing a telephone number of a place of business indicated on the map, obtaining directions to a historical site, finding the closest gas station and obtaining location-dependent coupons or sales offers.

In accordance with a preferred embodiment of the present invention, as shown in FIG. 33 G, when finger 2606 touches the display screen 2602, a selection function is actuated, which may be considered akin to the click of a conventional mouse. Actuation of the selection function is preferably accompanied by feedback to the user, such as visual, auditory or tactile feedback.

In accordance with the illustrated preferred embodiment of the present invention, when finger 2606 touches display screen 2602 at a menu item on the dropdown menu 2622, the corresponding function is actuated. For example, if telephone dialing function is selected, a corresponding telephone number is dialed. It is appreciated that some but not all of the functionalities illustrated in FIGS. 33A-33G may be obviated in a system which is differentially responsive to touch and propinquity, but does not distinguish between degrees of propinquity within a given threshold.

It is appreciated that the functionality of FIGS. 33A-33G may be provided and/or used alone or in combination with any other suitable functionality, such as any one or more of the other functionalities described hereinabove with reference to FIGS. 23A-32H.

It is appreciated that the various embodiments of the present invention described hereinabove substantially enhance conventional touch screen functionality by adding another input dimension. The present invention thus enables differentiation between various positions of a passive object, such as a user's finger, thus distinguishing for example between a situation wherein a user's finger touches a screen and one or more situations where the finger is within a propinquity threshold of the screen. This can obviate the need for an active stylus and enable the use of a passive stylus or finger control of various functionalities.

Particularly advantageous embodiments of the present invention enable a finger touch position to be distinguished from a finger propinquity position. For example, a finger propinquity position may be employed for a mouse over functionality, while a finger touch position may be employed for a mouse click functionality. It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed is:

1. An integrated display and input device, comprising:
   a pixel array operative to provide a visually sensible output;
   at least one sensor operative to sense a position of an object with respect to the pixel array when the object is within a predetermined degree of propinquity to the pixel array;
   at least one illuminator that provides backlighting and illuminates the object within the predetermined degree of propinquity; and
   circuitry that receives an output from the at least one sensor and provides a non-imagewise input representing the position of the object relative to the pixel array to utilization circuitry.

2. The integrated display and input device according to claim 1, wherein the at least one illuminator is located in a plane coplanar with or parallel to the at least one sensor.

3. The integrated display and input device according to claim 1, wherein the at least one sensor senses light reflected from the object.

4. The integrated display and input device according to claim 3, wherein the at least one sensor senses ambient light reflected from the object.

5. The integrated display and input device according to claim 1, wherein the at least one sensor senses IR light reflected from the object.

6. The integrated display and input device according to claim 1, wherein the object is a finger.

7. The integrated display and input device according to claim 1, wherein the object is a located device.

8. The integrated display and input device according to claim 1, further comprising utilization circuitry.

9. The integrated display and input device according to claim 8, wherein the utilization circuitry provides chording functionality.

10. The integrated display and input device according to claim 8, wherein the utilization circuitry provides functionality to distinguish at least between positions of the object when touching and not touching the device.

11. The integrated display and input device according to claim 8, wherein the utilization circuitry provides functionality to distinguish at least between directions of motion of the object towards and away from the device.

12. The integrated display and input device according to claim 8, wherein the utilization circuitry provides functionality to compute at least one characteristic of a trajectory of motion of the object substantially parallel to the pixel array.

13. The integrated display and input device according to claim 12, wherein the at least one characteristic includes at least one of location, direction, velocity, or change in direction.

14. The integrated display and input device according to claim 8, wherein the utilization circuitry enables panning or scrolling.

15. The integrated display and input device according to claim 8, wherein the utilization circuitry enables one-handed zooming.

16. The integrated display and input device according to claim 8, wherein the utilization circuitry determines a distinction between the object touching the device and the object not touching the device.

17. The integrated display and input device according to claim 16, wherein the utilization circuitry enables mouse over or click.

18. The integrated display and input device according to claim 16, wherein the utilization circuitry enables document browsing.

19. The integrated display and input device according to claim 16, wherein the utilization circuitry enables gaming.

20. The integrated display and input device according to claim 16, wherein the utilization circuitry detects differences in sensed relative positions for fingers of a user.

21. The integrated display and input device according to claim 16, wherein the utilization circuitry provides interactive television functionality.

22. The integrated display and input device according to claim 16, wherein the utilization circuitry provides portable computer functionality.

23. The integrated display and input device according to claim 1, wherein the at least one sensor comprises a plurality of detector elements arranged in a plane substantially parallel to a viewing plane.

24. The integrated display and input device according to claim 1, wherein the at least one sensor is substantially coplanar with the pixel array.

25. The integrated display and input device according to claim 1, wherein the pixel array and the at least one sensor each comprise a respective plurality of elements arranged in substantially parallel planes that are substantially parallel to a viewing plane.

26. The integrated display and input device according to claim 1, wherein the at least one sensor comprises a detector assembly arranged at an edge of a viewing plane defining plate.

27. The integrated display and input device according to claim 26, wherein the detector assembly is arranged about the edge of the viewing plane defining plate.

28. The integrated display and input device according to claim 26, wherein the detector assembly is arranged along the edge of the viewing plane defining plate.

29. The integrated display and input device according to claim 26, wherein the detector assembly further comprises a support substrate, and an arrangement of detector elements.

30. The integrated display and input device according to claim 29, wherein the detector assembly further comprises a cover layer.

31. The integrated display and input device according to claim 30, wherein the cover layer is formed of a light transmissive material.

32. The integrated display and input device according to claim 30, wherein the cover layer includes a mask having apertures defined therein.

33. The integrated display and input device according to claim 30, wherein the cover layer includes a field-of-view defining mask having light-collimating tunnel-defining apertures.

34. The integrated display and input device according to claim 30, wherein the cover layer includes lenses.

35. The integrated display and input device according to claim 29, wherein the support substrate is integrated with a housing of the integrated display and input device.

36. The integrated display and input device according to claim 29, wherein the arrangement of detector elements comprises a plurality of discrete single-element detectors.

37. The integrated display and input device according to claim 29, wherein the arrangement of detector elements comprises an integrally formed multi-element detector array.

38. The integrated display and input device according to claim 29, wherein the arrangement of detector elements comprises a plurality of discrete multi-element detectors.

39. The integrated display and input device according to claim 26, wherein the edge includes a mask having apertures defined therein.

40. The integrated display and input device according to claim 26, wherein the edge includes a field-of-view defining mask having light-collimating tunnel-defining apertures.

41. The integrated display and input device according to claim 26, wherein the edge includes lenses.

42. The integrated display and input device according to claim 26, wherein the at least one sensor comprises a plurality of substantially forward-facing detectors arranged about edges of a display element.

43. An integrated display and input device, comprising:
a pixel array operative to provide a visually sensible output;
at least one illuminator that illuminates an object, the at least one illuminator is located substantially in a same plane as at least one backlighting illuminator associated with the pixel array;
at least one sensor operative to sense a position of the object with respect to the pixel array when the object has a predetermined degree of propinquity to the pixel array; and
circuitry for receiving an output from the at least one sensor and providing a non-imagewise input representing the position of the object relative to the pixel array.

44. An integrated display and input device, comprising:
a pixel array operative to provide a visually sensible output;
a detector assembly arranged at an edge of a viewing plane defining plate, the detector assembly includes a support substrate and an arrangement of sensor elements, wherein at least one sensor element in the arrangement of sensor elements detects electromagnetic radiation at a baseline level and senses the position of the object with respect to the pixel array when the object is within a predetermined degree of propinquity to the pixel array; and
circuitry that receives an output from the detector assembly and provides a non-imagewise input to utilization circuitry, the non-imagewise input represents the position of the object relative to the pixel array and corresponds to a location of the at least one sensor element in the arrangement when an amount of electromagnetic radiation or a change in the amount of electromagnetic radiation detected by the at least one sensor element exceeds a first predetermined threshold.

45. The integrated display and input device according to claim 44, wherein the at least one sensor element detects electromagnetic radiation reflected by the object.

46. The integrated display and input device according to claim 45, wherein the light reflected by the object propagates within the viewing plane defining plate to the at least one sensor element.

47. The integrated display and input device according to claim 45, wherein the light reflected by the object propagates above the viewing plane defining plate to the at least one sensor element.

48. The integrated display and input device according to claim 45, wherein the light reflected by the object is transmitted through the viewing plane defining plate directly to the at least one sensor element.

49. The integrated display and input device according to claim 44, wherein the non-imagewise input further corresponds to a location of the at least one sensor element when the amount of radiation detected by the at least one sensor element is below a second predetermined threshold.

50. The integrated display and input device according to claim 49, further comprising:
detector processing circuitry operative to:
receive outputs from individual sensor elements of the arrangement of sensor elements;
determine when at least one of the amount of electromagnetic radiation detected by the at least one sensor element exceeds the first predetermined threshold, the change in the amount of electromagnetic radiation detected by the at least one sensor element exceeds the first predetermined threshold, or the amount of radiation detected by the at least one sensor element is below the second predetermined threshold; and
provide a detector output for the at least one sensor element;
array processing circuitry operative to receive the detector output and generate an array detection output; and
position determining circuitry operative to receive the array detection output and determine the position of the object therefrom.

51. The integrated display and input device according to claim 50, wherein the array detection output includes information corresponding to the location of an impingement point of the object on the viewing plane defining plate.

52. The integrated display and input device according to claim 50, wherein the array detection output includes information corresponding to the location of the object relative to the viewing plane defining plate.

53. The integrated display and input device according to claim 44, wherein the electromagnetic radiation detected at the baseline level is from an external source relative to the integrated display and input device.

54. The integrated display and input device according to claim 53, wherein the external source comprises at least one of sunlight, artificial room lighting, or infrared (IR) radiation emitted from a human body.

55. The integrated display and input device according to claim 53, further comprising an illumination subassembly operative to provide illumination for augmenting the electromagnetic radiation from the baseline level.

56. The integrated display and input device according to claim 44, further comprising an illumination subassembly operative to provide the electromagnetic radiation at said baseline level.

57. The integrated display and input device according to claim 56, wherein the illumination subassembly comprises at least one electromagnetic radiation emitting source.

58. The integrated display and input device according to claim 57, wherein the at least one electromagnetic radiation emitting source comprises at least one of an infrared (IR) emitting light emitting diode (LED), or a visible light emitting LED.

59. The integrated display and input device according to claim 58, wherein the at least one electromagnetic radiation emitting source is disposed at an intersection of two mutually perpendicular edges of the viewing plane defining plate.

60. The integrated display and input device according to claim 58, wherein the at least one electromagnetic radiation emitting source forms part of a linear arrangement of display backlights underlying the viewing plane defining plate.

61. The integrated display and input device according to claim 56, wherein the illumination subassembly comprises at least one substantially linear arrangement of a plurality of electromagnetic radiation emitting sources arranged in parallel to the edge of the viewing plane defining plate.

62. The integrated display and input device according to claim 61, wherein at least one of the plurality of electromagnetic radiation emitting sources is arranged behind the at least one sensor.

63. A position sensing assembly comprising:
a plate defining a surface;
at least one pixel array including a plurality of detector elements detecting electromagnetic radiation at a baseline level, said at least one pixel array being operative to sense a position of an object with respect to said surface according to locations of ones of said plurality of detector elements at which at least one of the amount of electromagnetic radiation detected or the change in the amount of electromagnetic radiation detected exceed a predetermined threshold, said at least one pixel array being operative to sense at least a position of at least one object with respect to said at least one pixel array when said at least one object has at least a predetermined degree of propinquity to said at least one pixel array; and
circuitry receiving an output from said at least one pixel array and providing a non-imagewise input representing the position of said at least one object relative to said at least one pixel array to utilization circuitry.

64. The position sensing assembly according to claim 63, and further comprising at least one IR illuminator for illuminating said at least one object when it has said at least a predetermined degree of propinquity to said at least one pixel array.

65. The position sensing assembly according to claim 64, wherein said at least one illuminator also functions as at least one backlighting illuminator associated with a display associated with said at least one pixel array.

66. The position sensing assembly according to claim 64, wherein said at least one illuminator is located in a plane coplanar with or parallel to said at least pixel array.

67. The position sensing assembly according to claim 64, wherein said at least one illuminator is located substantially in the same plane as at least one backlighting illuminator.

68. The position sensing assembly according to claim 63, wherein said at least one pixel array senses light reflected from said at least one object.

69. The position sensing assembly according to claim 68, wherein said at least one pixel array senses ambient light reflected from said at least one object.

70. The position sensing assembly according to claim 63, wherein said at least one pixel array senses IR light reflected from said at least one object.

71. The position sensing assembly according to claim 63, wherein said at least one object is at least one finger.

72. The position sensing assembly according to claim 63, wherein said at least one object is at least one located device.

73. The position sensing assembly according to claim 63, and further comprising utilization circuitry.

74. The position sensing assembly according to claim 73, wherein said utilization circuitry provides chording functionality.

75. The position sensing assembly according to claim 73, wherein said utilization circuitry provides functionality to distinguish at least between positions of said at least one object when touching and not touching said device.

76. The position sensing assembly according to claim 73, wherein said utilization circuitry provides functionality to distinguish at least between directions of motion of said at least one object towards and away from said device.

77. The position sensing assembly according to claim 73, wherein said utilization circuitry provides functionality to compute at least one characteristic of a trajectory of motion of said at least one object substantially parallel to said at least one pixel array.

78. The position sensing assembly according to claim 77, wherein said at least one characteristic includes at least one of location, direction, velocity, or change in direction.

79. The position sensing assembly according to claim 73, wherein said utilization circuitry provides functionality for panning and scrolling.

80. The position sensing assembly according to claim 73, wherein said utilization circuitry provides functionality for one-handed zooming.

81. The position sensing assembly according to claim 73, wherein said utilization circuitry provides functionality for employing a sensed distinction between instances when said at least one object touches and does not touch said device.

82. The position sensing assembly according to claim 81, wherein said utilization circuitry provides functionality for mouse over and click.

83. The position sensing assembly according to claim 81, wherein said utilization circuitry provides functionality for turning pages.

84. The position sensing assembly according to claim 81, wherein said utilization circuitry provides functionality for gaming.

85. The position sensing assembly according to claim 81, wherein said utilization circuitry provides functionality utilizing differences in sensed relative positions of a user's fingers.

86. The position sensing assembly according to claim 63, wherein said change in the amount of electromagnetic radiation detected results from ones of said plurality of detector elements detecting reflected light from said object in addition to detecting said electromagnetic radiation at said baseline level.

87. The position sensing assembly according to claim 86, wherein said reflected light propagates within said plate to ones of said plurality of detector elements.

88. The position sensing assembly according to claim 86, wherein said reflected light propagates above said surface to ones of said plurality of detector elements.

89. The position sensing assembly according to claim 86, wherein said reflected light is transmitted through said plate directly to at least one of said plurality of detector elements.

90. The position sensing assembly according to claim 63, and further comprising a processing subassembly including: detector analyzing processing circuitry operative to receive detector outputs of individual ones of said plurality of detector elements, to determine whether at least one of the amount of electromagnetic radiation or the change in the amount of electromagnetic radiation detected by said individual ones of said plurality detector element exceeds said predetermined threshold, and to provide detector analysis outputs for said individual ones of said plurality of detector elements; array processing circuitry operative to receive said detector analysis outputs of said plurality of detector elements of a single one of said at least one pixel array and to generate an array detection output therefrom; and position determining circuitry operative to receive said array detection output of said at least one pixel array and to determine said position of said object therefrom.

91. The position sensing assembly according to claim 90, wherein said array detection output includes information corresponding to the location of an impingement point of said object on said surface.

92. The position sensing assembly according to claim 90, wherein said array detection output includes information corresponding to the location of said object relative to said surface.

93. The position sensing assembly according to claim 63, wherein said position of said object comprises at least one of a two-dimensional position of said object, a three-dimensional position of said object, or angular orientation of said object.

94. The position sensing assembly according to claim 63, wherein said electromagnetic radiation at said baseline level is provided by at least one source of radiation external to said position sensing assembly.

95. The position sensing assembly according to claim 94, wherein said at least one source of radiation comprises at least one of sunlight, artificial room lighting, or IR illumination emitted from a human body.

96. The position sensing assembly according to claim 94, and further comprising an illumination subassembly operative to provide illumination for augmenting said electromagnetic radiation at said baseline level.

97. The position sensing assembly according to claim 96, wherein said illumination subassembly comprises at least one electromagnetic radiation emitting source.

98. The position sensing assembly according to claim 97, wherein said at least one electromagnetic radiation emitting source comprises at least one of at least one infrared IR emitting light emitting diode (LED) or at least one visible light emitting LED.

99. The position sensing assembly according to claim 96, wherein said at least one pixel array comprises at least two pixel arrays arranged at mutually perpendicular edges of said plate.

100. The position sensing assembly according to claim 99, wherein said illumination subassembly comprises an electromagnetic radiation emitting source disposed at an intersection of two of said at least two pixel arrays.

101. The position sensing assembly according to claim 99, wherein said illumination subassembly comprises an electromagnetic radiation emitting source disposed at an intersection of two mutually perpendicular edges of said plate, and across from an intersection point of two of said at least two pixel arrays.

102. The position sensing assembly according to claim 99, wherein said illumination subassembly comprises at least one electromagnetic radiation emitting source forming part of a linear arrangement of display backlights underlying said plate.

103. The position sensing assembly according to claim 102, wherein said at least one electromagnetic radiation emitting source comprises an infrared IR emitting light emitting diode (LED).

104. The position sensing assembly according to claim 99, wherein said illumination subassembly comprises at least one substantially linear arrangement of a plurality of electromagnetic radiation emitting sources arranged in parallel to at least one edge of said plate.

105. The position sensing assembly according to claim 104, wherein at least one of said plurality of electromagnetic radiation emitting sources is arranged behind at least one of said at least two pixel arrays.

106. The position sensing assembly according to claim 96, wherein said at least one pixel array is arranged in a plane parallel to said surface.

107. The position sensing assembly according to claim 106, wherein said illumination subassembly comprises at least one substantially linear arrangement of a plurality of electromagnetic radiation emitting sources arranged in parallel to at least one edge of said plate.

108. The position sensing assembly according to claim 106, wherein said illumination subassembly comprises an electromagnetic radiation emitting source disposed at an intersection of two mutually perpendicular edges of said plate.

109. The position sensing assembly according to claim 96, wherein said at least one pixel array comprises a single pixel array arranged along an edge of said plate.

110. The position sensing assembly according to claim 109, wherein said illumination subassembly comprises an electromagnetic radiation emitting source disposed at an intersection of edges of said plate.

111. The position sensing assembly according to claim 109, wherein said illumination subassembly comprises at least one electromagnetic radiation emitting source forming part of a linear arrangement of display backlights underlying said plate.

112. The position sensing assembly according to claim 111, wherein said at least one electromagnetic radiation emitting source comprises an infrared (IR) emitting light emitting diode (LED).

113. The position sensing assembly according to claim 109, wherein said illumination subassembly comprises at least one substantially linear arrangement of a plurality of electromagnetic radiation emitting sources arranged in parallel to at least one edge of said plate.

114. The position sensing assembly according to claim 113, wherein at least one of said plurality of electromagnetic radiation emitting sources is arranged behind said single pixel array.

115. The position sensing assembly according to claim 63, and further comprising an illumination subassembly operative to provide said electromagnetic radiation at said baseline level to said plurality of detector elements.

* * * * *